United States Patent
Sanfilippo et al.

(10) Patent No.: US 10,807,782 B2
(45) Date of Patent: Oct. 20, 2020

(54) PORTION CONTROL CUPS, LIDDING MATERIAL FOR SAID CUP, METHOD OF MAKING SAID CUPS AND LIDS AND DEVICE FOR FORMING A REMOVAL LINE IN SAID CUPS AND LIDS

(71) Applicant: Sonoco Development Inc., Hartsville, SC (US)

(72) Inventors: James J. Sanfilippo, Barrington Hills, IL (US); John E. Sanfilippo, Barrington Hills, IL (US); Francisco Javier Soria, West Chicago, IL (US)

(73) Assignee: Sonoco Development Inc., Hartsville, SC (US)

( * ) Notice: Subject to any disclaimer, the term of this patent is extended or adjusted under 35 U.S.C. 154(b) by 93 days.

(21) Appl. No.: 15/999,369

(22) PCT Filed: Feb. 17, 2017

(86) PCT No.: PCT/US2017/018305
§ 371 (c)(1),
(2) Date: Aug. 17, 2018

(87) PCT Pub. No.: WO2017/143142
PCT Pub. Date: Aug. 24, 2017

(65) Prior Publication Data
US 2019/0106258 A1 Apr. 11, 2019

Related U.S. Application Data

(60) Provisional application No. 62/296,531, filed on Feb. 17, 2016.

(51) Int. Cl.
*B65D 77/20* (2006.01)
*B26D 1/08* (2006.01)
(Continued)

(52) U.S. Cl.
CPC ...... *B65D 77/2056* (2013.01); *B23K 26/0006* (2013.01); *B23K 26/359* (2015.10);
(Continued)

(58) Field of Classification Search
CPC .. B65D 77/2056; B65D 1/30; B65D 77/2052; B65D 2577/2075; B65D 2577/2091;
(Continued)

(56) References Cited

U.S. PATENT DOCUMENTS 2,302,045 A * 11/1942 Leopold .................. G09F 5/042
206/484.2
3,021,001 A * 2/1962 Donofrio ................. B65D 1/30
220/23.4

(Continued)

FOREIGN PATENT DOCUMENTS

DE 8215902 U1 10/1982
WO WO-2009/011571 A1 1/2009

OTHER PUBLICATIONS

International Preliminary Report on Patentability, corresponding International Application No. PCT/US2017/018305, dated Aug. 30, 2018.
(Continued)

*Primary Examiner* — Kareen K Thomas
(74) *Attorney, Agent, or Firm* — Marshall, Gerstein & Borun LLP

(57) ABSTRACT

A container can include a body having a volume defined therein for retaining a product. The body can include a top surface adapted to be sealed by a lid. The container further includes a channel defined in a portion of the body such that the channel is in fluid communication with the internal volume at a first end and sealed by a portion of the body at an oppositely disposed second end. The container further includes a top flange surrounding the top surface of the body
(Continued)

and includes a portion that borders the channel, with removal line disposed in the container to define a removable portion. The removal line extends from a first edge to a second edge and through the channel such that the removable portion can be removed from the body along the removal line to expose the channel.

11 Claims, 53 Drawing Sheets

(51) Int. Cl.
| | |
|---|---|
| *B26D 3/08* | (2006.01) |
| *B26F 1/18* | (2006.01) |
| *B65D 1/30* | (2006.01) |
| *B23K 26/00* | (2014.01) |
| *B23K 26/359* | (2014.01) |
| *B26D 1/00* | (2006.01) |
| *B26F 1/44* | (2006.01) |
| *B23K 101/12* | (2006.01) |
| *B23K 103/00* | (2006.01) |

(52) U.S. Cl.
CPC ............ *B26D 1/085* (2013.01); *B26D 3/085* (2013.01); *B26F 1/18* (2013.01); *B65D 1/30* (2013.01); *B65D 77/2052* (2013.01); *B23K 2101/125* (2018.08); *B23K 2103/42* (2018.08); *B26D 2001/006* (2013.01); *B26F 2001/4481* (2013.01); *B65D 2577/205* (2013.01); *B65D 2577/2066* (2013.01); *B65D 2577/2075* (2013.01); *B65D 2577/2083* (2013.01); *B65D 2577/2091* (2013.01)

(58) Field of Classification Search
CPC .... B65D 2577/2083; B65D 2577/2066; B65D 2577/205; B23K 26/359; B23K 26/0006; B23K 2103/42; B23K 2101/125; B26F 1/18; B26F 2001/4481; B26D 3/085; B26D 1/085; B26D 2001/006
USPC ........ 220/23.8, 23.2, 23.6, 23.4, 359.1, 657, 220/656; 206/501, 502, 821
See application file for complete search history.

(56) References Cited

U.S. PATENT DOCUMENTS

| | | | | |
|---|---|---|---|---|
| 3,128,920 | A * | 4/1964 | Volckening | B65D 75/48 222/215 |
| 3,189,227 | A * | 6/1965 | Hobbs | B65D 75/40 222/94 |
| 3,224,640 | A * | 12/1965 | Schneider | B65D 31/12 222/107 |
| 3,715,856 | A * | 2/1973 | Borel | B65B 7/2871 53/487 |
| 4,398,634 | A * | 8/1983 | McClosky | B65D 75/323 206/484 |
| 4,875,620 | A | 10/1989 | Lane, Sr. | |
| 5,839,609 | A * | 11/1998 | Zakensberg | B65D 75/32 222/107 |
| 6,557,731 | B1 * | 5/2003 | Lyon | B65D 75/5811 222/107 |
| 7,241,066 | B1 * | 7/2007 | Rosen | A46B 11/0003 206/459.5 |
| 9,061,796 | B2 | 6/2015 | Caldwell et al. | |
| 2007/0164045 | A1 | 7/2007 | Wydler et al. | |
| 2007/0296799 | A1 | 12/2007 | Watanabe et al. | |

OTHER PUBLICATIONS

International Search Report and Written Opinion, corresponding International Application No. PCT/US2017/018305, dated Apr. 12, 2017.

* cited by examiner

DETAIL B
SCALE 16:1

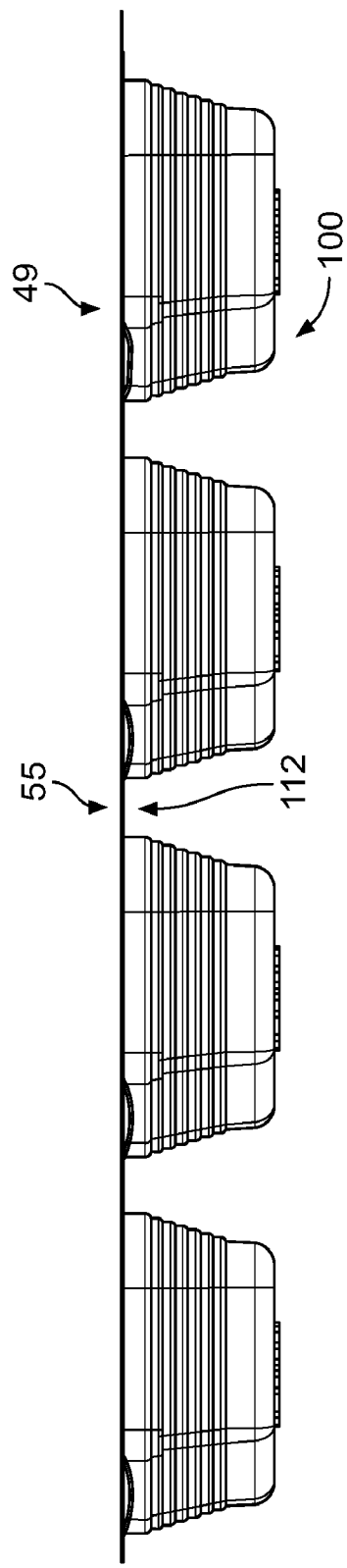
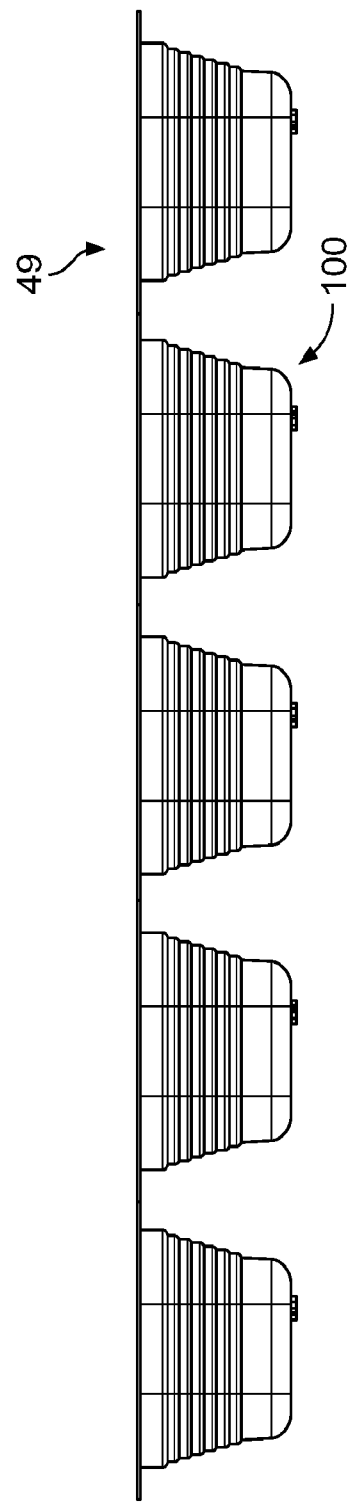
FIG. 14D
FIG. 14E

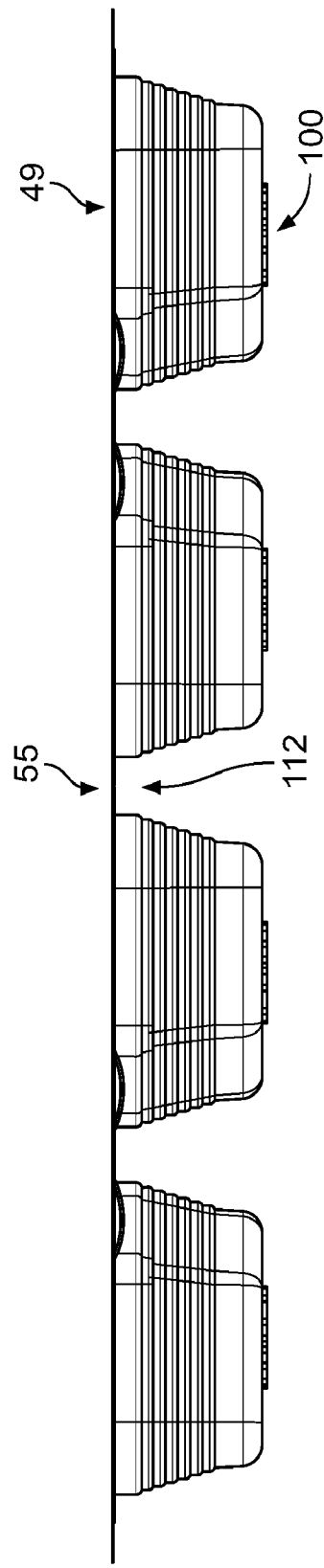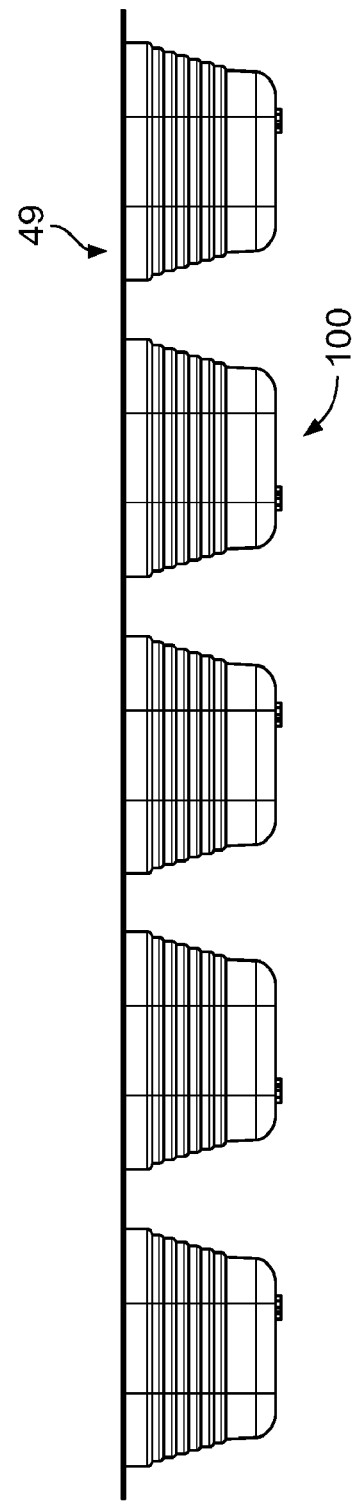

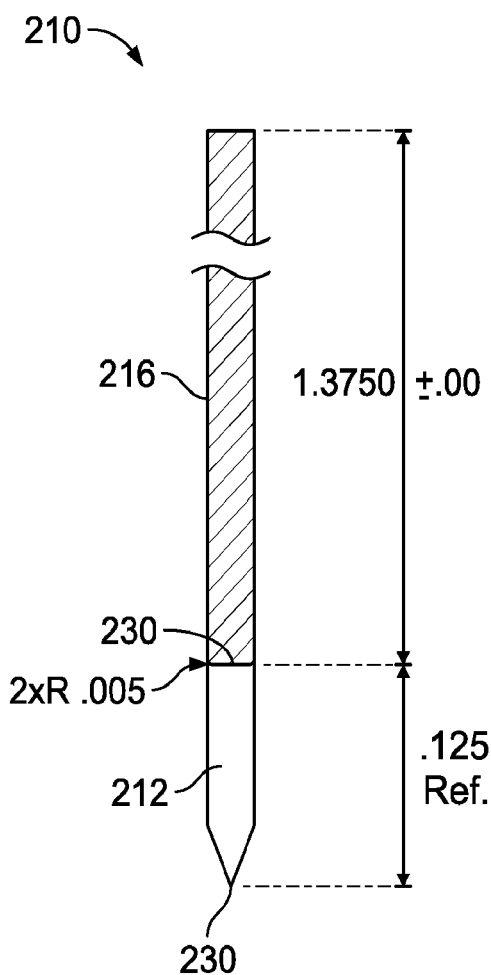
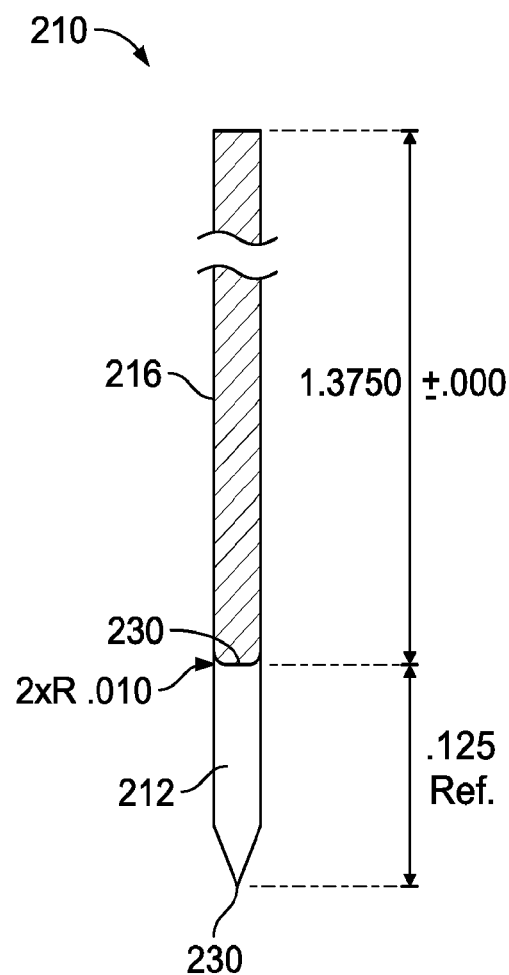
FIG. 19  FIG. 20

VIEW A-A

VIEW B-B

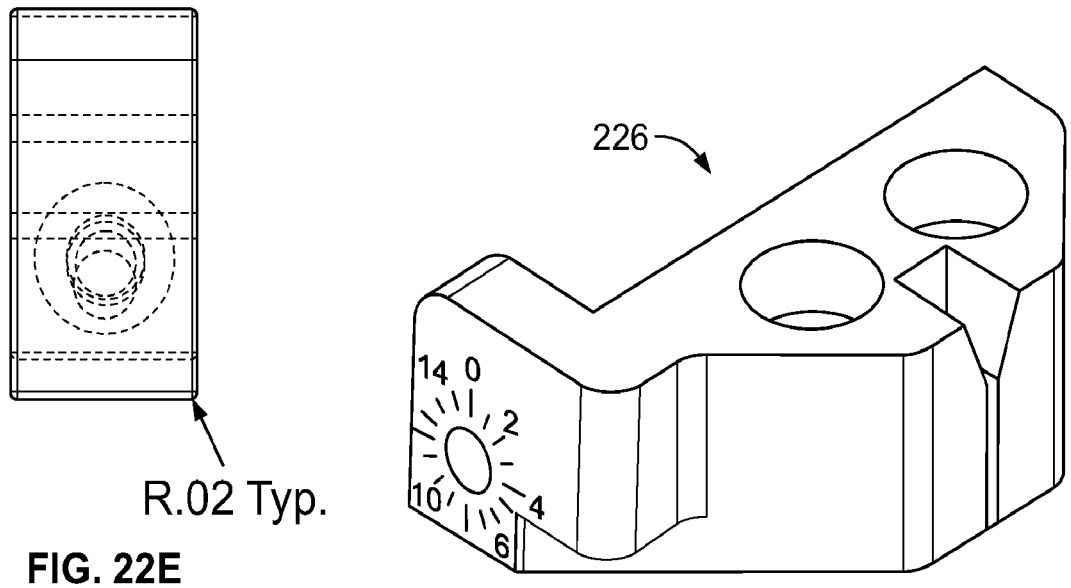
FIG. 22E
R.02 Typ.
FIG. 23A
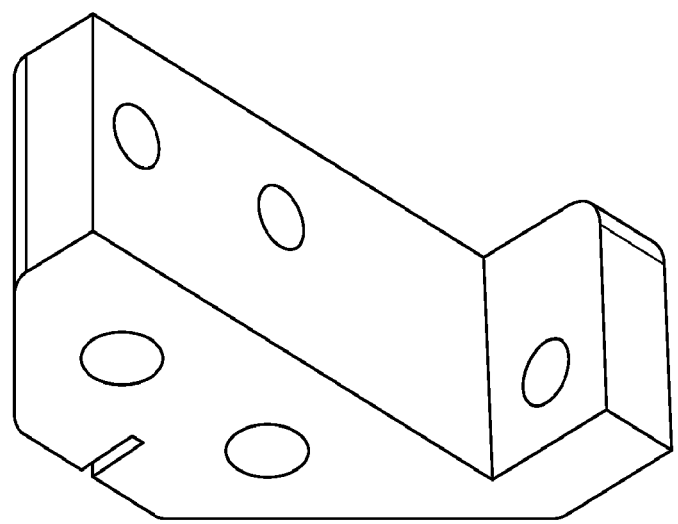
FIG. 23B

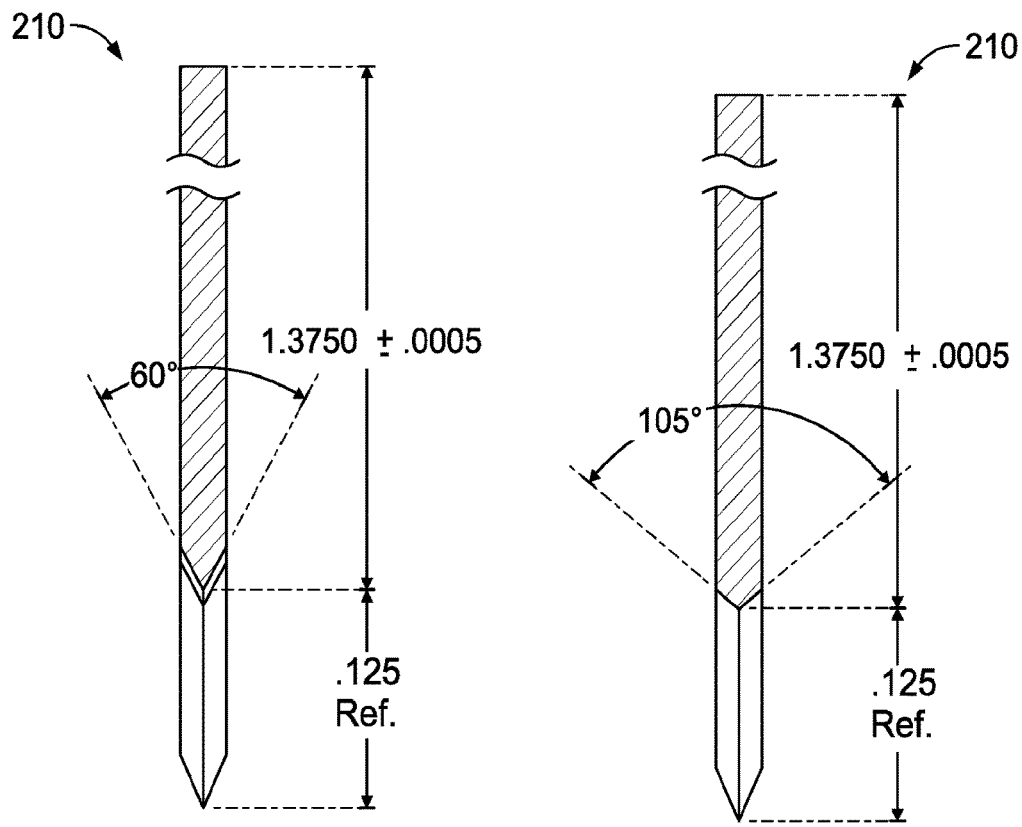
FIG. 24I  FIG. 24J
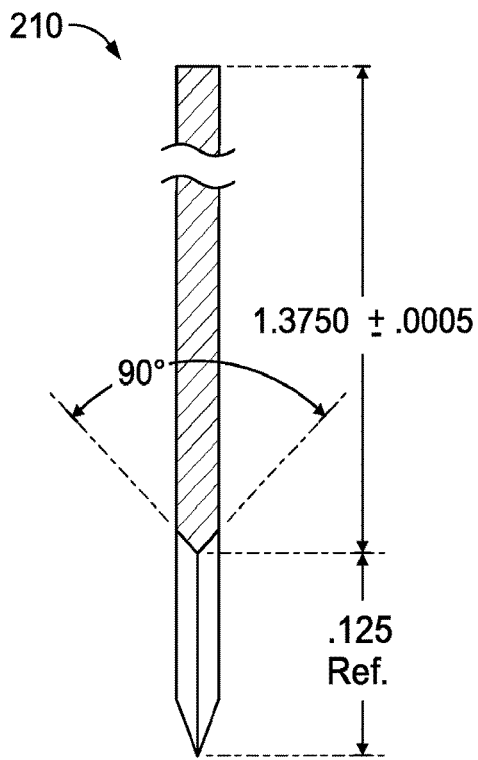
FIG. 24K

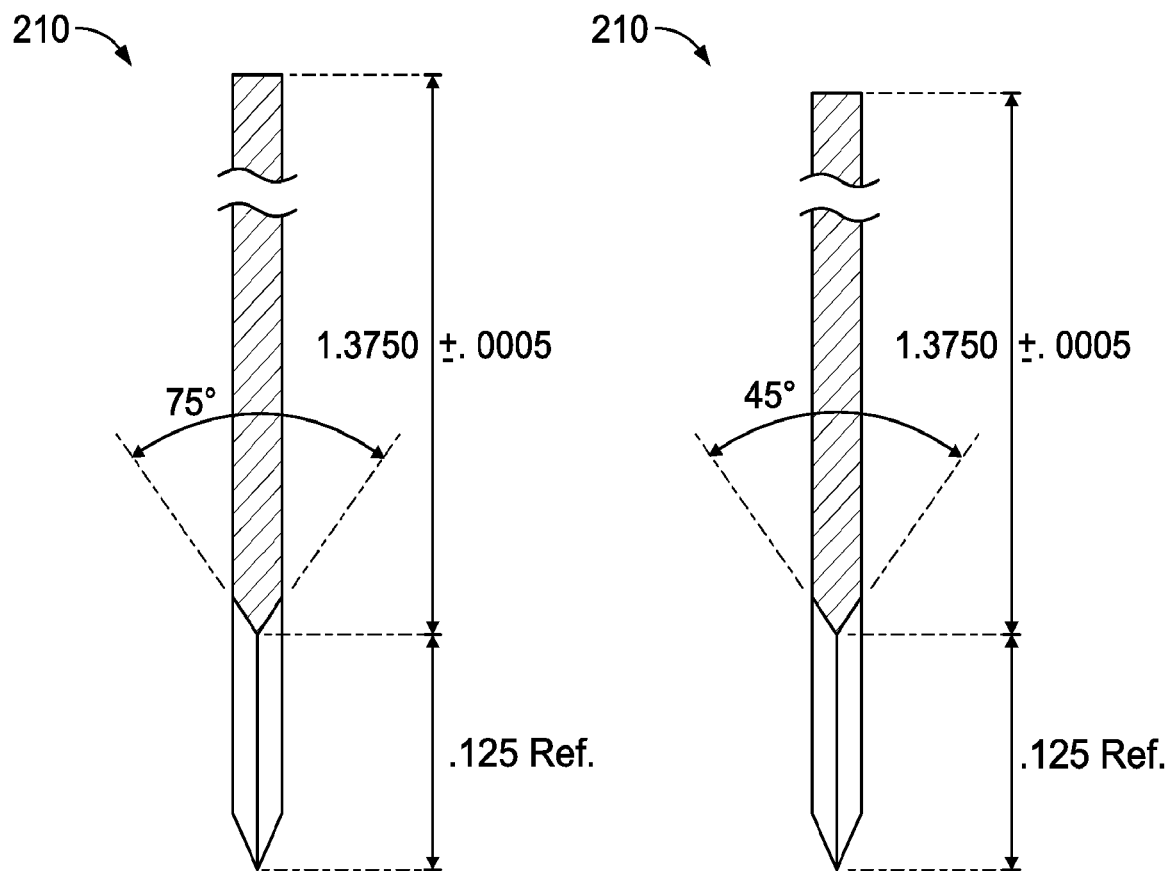
FIG. 24L　　　　FIG. 24M
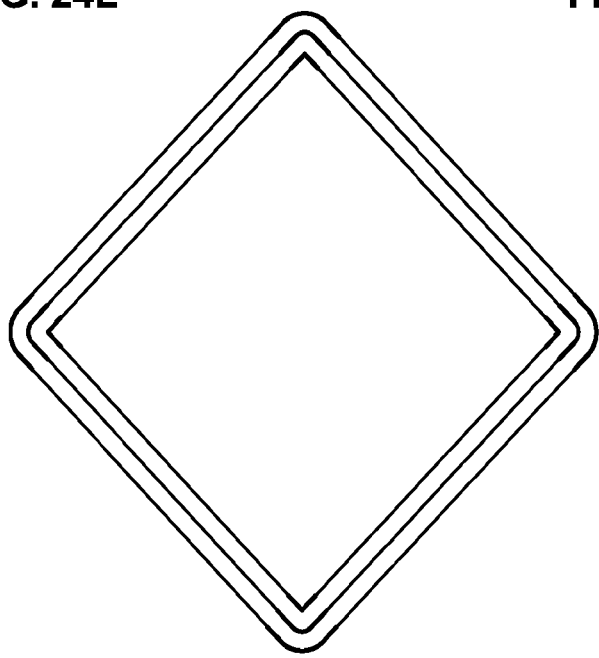
FIG. 25

PORTION CONTROL CUPS, LIDDING MATERIAL FOR SAID CUP, METHOD OF MAKING SAID CUPS AND LIDS AND DEVICE FOR FORMING A REMOVAL LINE IN SAID CUPS AND LIDS

CROSS-REFERENCE TO RELATED APPLICATION

This application is a U.S. National Stage of International Patent Application No. PCT/US2017/18305, filed Feb. 17, 2017, which claims the benefit of priority of U.S. Provisional Application 62/296,531 filed on Feb. 17, 2016, the respective disclosures of which are each incorporated herein by reference in their entireties.

BACKGROUND

Field of the Disclosure

The disclosure is directed to a container and more particularly to a container that provides access to a product contained therein in two different manners, such as squeezing and dipping.

Brief Description of Related Technology

Disposable containers are widely used today. The food service industry and particularly fast food restaurants often utilize disposable containers for condiments. Typically, such containers take the form of foil packets, plastic cups with foil lids, and plastic cups with plastic lids. Recently, containers having dual access modes such as allowing for squeezing for product removal and dipping have been used. Such dual access mode containers are also known as dip and squeeze containers. Conventional dual access mode containers can be difficult to open, resulting in unwanted spillage of the product. Additionally, such containers can be difficult to manufacture and often require entirely new equipment or significant modification to existing fill and seal equipment.

SUMMARY

In accordance with an embodiment of the disclosure, a container can include a body having a volume defined therein for retaining a product. The body can include a top surface adapted to be sealed by a lid. The container further includes a channel defined in a portion of the body such that the channel is in fluid communication with the internal volume at a first end and sealed by a portion of the body at an oppositely disposed second end. The container further includes a top flange surrounding the top surface of the body and includes a portion that borders the channel. A removal line is disposed in the container to define a removable portion that includes the portion of the body that seals the end of the channel and the top flange portion surrounding the channel. The removal line extends from a first edge to a second edge and through the channel such that the removable portion can be removed from the body along the removal line to expose the channel.

In various embodiments, the removal line can include first and second portions disposed on opposed sides of a third portion. The first and second portions extend inwardly from the first and second edges, respectively, but do not cross the channel. The third portion extends at least across the channel and connects to the first and second portions. In some embodiments, the first and second portions have a line of reduced strength with a percent penetration that is different than the percent penetration of the third portion. For example, in an embodiment, the first and second portions have a line of reduced strength with 100% penetration and the third portion has a line of reduced strength with less than 100% penetration. In other embodiments, the removal line can have a uniform penetration percentage.

In accordance with embodiments of the disclosure, a container assembly can include a plurality of containers joined to at least one adjacent container along at least one edge. The containers can be arranged in a predetermined pattern. In some embodiments, the predetermined pattern is such that the containers are mirror images of adjacent containers. In other embodiments, the predetermined pattern is such that the containers have the same orientation.

In accordance with yet another embodiment of the disclosure, a lidding material or roll-stock can include a plurality of lids joined to at least one adjacent lid along at least one edge. The lids can be arranged in a predetermined pattern. In some embodiments, the predetermined pattern is such that the lids are mirror images of adjacent lids. In other embodiments, the predetermined pattern is such that the lids have the same orientation.

BRIEF DESCRIPTION OF THE DRAWINGS

FIGS. 14A-14E are various views of a sealed container assembly having a lidding material attached thereto in accordance with an embodiment of the disclosure;

FIGS. 15A-15E are various views of a sealed container assembly having a lidding material attached thereto in accordance with an embodiment of the disclosure;

FIG. 19 is a side profile of a knife through section A-A of a knife as shown in FIG. 18B;

FIG. 20 is a side profile of a knife through section A-A of a knife as shown in FIG. 18B;

FIGS. 22A-22E are various views of side wedge of the apparatus of FIG. 16;

FIGS. 23A-23G are various views of an anvil guide of the apparatus of FIG. 16; and FIGS. 24A-24M are side profiles of knives through section A-A of a knife as shown in FIG. 18B; and FIG. 25 illustrates a shaped line of reduced strength pattern in accordance with an embodiment of the disclosure.

DETAILED DESCRIPTION

Figure 1A:
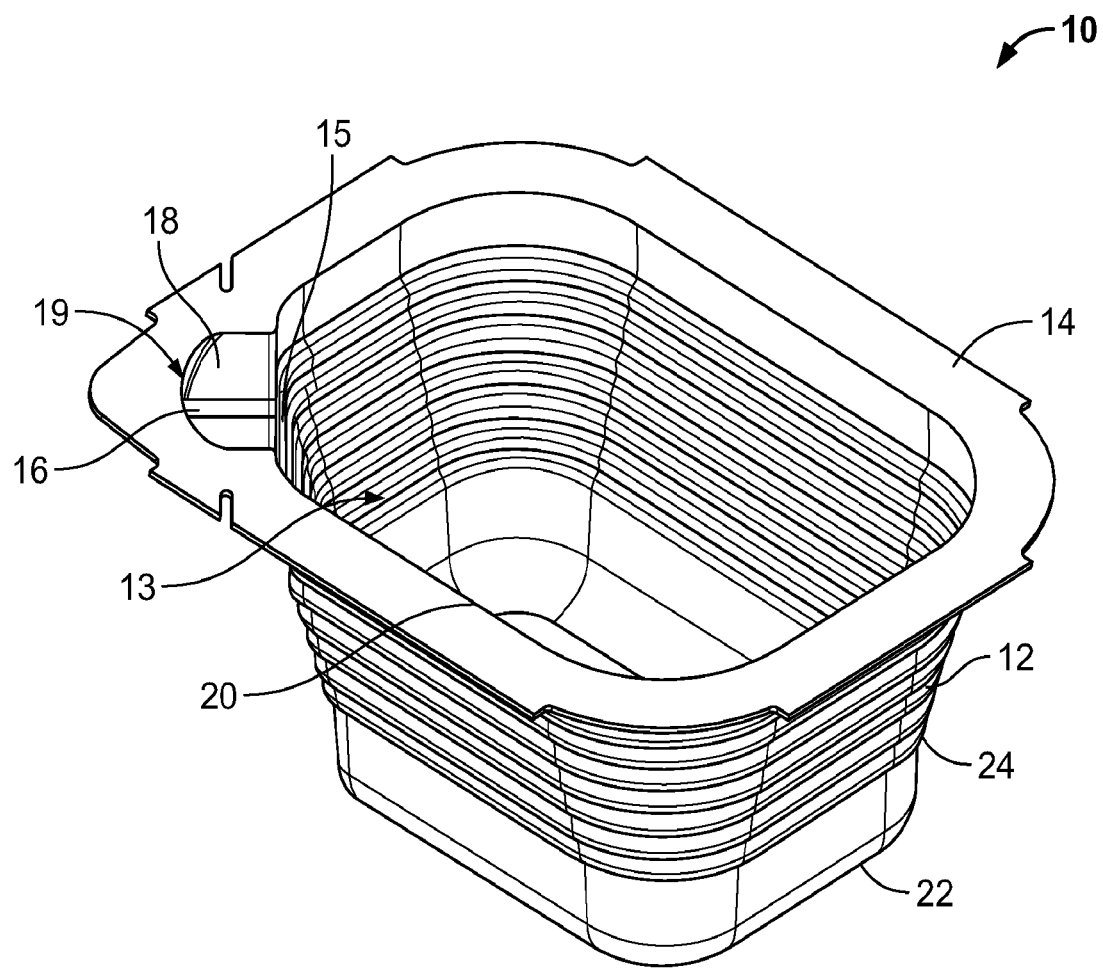
FIGS. 1A-1F are various views of a container in accordance with an embodiment of the disclosure.

Disclosed herein is a container that advantageously allows a user to select from squeezing product from the container or opening a flexible lid of the container to allow for dipping into or otherwise accessing the contents of the container from a larger opening. Containers in accordance with the disclosure advantageously improve the openability and manufacturability of dip and squeeze-type containers. In accordance with an embodiment of the disclosure, the containers of the disclosure include a removable portion that allows the user to access a channel through which product can be squeezed out of the container, as well as a removable lid portion that allows the user larger access to the interior volume, for example, for dipping. Prior dip and squeeze type containers can be difficult to open, often resulting in the user inadvertently squirting product out of the container in an undesirable and messy manner. Furthermore, manufacturing of conventional dip and squeeze type containers cannot typically utilize conventional fill and seal machines without significant overhaul or reconfiguration of the machine. Embodiments of the claimed invention advantageously provide a container assembly that can be accepted in equipment currently used for forming and/or filling conventional cups with minimal or no changes to the conventional equipment, particularly filling and sealing equipment. In various embodiments, form, fill and sealing of containers in accordance with disclosure can be accomplished with minimal additional equipment to the machine to provide for the formation of the removable portion for squeeze-type operation. In some embodiments, the container assembly can be received directly in an unmodified fill and seal machine.

In accordance with an embodiment of the disclosure, the container 10 includes a body 12 having an internal volume 13 defined therein for retaining a product to be dispensed from the container 10. The internal volume 13 is sealed by lid 50, as discussed in detail below, to form a sealed container for retaining the product until ready for use. The lid 50 can be sealed to a top flange 14 that surrounds the body 12, as discussed in detail below. The body 12 including the top flange 14 can be formed of any known material, including, for example, polystyrenes, polyethylenes, polyesters, polyvinyl chlorides, and combinations or layers thereof. For example, suitable materials or layers for the body 12 and top flange 14 include PET, APET, oriented-PET, MET-PET, PE, LDPE, LLDPE, MDPE, mLLDPE, HDPE, mPE, EVA, PP, MET-PP, PS, OPS, HIPS, EVOH, PVC, PLA, and combinations or layered structures thereof. The interior of the body and/or the top flange can be coated with coatings, such as to provide certain barrier properties, including oxygen or moisture barrier properties. Use of coated and uncoated materials are contemplated herein depending on the product to be stored in the container. The body and the top flange can be formed of the same material or of different materials. In various embodiments, the body 12 and top flange 14 are formed by thermoforming. Any conventional thermoformable materials for forming cups can be used. Other forming methods, such as injection molding, are also contemplated herein. The materials can include coatings or additives as known in the art.

The body 12 can have any suitable size and shape depending on the type and amount of product to be contained therein. Referring to FIG. 1A, for example, the body 12 can have a generally rectangular shape, a rounded-rectangular shape, a square shape, and oval or oblong shape, or any other suitable shape. For example, the body 12 can be sized to receive a single-serve volume of a product, such as a condiment. Multi-serve content amounts are also contemplated herein. FIGS. 1-4 illustrate various shapes and sizes of containers 10. These shapes and sizes are exemplary only and do not constitute the only shapes and sizes contemplated herein. As illustrated in these figures, the containers 10 of the disclosure can have different widths, and depths to accommodate any desired product and amount.

Figure 3A:
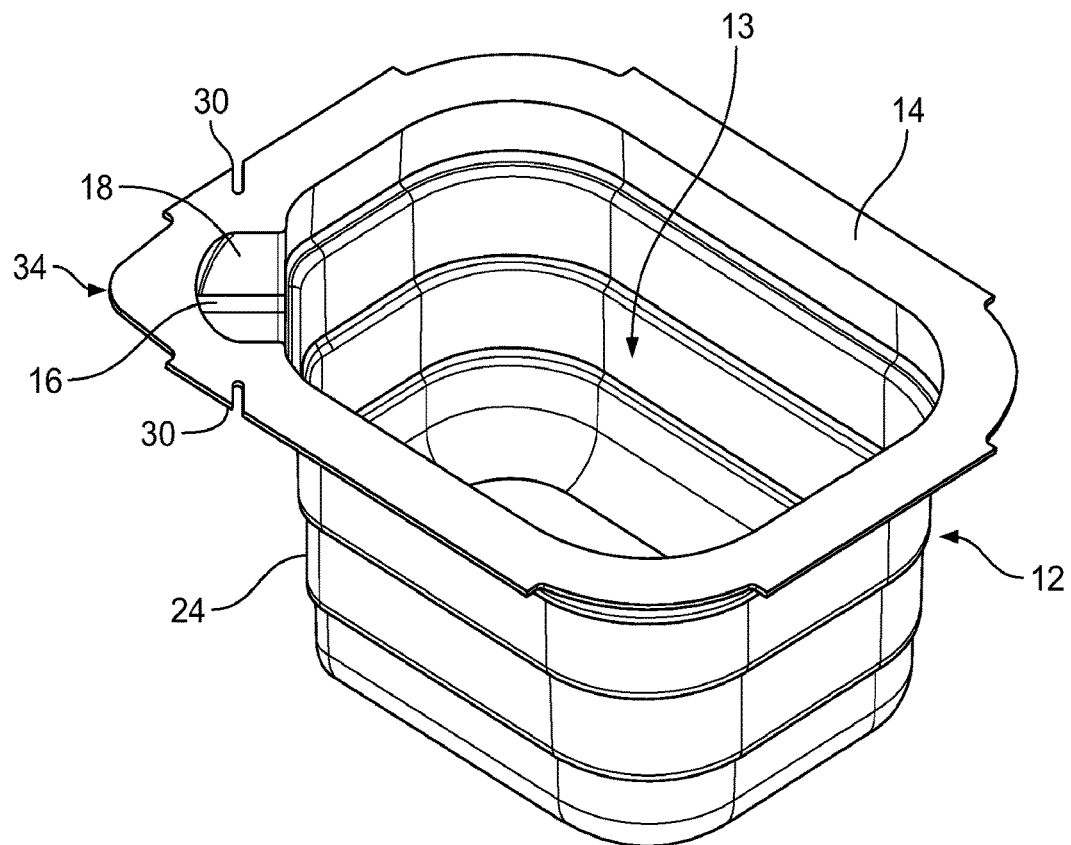
FIGS. 3A-3E are various views of a container in accordance with an embodiment of the disclosure.
Figure 3B:
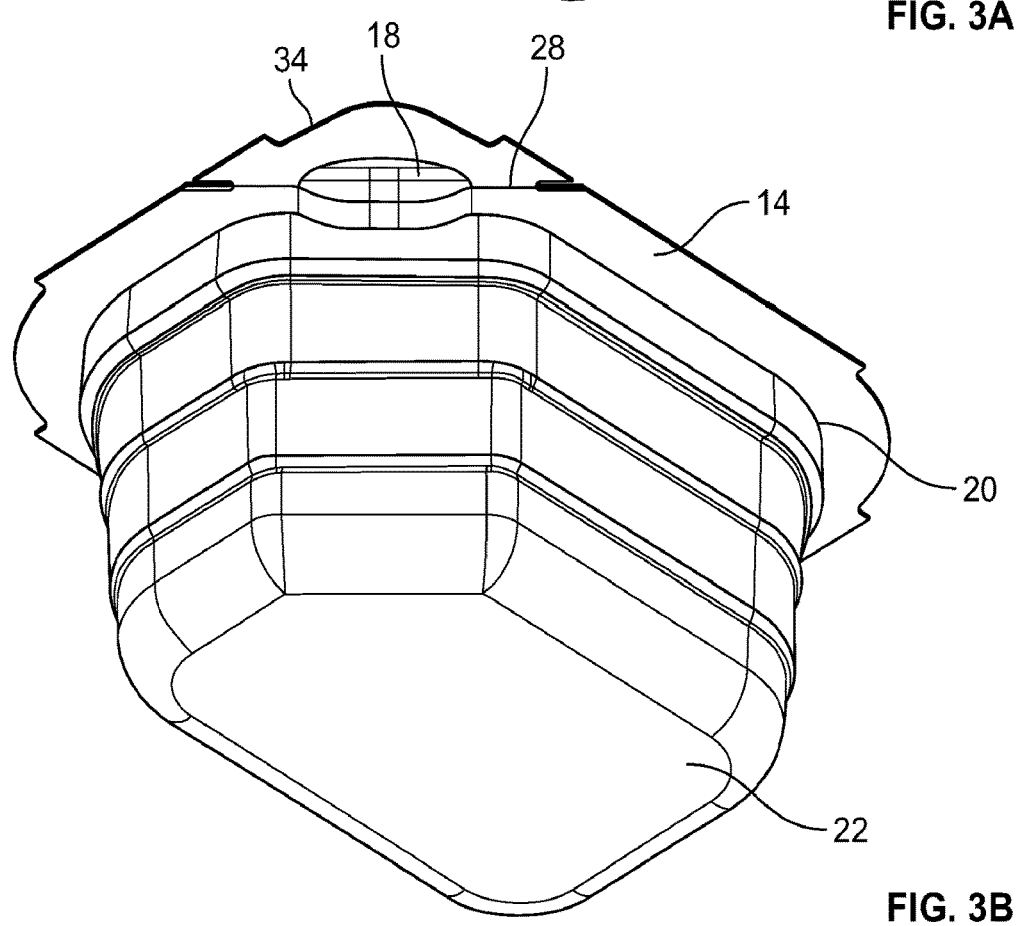
Figure 3C:
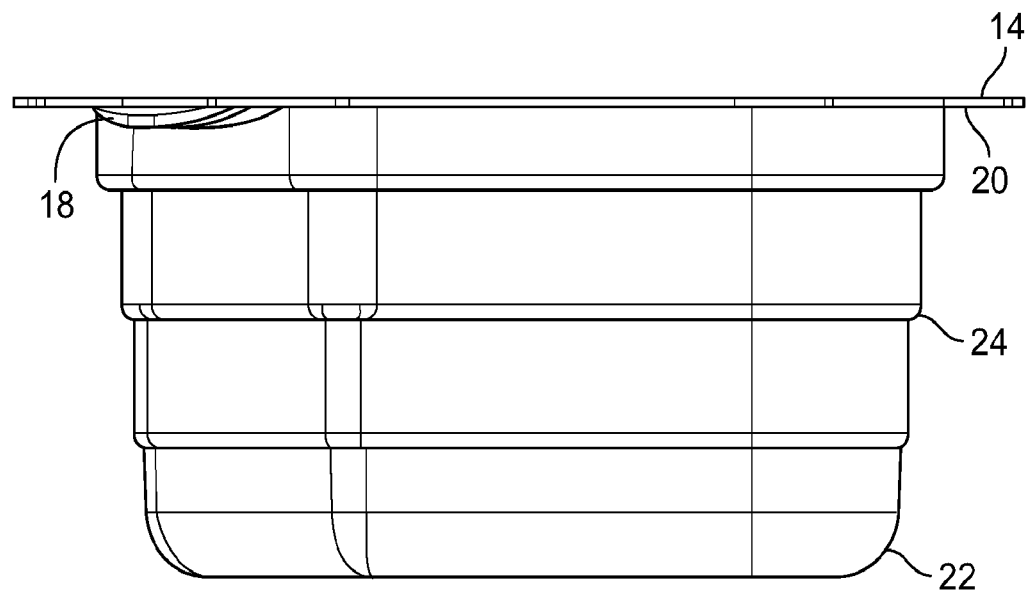
Figure 3D:
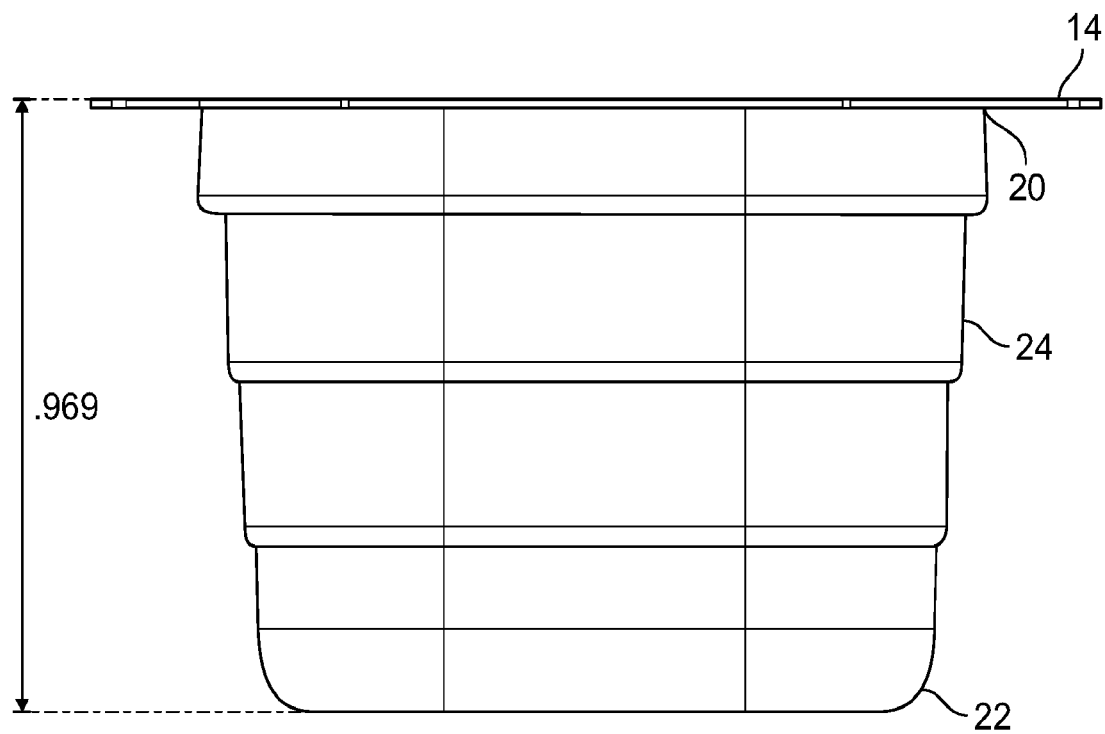
Figure 3E:
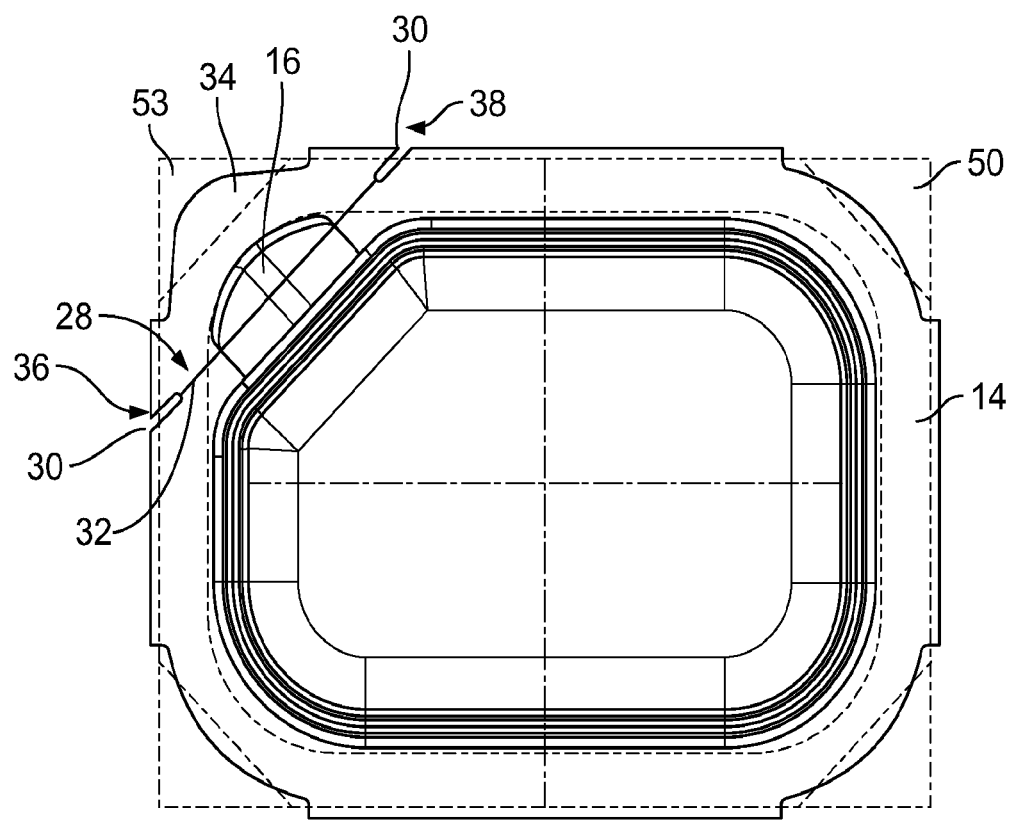
Figure 4A:
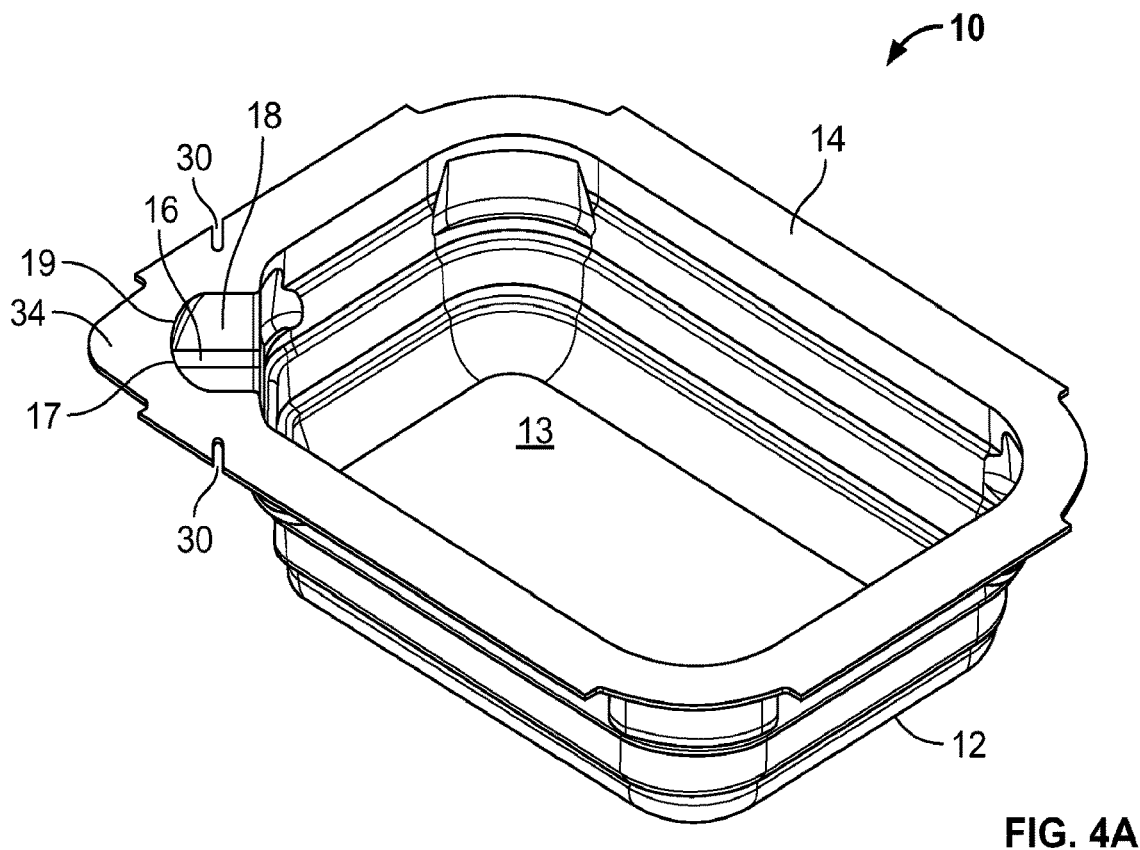
FIGS. 4A-4E are various views of a container in accordance with an embodiment of the disclosure.
Figure 4B:
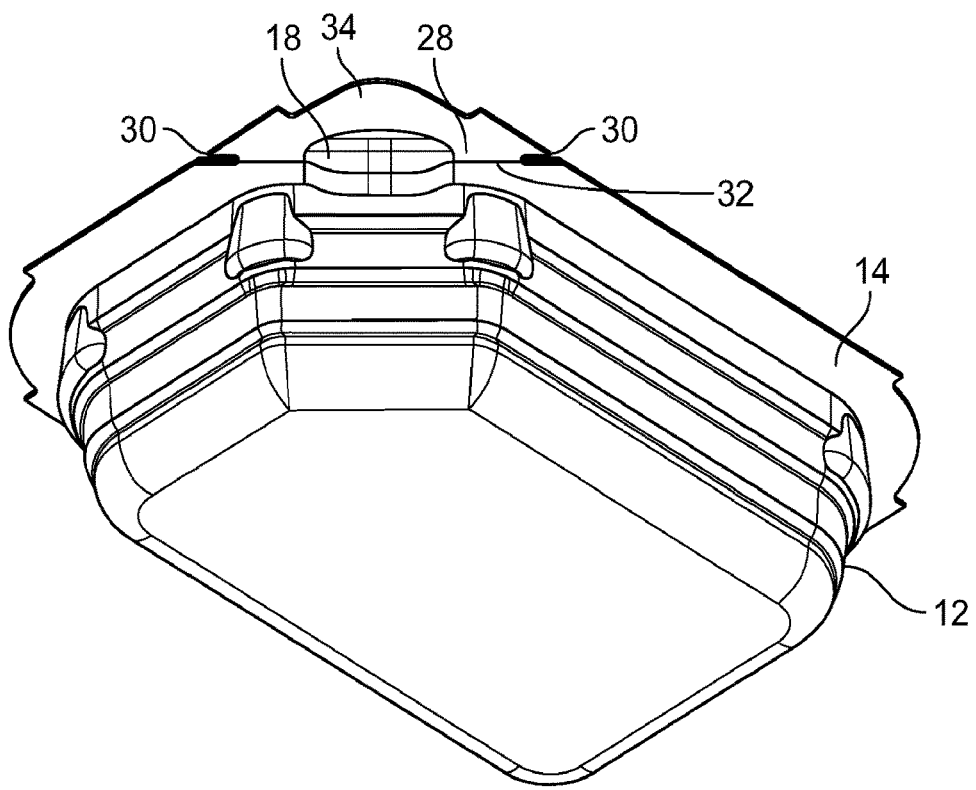
Figure 4C:
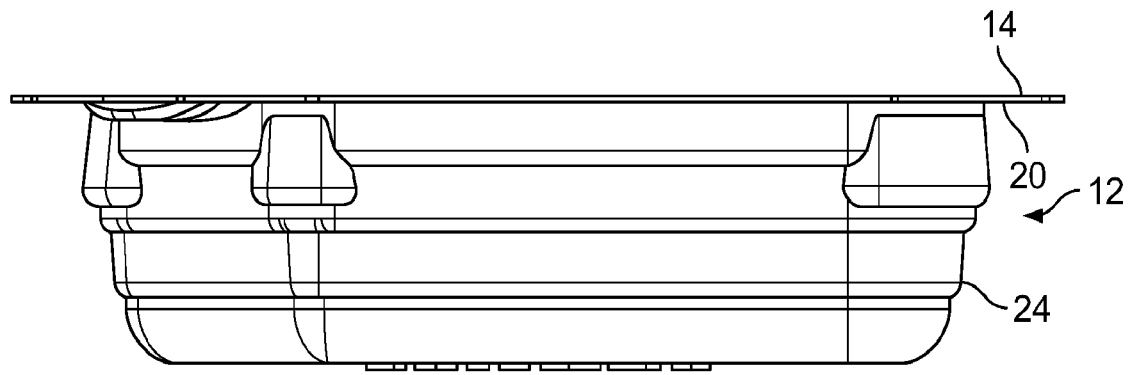
Figure 4D:
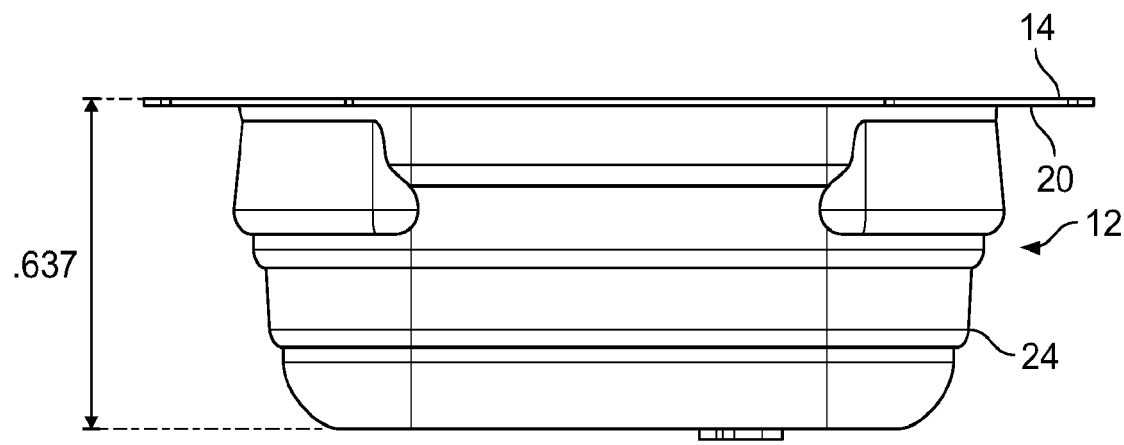
Figure 4E:
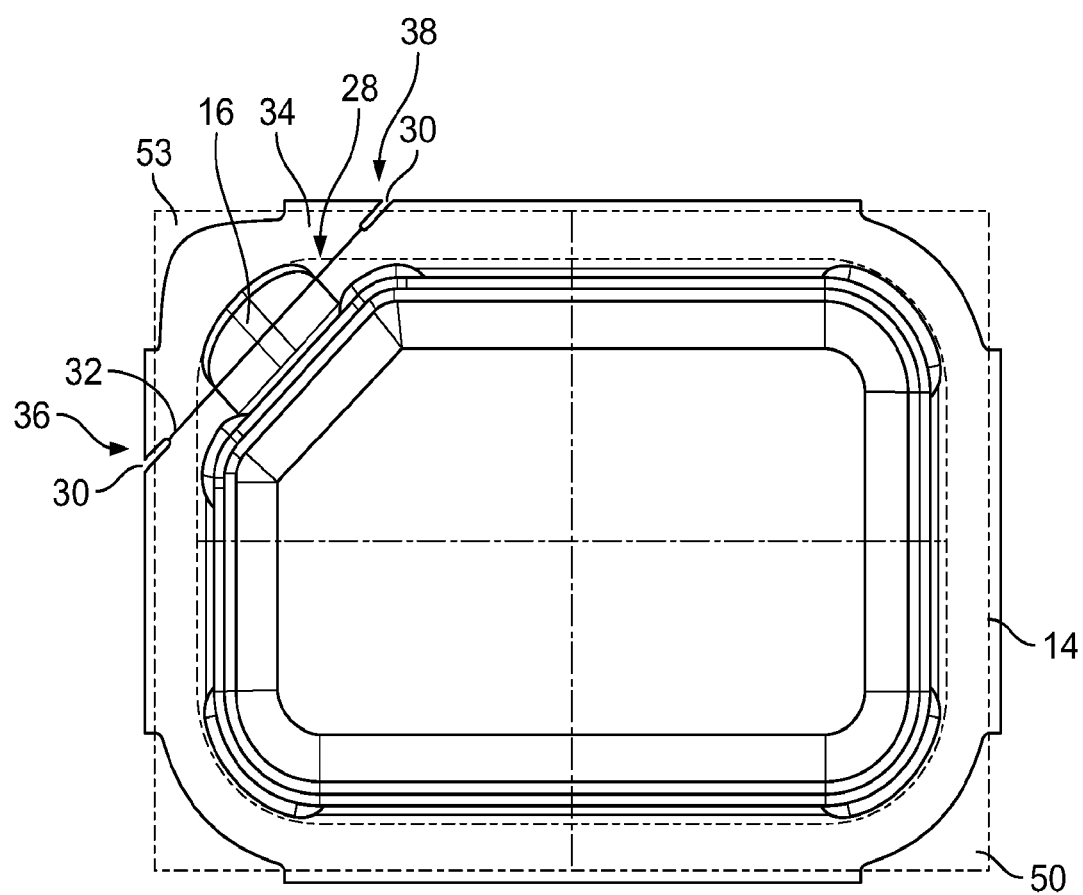

Referring to FIG. 1A, in some embodiments, the body 12 can have a tapered shaped that increases in width from the bottom 22 of the body 12 to the top 20 of the body 12. Referring to FIG. 3A, the container 10 can generally have the same width throughout the depths of the container.

The body 12 can include one or more ribs 24. In containers 10 having a generally uniform width throughout the depth, the ribs 24 can result in some local widening of the width. The overall structure in such containers, however, is referred to herein as generally having a uniform width. Any suitable number of ribs 24 can be provided. A rib 24 can be provided as a continuous structure that surrounds the entire perimeter of the body. Alternatively, or additionally a rib 24 can be defined in one or more walls of the body. In some embodiments, the ribs can be provided such that they nest to define an accordion region 26. This can facilitate squeezing of the container 10 to remove product through the channel 16 in the squeeze-type dispensing mode.

Referring again to FIG. 1A, the body 12 includes a channel 16 that is in fluid communication with the internal volume 13 at one end 15 and sealed by a portion of the body 19 at an opposed end 17. The channel 16 serves as the passage through which the product can be dispensed when the container 10 is opened.

The channel 16 can have any suitable cross-section depending on the product to be dispensed and the rate of product to be dispensed. For example, for products having a high viscosity, such as syrup, it may be useful to provide a channel having a profile (effective width) such that less squeeze force is needed to dispense product through the channel. For lower viscosity products, it may be useful to have a channel 16 with a reduced profile to allow for more control over the rate of dispensing the product and amount of product dispensed.

In various embodiments, the channel 16 can be provided as a separate structure from the body 12. For example, the channel 16 can be a, tube-shaped structure that is attached to the body in fluid communication with the volume 13 and disposed such that a portion 19 of the body 12 seals the opposed end 17 of the channel 16. The channel 16, when provided as a separate structure can be provided in any suitable shape having an aperture there-through. The channel 16 can also be provided with an open top surface, for example a half tube-shaped structure, such that the channel is sealed when the lid 50 is placed on the body 12.

In other embodiments, the channel 16 can be integral with the body 12. For example, referring to FIG. 1B, a channel can be defined in the body 12 utilizing a portion of the body 12 to define the bottom and sidewalls of the channel 16 and the lid 50 as the top surface to seal the channel 16 when the container 10 is closed.

Figure 1B:
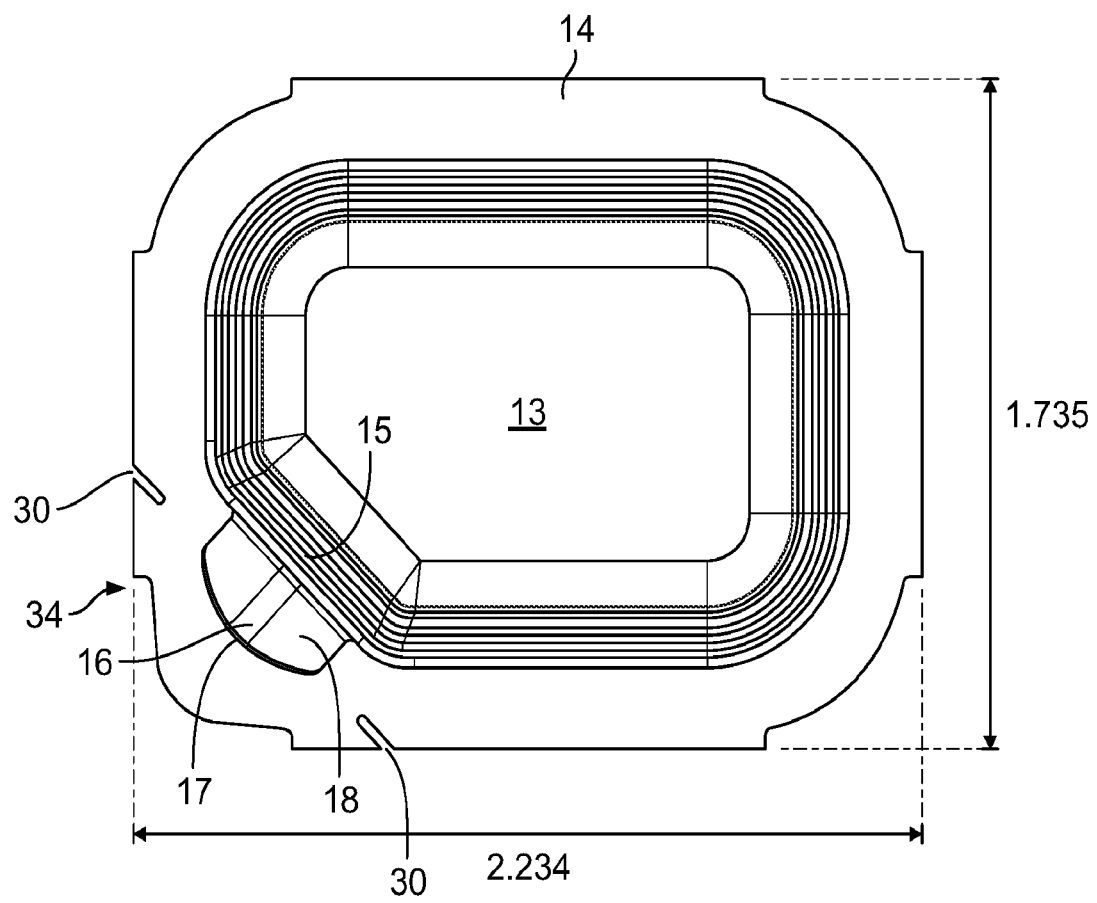
Figure 1C:
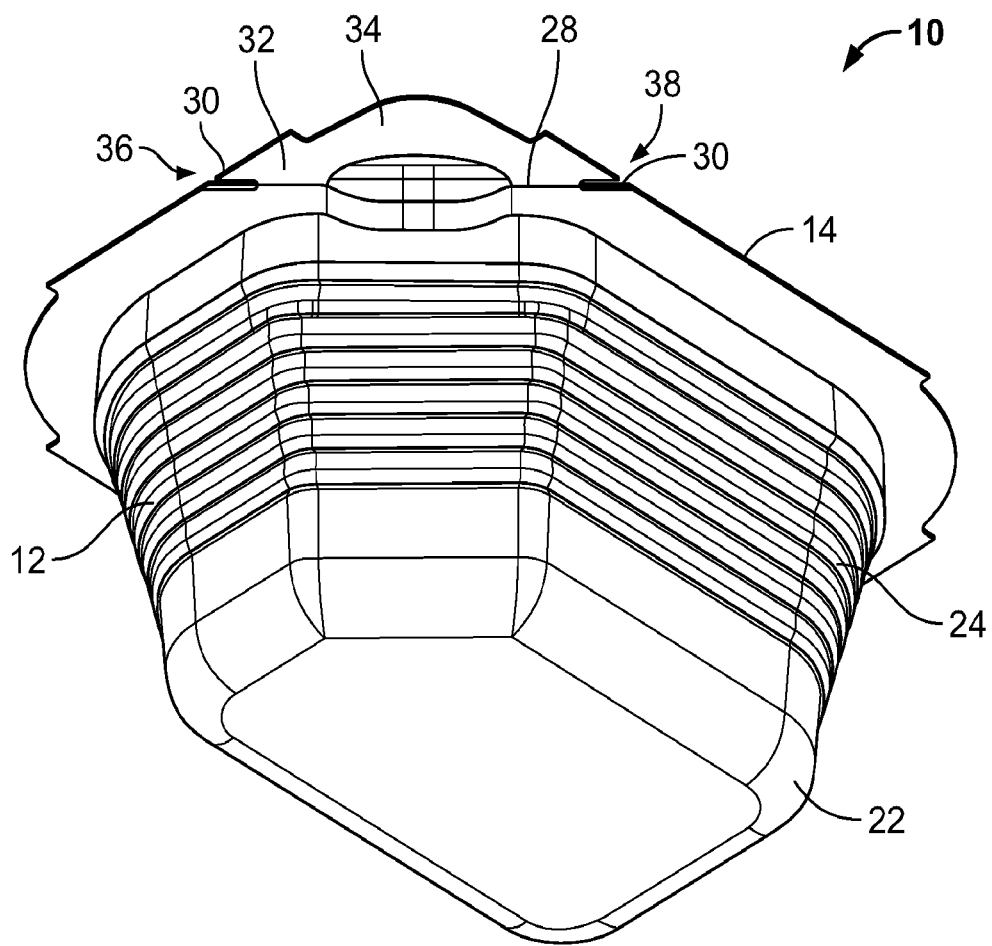
Figure 1D:
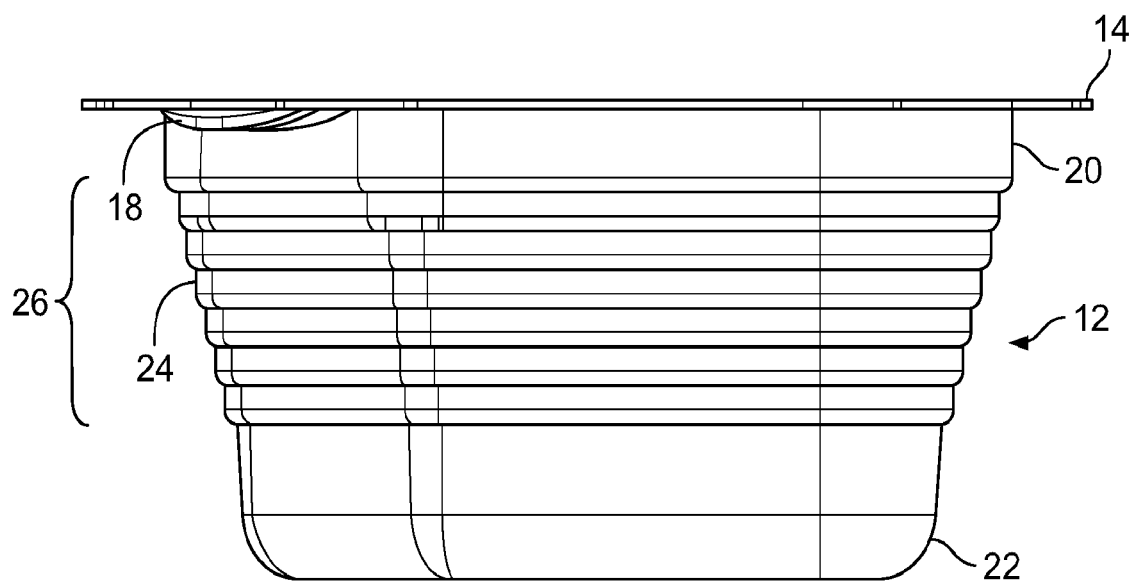
Figure 1E:
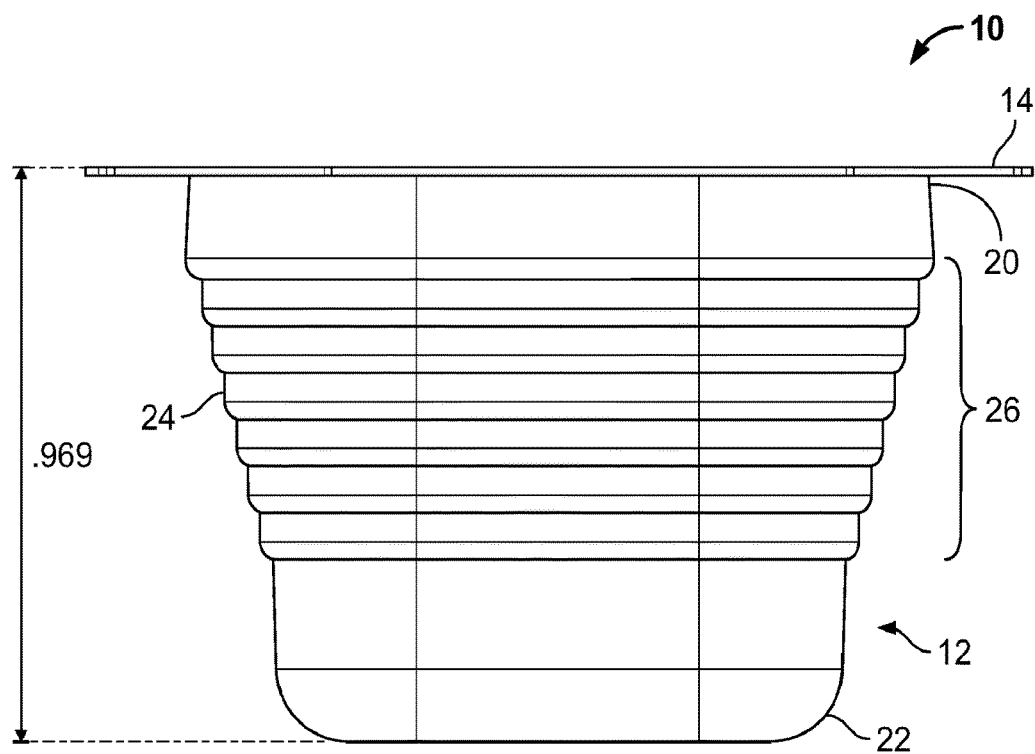
Figure 1F:
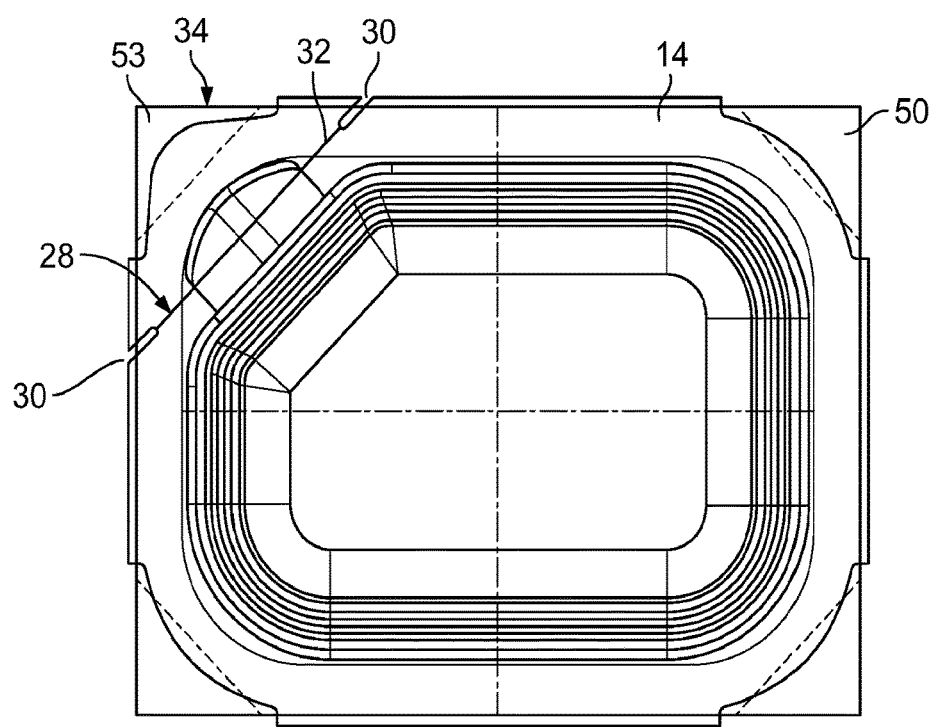
Figure 2A:
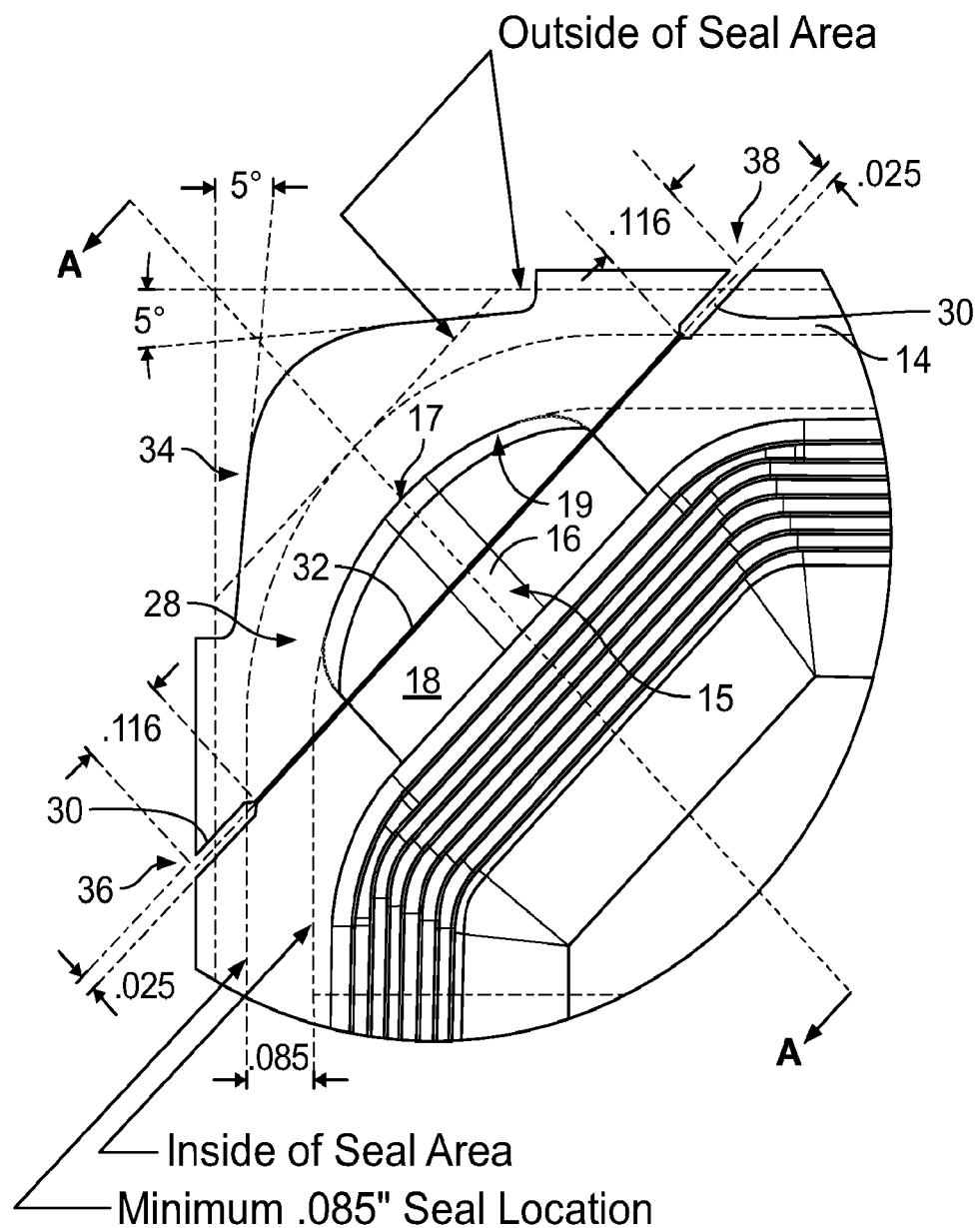
FIGS. 2A-2C are schematic drawings of a removal portion of a container in accordance with an embodiment of the disclosure, with FIG. 2B being a view through section A-A of FIG. 2A, and FIG. 2C being a zoomed in image of second B on FIG. 2B.
Figure 2B:
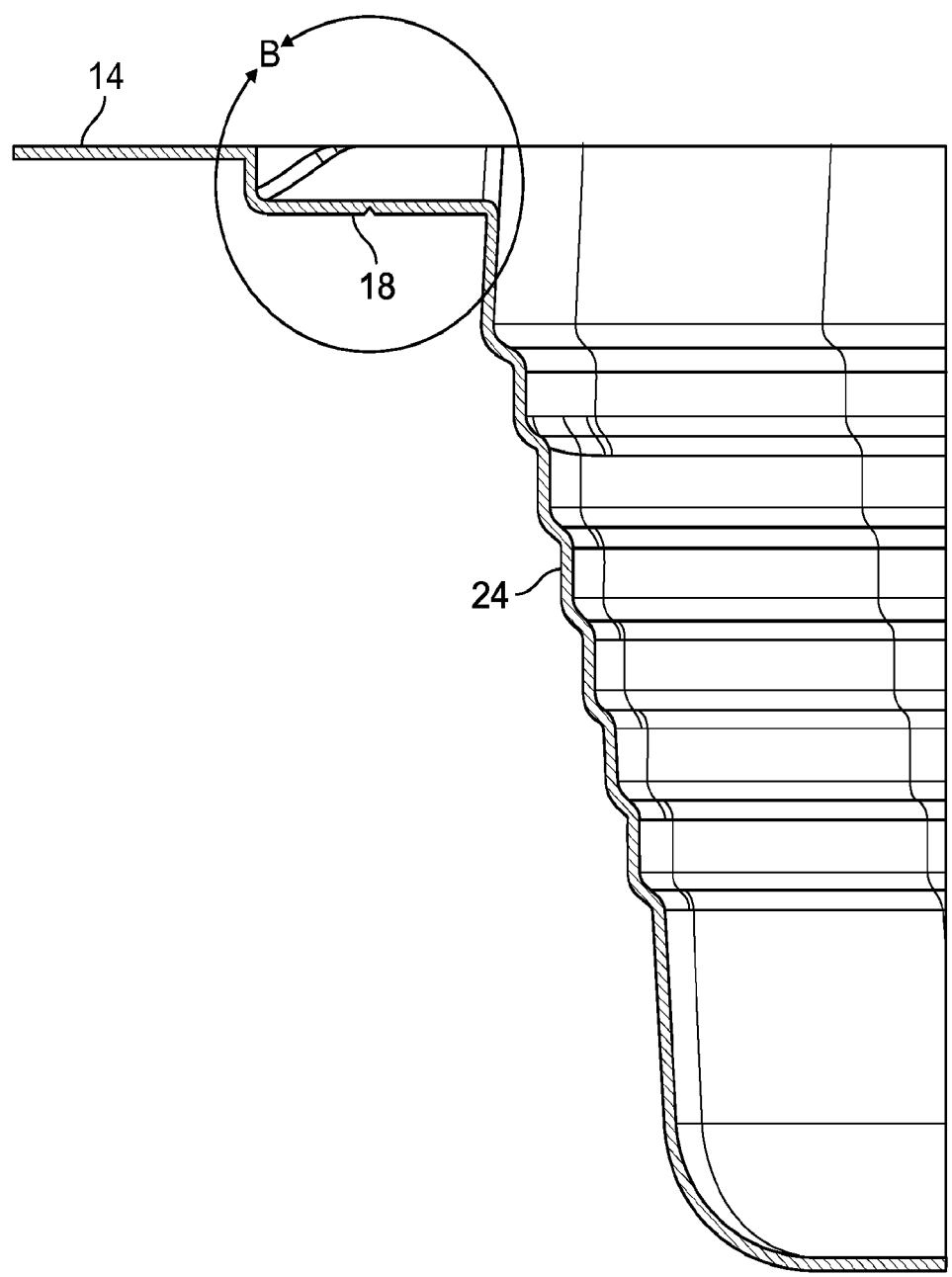
Figure 2C:
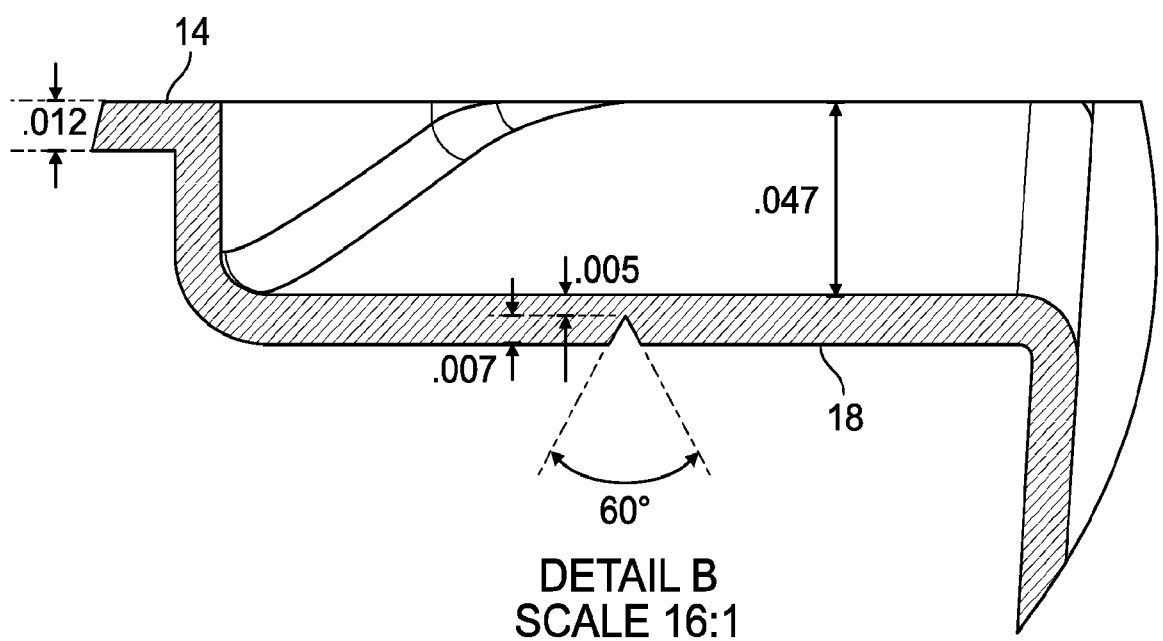

Referring to FIGS. 1A and 1D, in various embodiments, the body 12 can include a recessed portion 18 that extends from the internal volume 13. The recessed portion 18 can include the channel 16. In various embodiments, the channel can be integrally formed with the recessed portion 18. In some embodiments, the body 12 can include multiple recessed portions 18. The recessed portions 18 can serve as gripping aids or simply provide aesthetic design. In such embodiments, at least one of the recessed portions 18 can include the channel 16.

In various embodiments, multiple channels 16 can be provided in fluid communication with the internal volume 13. For example, channels 16 can be provided at opposed corners of the container 10 to allow for ease of use whether the individual is right-handed or left-handed. Alternatively, multiple channels 16 or a single channel 16 having multiple outlets can be provided in a single location of the body 12 such that multiple outlets are provided for dispensing the product. This can be advantageous for some products, for example, highly viscous products or where it is desired to quickly dispense a relatively large volume of the product, or to generate a patterned spread.

Referring to FIG. 1B, the container 10 further includes a top flange 14 surrounding the top surface 20 of the body 12. As illustrated in FIG. 1A, the top flange 14 borders the channel 16. The top flange 14 provides a surface to which a lid 50 can be sealed to seal the internal volume 13. In various embodiments, the top flange 14 can have a substantially planar surface to which the lid 50 can be sealed. The top flange 14 can have any suitable width. A lid 50 can be sealed to the top flange 14 using any suitable methods, including heat sealing, ultrasonic sealing, and application of an adhesive. Other known methods of attaching a lidding material to a container for sealing the contents of a container are also contemplated herein.

Figure 6A:
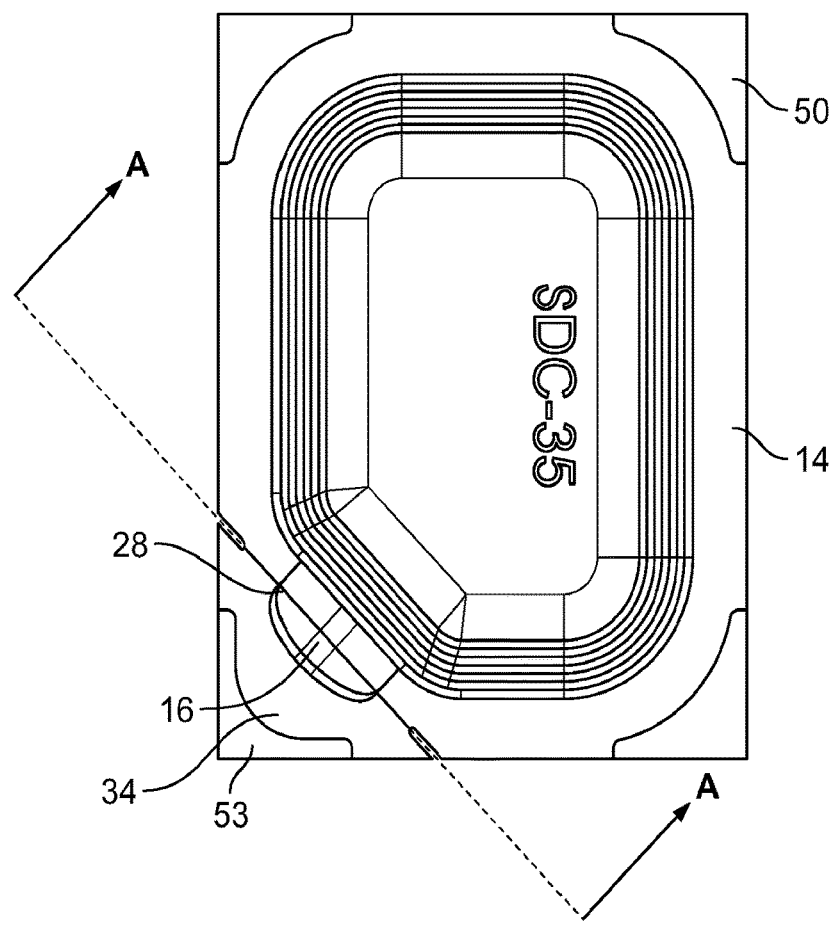
FIG. 6A is a bottom view of a container in accordance with an embodiment of the disclosure.

The container 10 further includes a removable portion 34 that is removed by the user to expose an end 17 of the channel 16 and allow product to be dispensed through the channel. The removable portion 34 can be defined by a removal line 28 formed in the top flange 14, the body 12, and/or recess portion 18 when present. The removal line 28 extends across the channel 16 such that the portion 19 of the body 12 sealing the end 17 of the channel is removed along with portions of the top flange 14. The removal line 28 can be disposed in any surface of the top flange 14 and the body 12. For example, FIG. 6A illustrates a bottom view of the container 10, showing the removal line 28 with a third portion 32 defined in the bottom surface of the top flange 14 and recessed portion 18. Since the third portion 32 of the removal line has less than 100% penetration, it can only be viewed from the bottom when formed in the bottom surface. FIGS. 1B (top view) and 1F (bottom view) illustrate how a line of reduced strength having less than 100% penetration formed in the bottom surface can only be viewed from the bottom. The removal line 28 can be formed in either the top or bottom surface or a combination thereof. For example, the removal line 28 can have multiple portions having less than 100% penetration with some of the lines of reduced strength portions being formed in the top surface and some being formed in the bottom surface. In embodiments in which the removal line 28 includes cut-through portion, the cut through portions can be formed through either a top surface or a bottom surface. The resulting cut-through portion 30 is visible from any surface of the container because the material is cut 100% through.

Figure 6B:
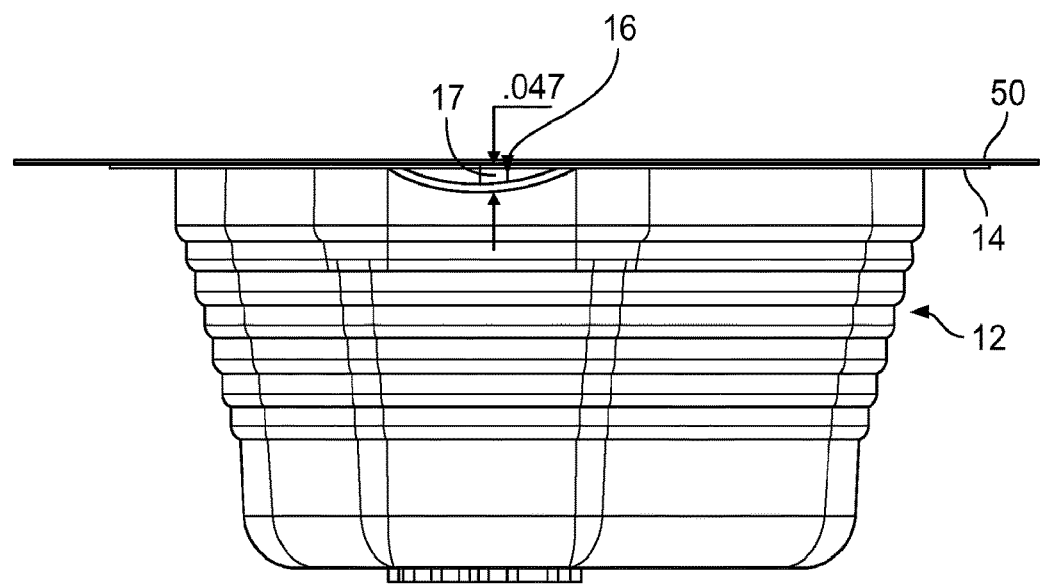
FIG. 6B is a section view through section A-A of FIG. 6A, illustrating the container having the removal portion removed.

FIG. 6A illustrates a bottom view of a container 10 in which the removable portion 34 is intact. FIG. 6B shows the container 10 of FIG. 6A through section A-A, and illustrates the container when the removable portion 34 is removed along the removal line 28. As discussed in detail below, the removable portion 34 can include a portion of the lid attached thereto, and removal of the removable portion 34 can also include removal of that portion of the lid. The removable portion 34 can be disposed in any location of the container 10. By way of example only, the containers 10 of the figures are shown with a removable portion 34 disposed in the corner of the container. Other locations are also contemplated herein. For example, the removable portion 34 can be located along a side wall of the container 10 or can be provided as an extension from the side wall of the container 10.

As can be seen in FIG. 6B, when the removable portion 34 is removed, the end 17 of the channel 16 is exposed, thereby allowing the product to be dispensed from the container 10 through the channel 16. For example, the product can be dispensed by applying a force to the container 10 to force the product through the channel 16. For example, a squeeze force can be used.

The removal line 28 is formed by one or more lines of reduced strength. As used herein, the term "line of reduced strength" refers to perforations and/or continuous lines having a defined percent penetration through the material. Perforations include cut openings that penetrate through a percentage or entirely through the material and bridges that connect the cut openings. Continuous lines can either penetrate less than 100% through the material or entirely (100% penetration) through the material. For example, in an embodiment, the removal line 28 is a line of reduced strength that is a continuous line having less than 100% penetration through the material so that the container remains sealed until the removable portion 34 is removed along the removal line. For example, suitable percent cut openings of perforations or percent penetration of continuous lines, commonly referred to herein as "percent penetration," include about 50% to about 99%, about 60% to about 95%, about 55% to about 80%, about 70% to about 99%, about 75% to about 90%. The percent penetration can be for example about 50, 52, 54, 56, 58, 60, 62, 64, 68, 70, 72, 74, 76, 78, 80, 82, 84, 86, 88, 90, 91, 92, 93, 94, 95, 96, 97, 98, 99, and less than 100%. In embodiments in which the container is formed as a multilayer structure, less than 100% penetration through the cup material can be achieved, for example, by lines of reduced strength penetrating through only a portion of the layers making up the cup material. For example, in a film sheet having the structure of Foil-PE-PET-Heat Seal Coating, the less than 100% penetration can be achieved by penetrating only through the PET and the heat seal coating, leaving the PE and foil layers intact.

Referring to FIGS. 1B and 1C, in an embodiment, the removal line 28 can include cut-through portions 30 disposed on opposed sides of a central, third portion 32. The cut-through portions 30 can be lines of reduced strength having 100% penetration through the material such that the material is entirely cut through. The cut-through portions 30 can extend inwardly from opposed first and second edges 36, 38 of the removable portion 34. The cut-through portions can facilitate tearing along the removal line 28 by providing a tear initiation point. The cut-through portions 30 can extend any suitable distance inwardly from the first and second edges 36, 38, so long as the cut-through portions 30 do not extend across the channel 16. Referring to FIG. 1C, the third portion 32 includes a line of reduced strength that has less than 100% penetration or percent cut openings through the material. The third portion 32 crosses the channel 16. By utilizing lines of reduced strength with less than 100% penetration in the third portion 32, the channel 16 can remain sealed until the removable portion 34 is removed.

In an alternative embodiment, the removal line 28 can be provided as a line of reduced strength that has less than 100% penetration across the entire removal line 28. The line of reduced strength can have a uniform penetration percentage across the entire removal line 28 or can have a variable penetration percentage across the entire removal line 28. For example, in an embodiment, the removal line can have portions disposed near the first and second edges 36, 38 that have increased percent penetration through the material as compared to a portion of the removal line 28 disposed across the channel 16.

The user can remove the removable portion 34 using any suitable motion, including, for example, tearing, snapping, pulling, and twisting. With conventional containers 10, the squeeze spouts can be difficult to expose by tearing or twisting. Users often find themselves squeezing the containers when attempting to remove the tear-off or twist-off regions, which disadvantageously results in squirting of product from the container during opening. This is often messy and unpleasant for the user. Embodiments of containers of the disclosure, particularly where a relatively thick or more rigid material is utilized, can include the cut-through portions 30 to facilitate removal of the removable portion 34. The cut-through portions 30 can provide initiation regions for tearing or twisting of the material, which can aid the user in removing the portion, without having to apply significant force. The ease of opening can reduce or avoid the problem of users unintentionally applying a force to the body 12 of the container 10 during opening and the resulting unintended dispensing of the product during opening.

Figure 5A:
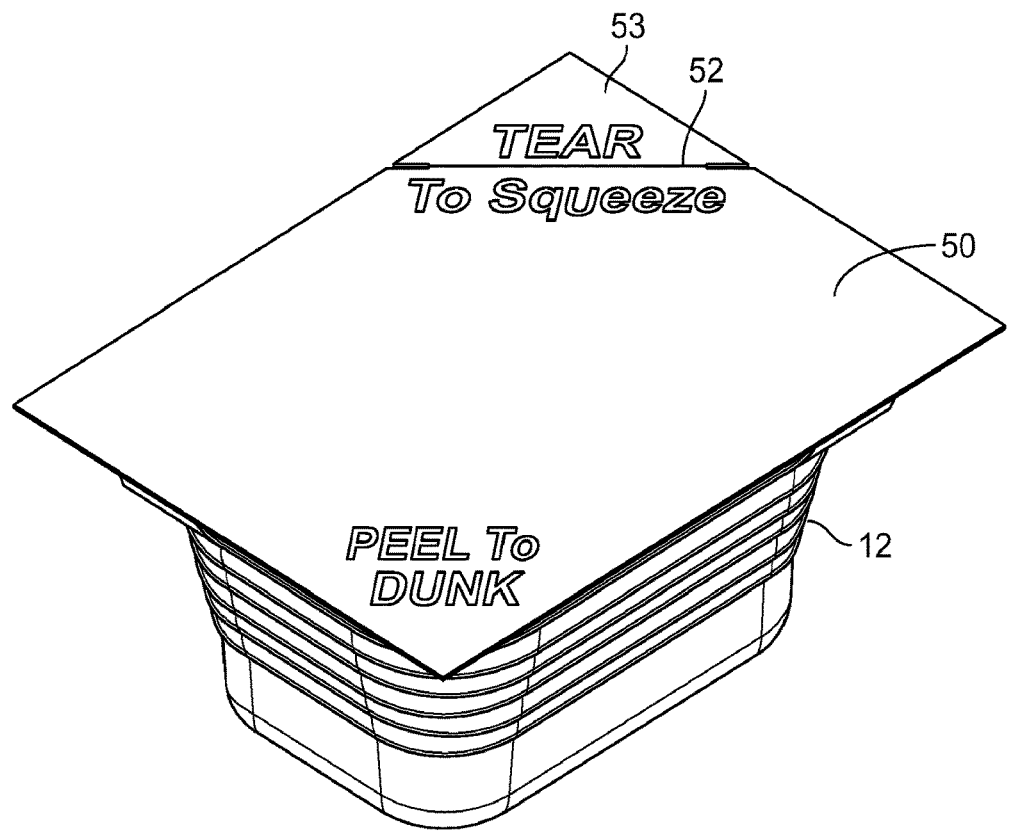
FIGS. 5A-5E are various vies of a sealed container in accordance with an embodiment of the disclosure.

As noted above, the container 10 is sealed by a lid 50. Referring to FIG. 5A, a lid 50 is attached to the top flange to seal the container to prevent product from being dispensed from the container. When the lid 50 is completely sealed to the top flange 14 around the entire perimeter of the container 10, the container 10 is closed and product is not capable of being dispensed. The lid 50 can be formed of or include any suitable material. In various embodiments, the lid 50 is a flexible material. The lidding material can have a layered structure, a laminate structure, or be a monolayer. Exemplary types of materials or layers that can be included in the lidding material include polyesters, polyethylenes, polystyrenes, foils, unoriented materials, biaxially oriented materials, and combinations thereof. For example, the lidding material can include PET, APET, OPET, MET-PET, PE, LDPE, LLDPE, mLLDPE, HDPE, MDPE, mPE, EVA, PLA, PP, MET-OPP, PS, HIPS, foil, EVOH, and combination thereof. In an embodiment, the lidding sheet is a laminate structure of foil-PE-PET- and a heat seal coating. A heat seal coating can be used in any of the materials disclosed herein. The lid material can include coatings, for example, heat sealable coatings, printing layers, and any suitable additives depending on the product to be contained, as known in the art.

The lidding material can be fully oriented, partially oriented, or unoriented. In some embodiments, the lidding material is an oriented material. The material can be oriented in a direction to facilitate removal of a portion of the lid 50 with removable portion 34 to expose the channel. For example, in an embodiment, the removable portion 34 is a corner of the container and removed along a 45° angle. The material can be oriented at 45° in such embodiments to facilitate removal of the lid to expose the channel 16. In some embodiments, the entire lidding material can be oriented. In other embodiments, the lidding material can be locally oriented in the region of the removable portion to facilitate removal.

Figure 5B:
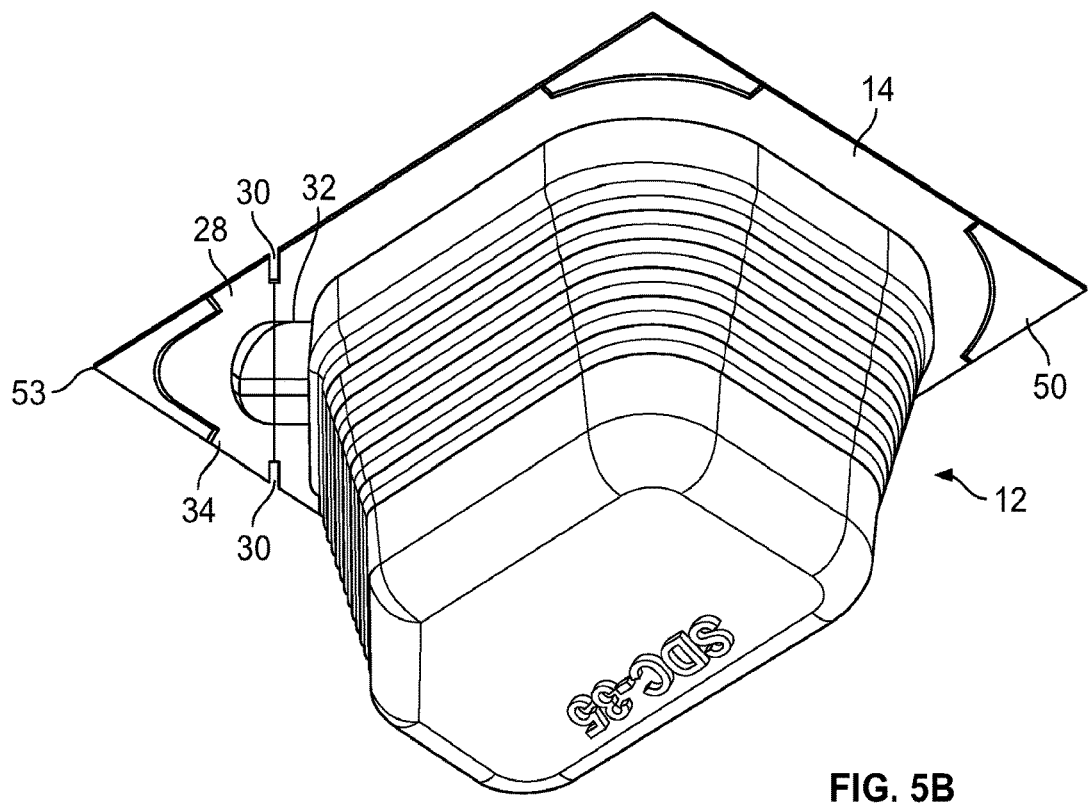
Figure 5C:
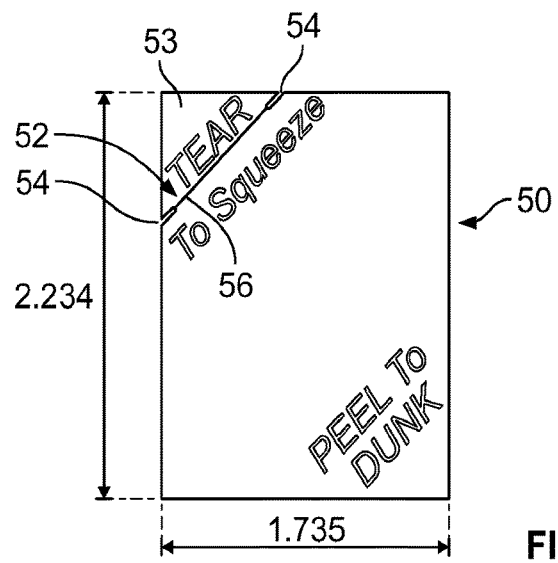
Figure 5D:
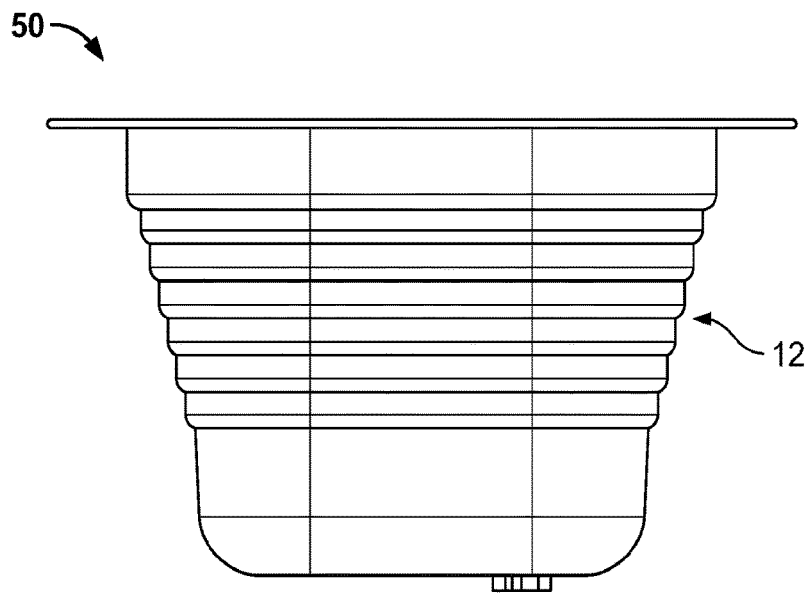
Figure 5E:
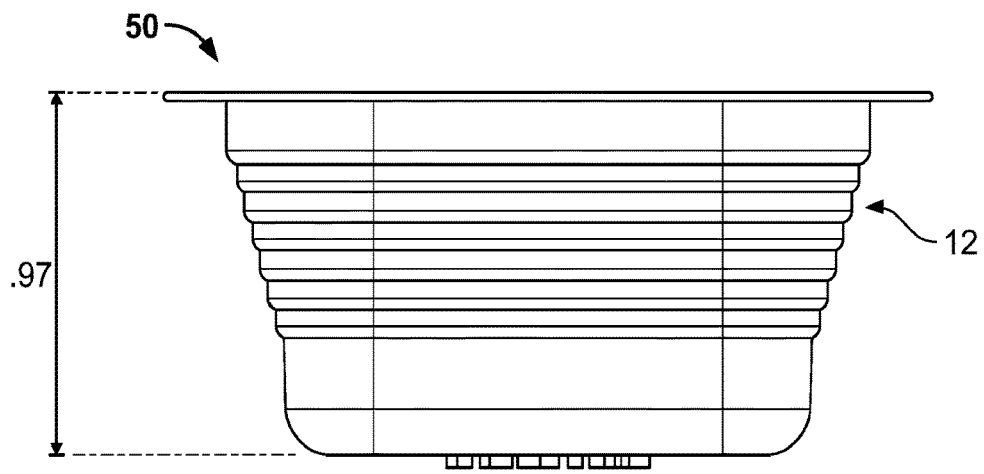

The container 10 can be opened, for example, by removing a portion 57 of the lid 50 from the top flange 14 and exposing the internal volume 13. For example, the lid 50 can be peeled away from the top flange 14. Referring to FIG. 5B, in various embodiments, the lid 50 can extend past one or more edges or corners of the top flange 14 to provide an unsealed gripping portion on the lid 50 to facilitate removal of the lid 50 from the top flange 14 to expose the internal volume 13.

Referring to FIG. 5A, the lid 50 can include a line of reduced strength 52 defining a removable portion 53 that is removed with the removable portion 34 of the body 12 and top flange 14. The removable portion 53 of the lid 50 can be sealed to the top flange 14 in the removable portion 34. The line of reduced strength 52 of the lid 50 can be disposed in line with the removal line 28 to facilitate removal of the lid removable portion 53 with body removable portion 34.

As discussed above with respect to the body removable portion 34, the line of reduced strength 52 in the lid 50 can have a percent penetration through the material and can be provided as a continuous line or perforations. The lid line of reduced strength 52 can, for example, be a continuous line having less than 100% penetration across the removable portion 53 of the lid. The continuous line can have uniform or variable percent penetration, as discussed above with respect to the removable portion 34 of the body. The lid line of reduced strength 52 can also be provided having cut portions 54 disposed on opposed sides of a third portion 56. The cut portions 54 can be arranged in line with the cut portions 30 of the removal line 28 and can similarly have 100% penetration. The third portion 56 of the lid line of reduced strength 52 can be aligned with the third portion 32 of the removal line 28 and have less than 100% penetration through the material. In various embodiments in which the lid material is a multilayer structure, the lid line of reduced strength 52 can be formed having less than 100% penetration by extending through less than the entirety of the layers. For example, the lid can have a foil layer as one of the exterior layers of a multilayer structure and the lid line of reduced strength 52 can be formed to penetrate through all of the layers except the foil layer.

As discussed above with respect to the removal line 28, the line of reduced strength 52 in the lid can be defined in a top or bottom surface of the lid. For example, FIG. 5A illustrates a line of reduced strength 52 having a portion with less than 100% penetration defined in a top surface of the lid material. Forming the line of reduced strength or at least a portion thereof with less than 100% penetration in the top surface of the lid material can be advantageous in providing a user with a visual clue as to where the removable portions 34, 52 are to be removed. However, formation of the line of reduced strength in either the top or bottom surface, or a combination thereof as discussed for the removal line 28 are contemplated herein.

The removable portion of the lid 50 can remain attached to the top flange in the removable portion 34 of the body when they are both removed, such that removal occurs in a single step.

In an alternative embodiment, the lid 50 can be shaped such that it covers the top surface of the channel 16 to seal the channel when the container 10 is closed, but does not extend onto the removable portion 34 of the body 12. In such an embodiment, the removable portion 34 of the body can be removed, leaving the lid 50 intact without any portion of the lid 50 being attached to and removed with the removable portion 34. The channel end 17 would be exposed by removal of the removable portion 34.

In yet another embodiment, the lid 50 can be attached to the top flange 14 in the removable portion 34 with reduced peel strength such that upon removal of the removable portion 34 along the removal line 28, the removable portion 34 peels away from the lid 50, again leaving the lid substantially intact with the remaining portion of the body while the end 17 of the channel 16 is exposed.

In accordance with embodiments of the disclosure, the containers 10 can be formed as a sheet of containers 10, referred to herein as a container assembly 100. Conventional cup forming, filling, and sealing equipment accommodates such sheets of containers. The container assemblies 100 of the disclosure are arranged such that they can advantageously be processed using conventional equipment. In some embodiments, conventional equipment can be utilized to form the containers with minor modification, such as the inclusion of an apparatus as disclosed herein to form the removal line 28.

Figure 7:
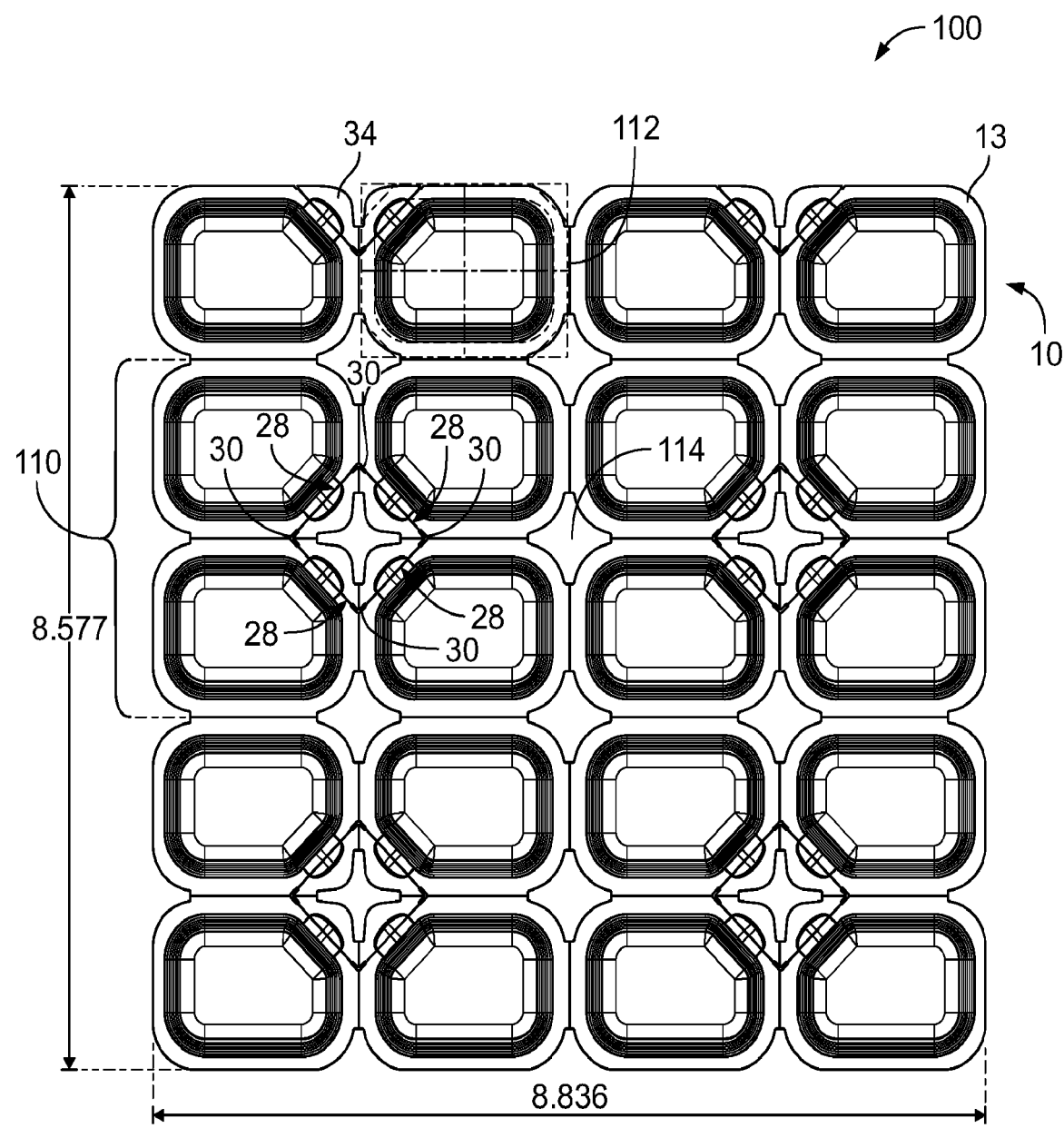
FIG. 7 is a container assembly in accordance with an embodiment of the disclosure in which the containers are arranged as mirror images.

Referring to FIG. 7, a container assembly 100 can include a plurality of containers 10, with each container 10 attached to an adjacent container 10 along at least one edge 112. It should be understood herein that in the container assembly and lidding material figures, the lines showing the rows and columns, which identify the separated containers and/or lids, are illustrative and not necessarily defined lines within the material. Instead, such lines illustrate where the container assembly 100 and/or lidding material would be separated to provide individual containers and lids. Adjacent containers 10 can be joined by at least two edges, at least three edges, at least 4 edges, or more depending on the shape of the container 10. Depending on the arrangement of the containers 10, containers 10 in the container assembly 100 can have different numbers of attached edges. For example, containers 10 in the center of the container assembly 100 can be joined to adjacent containers 10 on each of the edges, while containers 10 at the perimeter of the container assembly 100 can be joined by less than all of the edges, for example two edges or three edges. The container assembly 100 can include the containers arranged in columns and rows. Each column and each row can include any suitable number of containers 10. For example, the container assembly 100 can be a 4×4 array of containers or a 5×4 array of containers or 6×4 array of containers or a 5×5 array of containers, or any other suitable number. The number of containers 10 in each column and row can be determined by the size of the containers 10. For example, the size in terms of container assembly 100 and consequently the number of containers 10 in the rows and columns can be configured to allow for use of existing equipment, which can accommodate sheets of containers of a predetermined size.

In an embodiment, the container assembly 100 can include the containers 10 arranged in a predetermined patterned. For example, referring to FIG. 7, the containers 10 can be arranged such that they are mirror images of adjacent containers 10. In the embodiment of FIG. 7, the removable portion 34 is disposed in a corner of each container 10. With the removable portion 34 being disposed in the corner of each container 10, the predetermined pattern in which the containers 10 are mirror images of adjacent containers 10 can result in groupings 110 of four containers 10 in which the removable portions 34 are disposed in the center of the grouping 110. In such an arrangement, the container assembly 100 can advantageously have the removal line 28 defined in each of the containers 10 of the grouping 110 as a shaped feature. For example, a shaped line of reduced strength having a diamond shape can be formed in a single operation, thereby defining the removal lines 28 in each of the containers of the grouping 110. In another embodiment, the removal lines 28 can each include cut portions 30 and a third portion 32. As shown in FIG. 7, for example, the container assembly may include a number of containers in a column and/or row that results in some groupings having less containers than other groupings. For example, in FIG. 7, as a result of the number of containers in the column, the top row of containers is in a grouping of two and has a half diamond shaped line of reduced strength for the group, whereas the other containers are provided in groupings of four with a full diamond shaped line of reduced strength. The cut portions 30 of the groupings can be connected, such that the third portions 32 and connected cut portions 30 result in a continuous line of reduced strength shape. The line of reduced strength shape can have any suitable shape and size depending on the size of the containers and the removal lines 28 to be formed.

Figure 8:
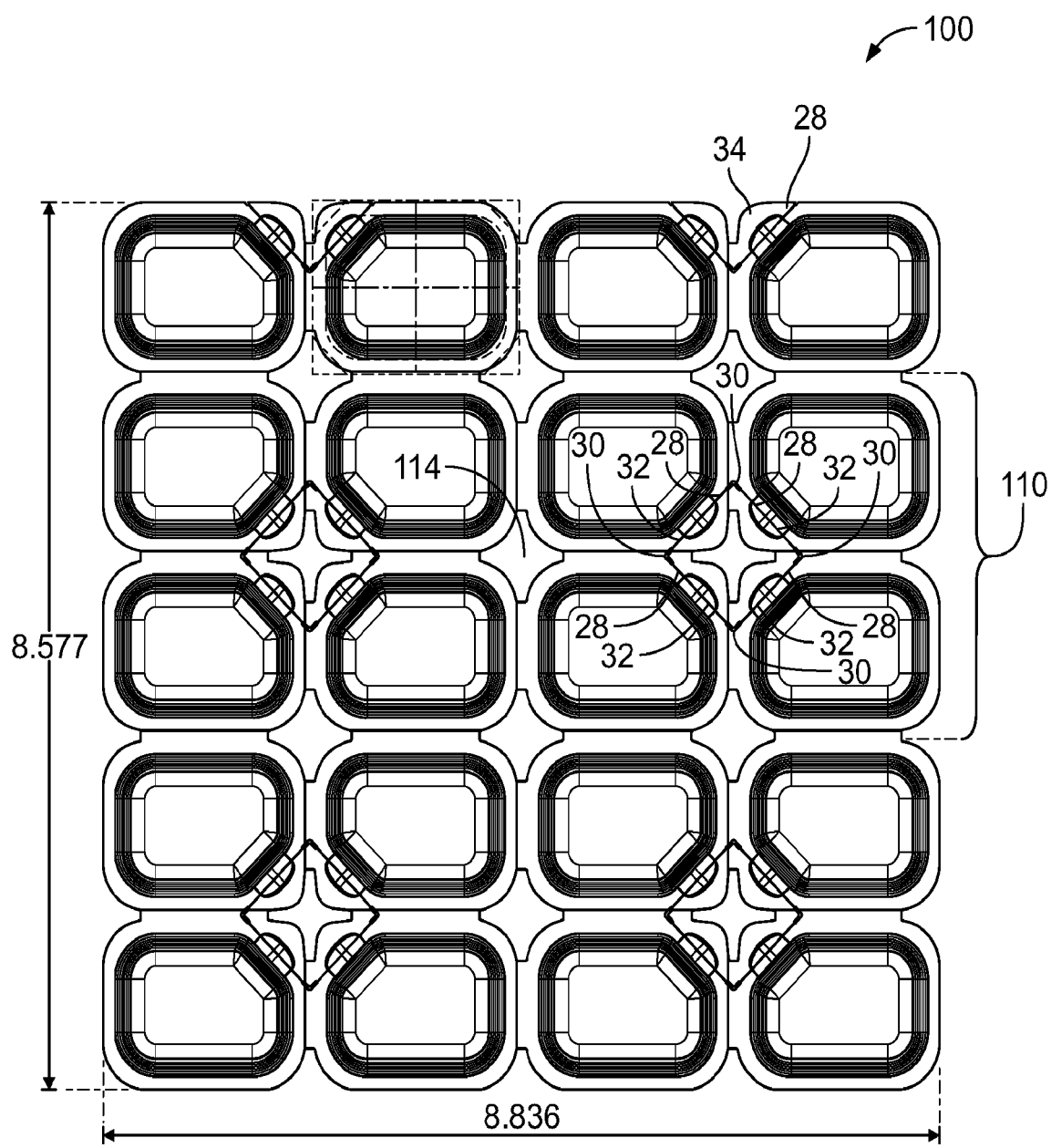
FIG. 8 is a container assembly in accordance with an embodiment of the disclosure in which the containers are arranged as mirror images.

Use of the line of reduced strength shape can improve the tolerance in forming the removal lines 28 in each container and account for shifting of the sheet material as it passes through the machine utilized for forming, filling, and sealing the container. For example, as shown in FIG. 8, unintentional shifting of the sheet before or as it enters the step of forming the removal lines 28 can result in the removal lines 28 being offset from their intended position. By connecting the lines of reduced strength in the grouping 110 of containers 10, each container 10 is ensured to have a complete removal line 28 formed to define the removable portion 34 regardless of the shifting. Without connection of the lines of reduced strength, the shifting illustrated in FIG. 8 could result in portions of the removal line 28 not having reduced strength in one or more of the containers 10.

Throughout the process of making the container assemblies, there are various machine offsets that can occur simply by virtue of the tolerances available with such machines. For example, slight offset between the registration of the cutting apparatus and the film or container assembly can result in some shifting of the lines of reduced strength formed in either the container or the lid. Additionally, offset can occur when aligning the lidstock material onto the container assemblies. To further accommodate these offsets and machine tolerances, in some embodiments, additional lines of reduced strength of shaped lines of reduced strength in groupings, can be formed at an offset distance from the original line of reduced strength or shaped lined or reduced strength. Original line of reduced strength refers to the line of reduced strength intended to be formed in the center position assuming no offset or misalignment resulting from equipment tolerances. Any number of offset lines of reduced strength or shaped lines of reduced strength can be formed as desired and depending on the process equipment being used. The offset lines of reduced strength or shaped lines of reduced strength can be formed in one or both of the lidding material and the container assembly. For example, the one or more offset lines of reduced strength can be spaced about 0.01 to about 0.1 inches, about 0.01 to about 0.05 inches, about 0.05 to about 0.1 inches, about 0.01 to about 0.07 inches, or about 0.02 to about 0.1 inches from the original line of reduced strength or shaped lined or reduced strength. Other suitable distances can include about 0, 0.01, 0.02, 0.03, 0.04, 0.05, 0.06, 0.07, 0.08, 0.09, 0.1 inches. The line of reduced strength can be spaced inbound or outbound of the original or adjacent line of reduced strength. In some embodiments, when adding an offset shaped line of reduced strength, the offset shaped line of reduced strength can have a portion that is offset inward and a portion that offset outward of the original or adjacent line of reduced strength. In other embodiments, the offset shaped line of reduced strength can be offset entirely inward or entirely outward of the original or adjacent shaped line of reduced strength. FIG. 25 illustrates an example of a pattern of lines of reduced strength that includes an original diamond shaped line of reduced strength 300 and two outwardly spaced offset lines of reduced strength 302, and 304. The offset score lines can have the same scoring percentage and/or be the same type of line of reduced strength. Alternatively, the offset score lines have differences in the lines of reduced strength. For example, the cut-through porting in an offset score line can be larger if desired than the original score cut-through portion in the original (centered) line of reduced strength.

The formation of the line of reduced strength shape to define multiple removal lines simultaneously in the grouping 110 of containers can be combined, for example, with other steps of forming the container assembly 100, such as for example star punch 114 between containers. Star punching between containers is known in the art and any known methods and equipment can be used. Other shapes than star are also contemplated herein depending on the shape of the containers. This can advantageously allow for use of existing star (or other shaped) punching equipment with minor modification to include a die or laser cutter that forms the line of reduced strength shape around the star (or other shape). It is also contemplated herein that the formation of the removal lines 28 occurs separate from any star punching or other trimming operations. In any of the embodiments disclosed herein, lines of reduced strength can be formed using laser scoring, which can be used to both score and burn through to generate 100% penetration. In an embodiment, the container assembly 100 is mechanically scored to form the removal line 28 and the lidding sheet is laser scored. In an embodiment, the laser scoring can be performed on the final material—either for the containers or for the lids. For example, where the material of either the container or the lid is a laminate or layered structure, the laser scoring can be performed on the fully assembled structure. For example, in an embodiment the lidding includes a laminate of a foil and a film structure having a heat seal coating. The laser scoring can be performed on the laminate structure. In other embodiments, the laser scoring can be performed in one or more intermediate structures or on individual layers. For example, in the example lidding material above, the laser scoring can be done on the film structure before lamination to the foil.

In yet another example, the film structure without a heat seal coating can be laser scored, then laminated to the foil, and then heat seal coated. It can be advantageous in some embodiments depending, for example, on the contents of the container to apply a coating such as a heat seal coating or other known coatings after the laser scoring or other means of forming the line of reduced is performed in order to fill the score lines with the coating material. This can aid in protecting the material from the contents of the container without impeding the opening function of along the removal line.

Figure 9:
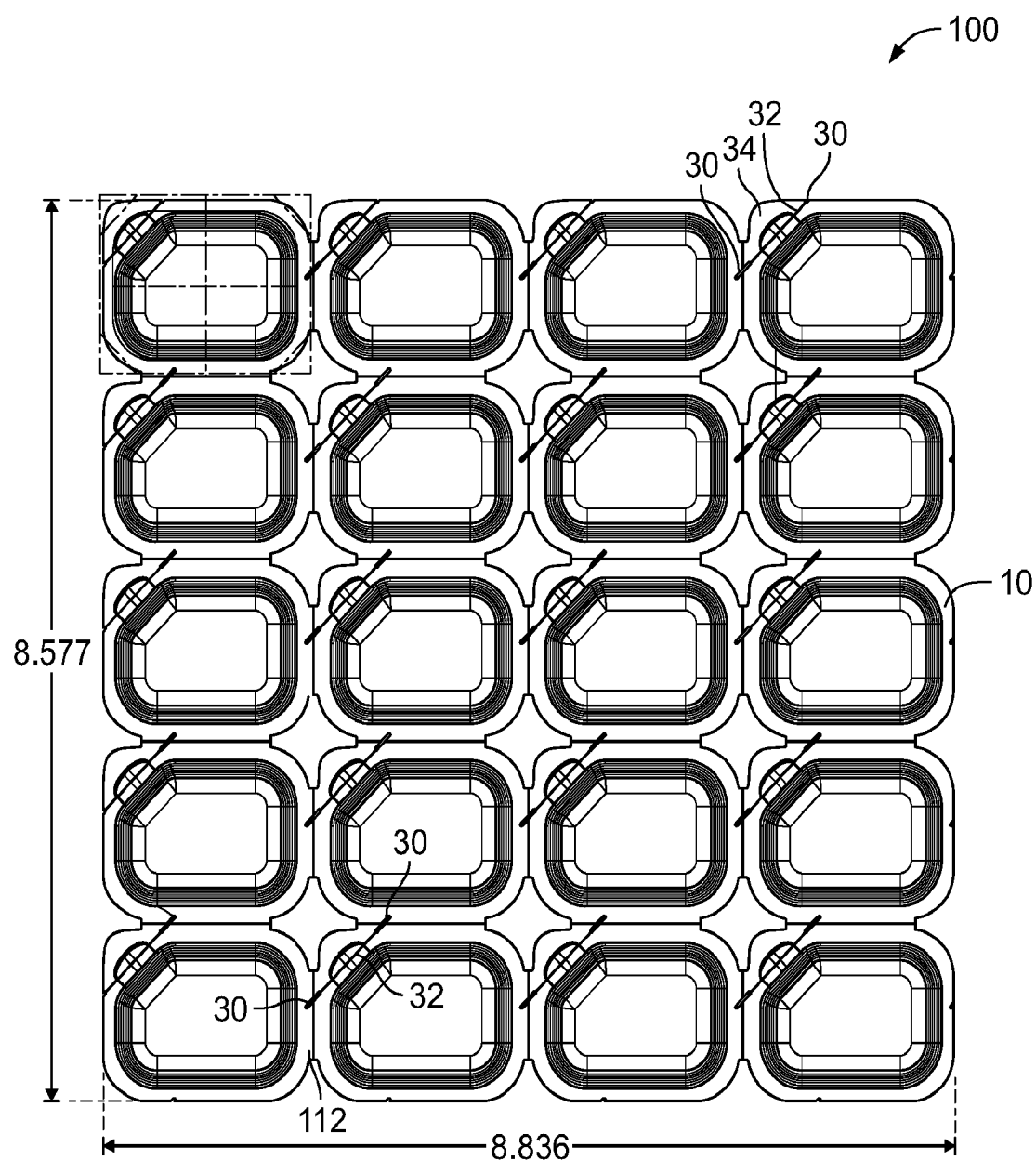
FIG. 9 is a container assembly in accordance with an embodiment of the disclosure in which the containers are patterned to be in the same orientation.

In another embodiment, the containers 10 of the container assembly 100 can be arranged in a predetermined pattern in which each of the containers 10 has the same orientation. For example, as illustrated in FIG. 9, the containers 10 can each include a corner-positioned removable portion 34 and each container 10 can be arranged such that the removable portion 34 is in the same corner of that of the adjacent container 10. The removal line 28 of each container 10 can be formed to extend past the boundary 112 between adjacent containers 10 and partially extend into the top flange 14 of the adjacent containers 10. This can improve the tolerance of the process in accommodating for shifting of the sheet during processing and ensuring that a complete removal line 28 having reduced strength is formed from the first edge 36 to the second edge 38 of the removable portion 34. In embodiments in which the removable portion 34 includes cut portions 30, the cut portions 30 can be extended outwardly from the edges 36, 38 to extend over the boundary 112 between adjacent containers 10 to provide for this improved tolerance and ensure that each removal line 28 is provided with a cut portion 30 starting at the edges of the removable portion 34. Without such extension 37 of the cut portions 30, shifting of the sheet could result in a cut portion 30 being formed inward of the edge 36, 38 and not starting from the edge 36, 38. In some embodiments, this can make the container 10 more difficult to open.

The outward extension 37 line of reduced strength that crosses the boundary112 between adjacent containers 10 can also be utilized where a continuous line of reduced strength having uniform or variable penetration is utilized for forming the removal line 28. As described above with the cut portions 30, this extension 37 when utilizing a continuous line of reduced strength can also improve the manufacturing tolerance, accommodating shifting of the sheet material during processing.

Figure 14A:
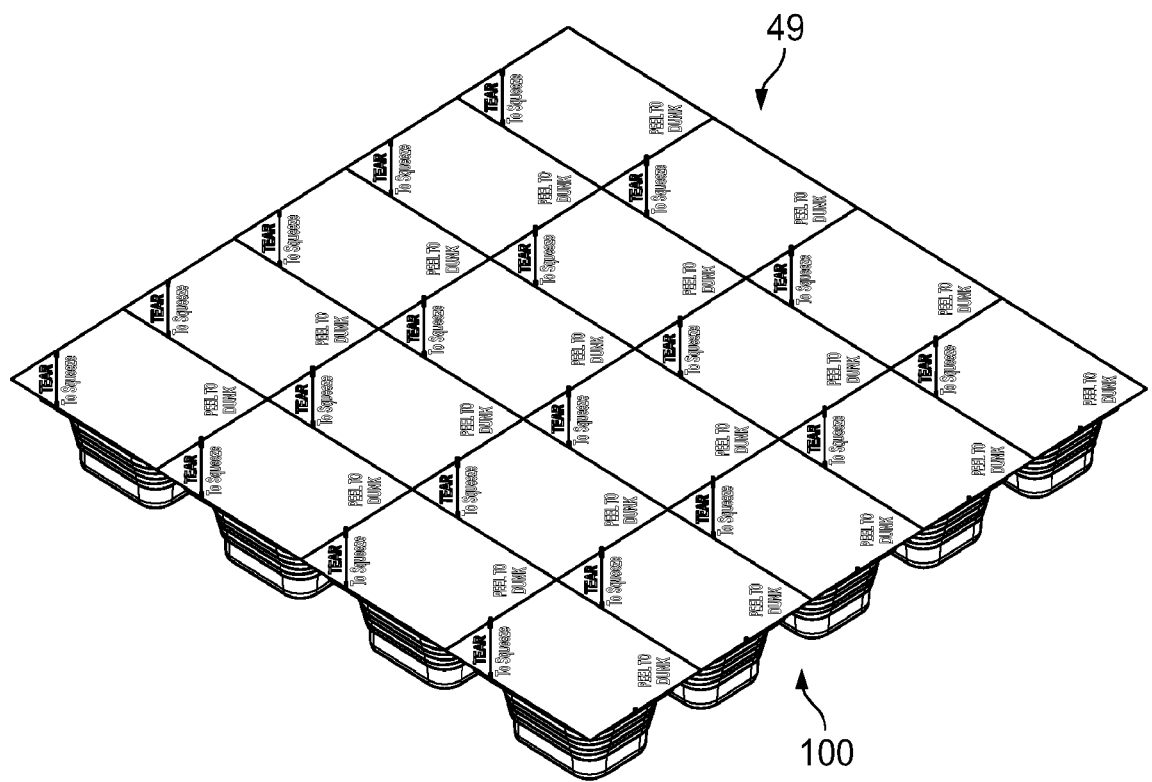
Figure 14B:
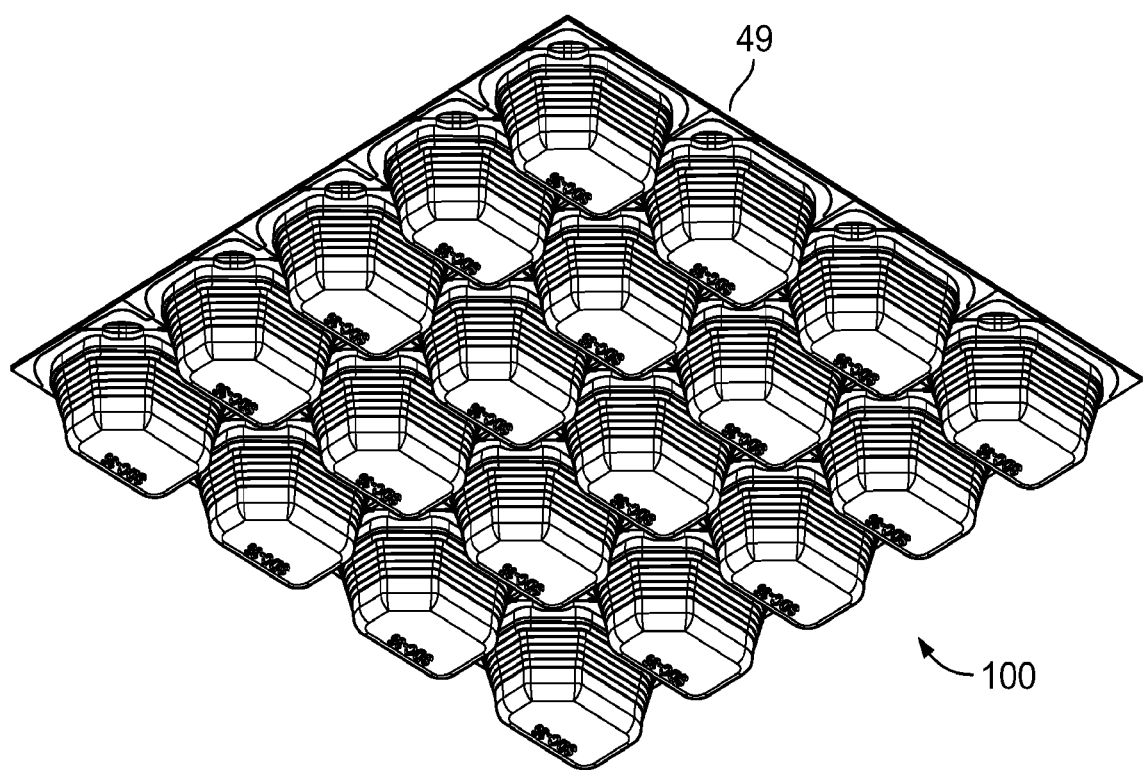
Figure 14C:
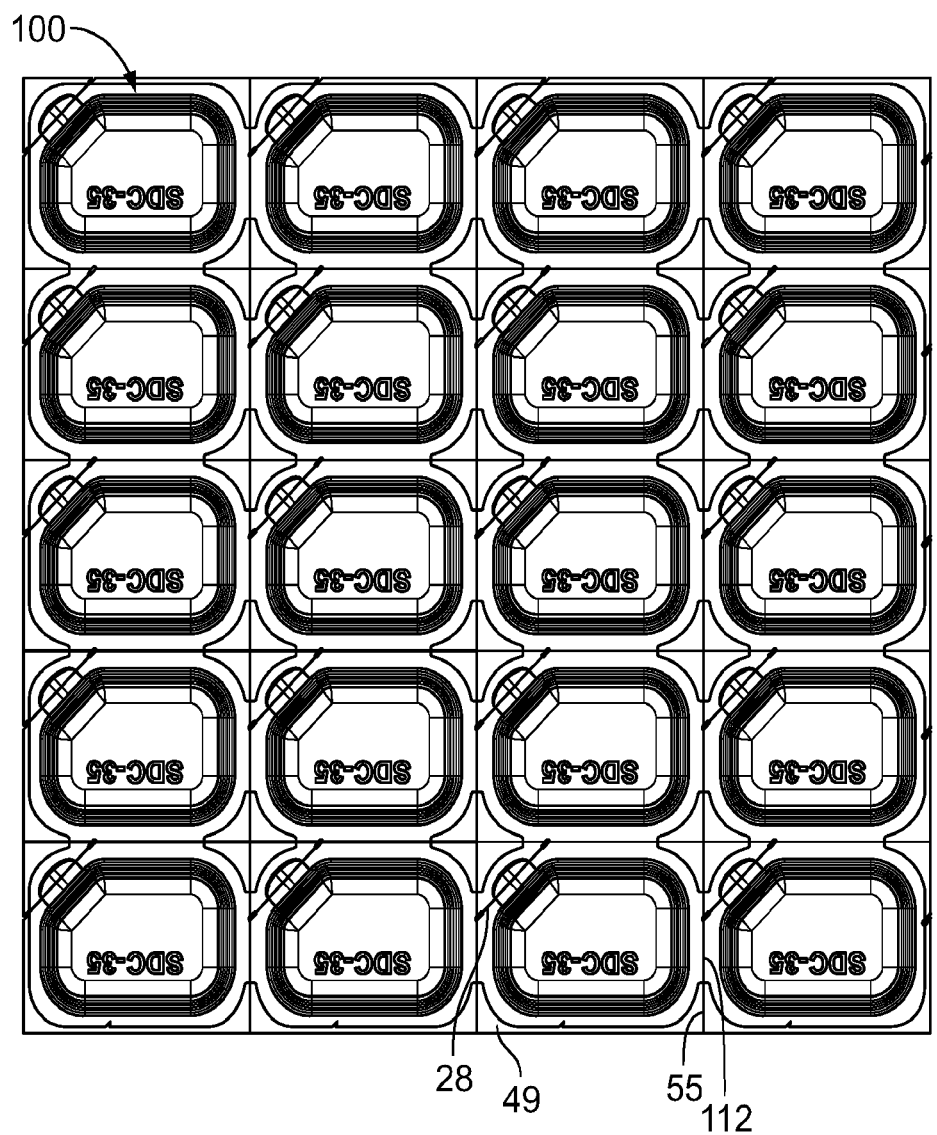
Figure 15A:
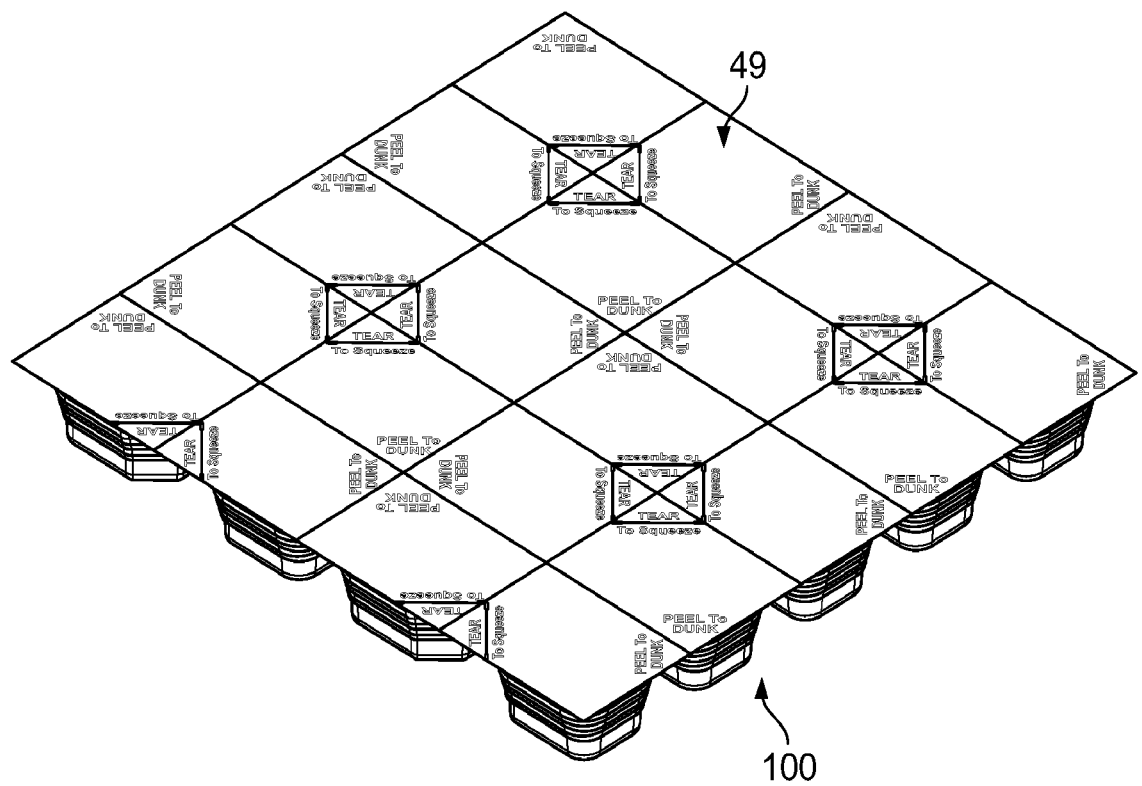
Figure 15B:
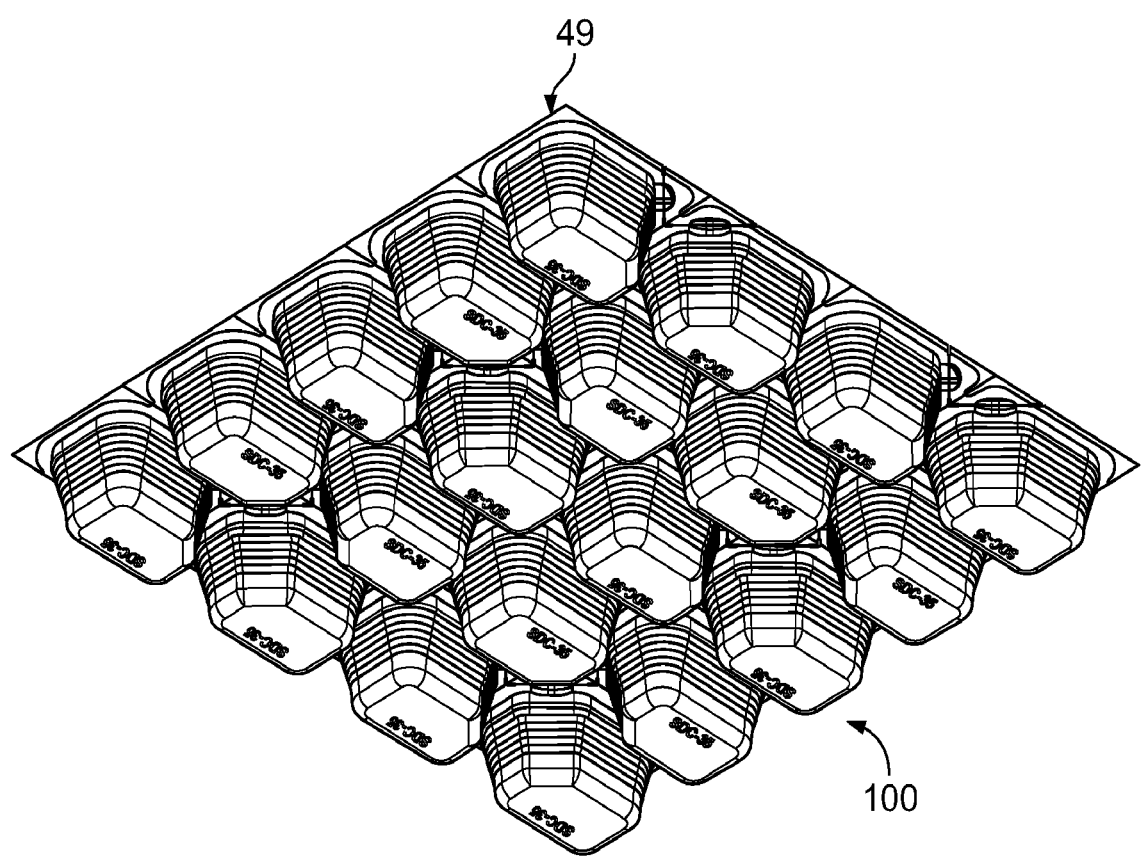
Figure 15C:
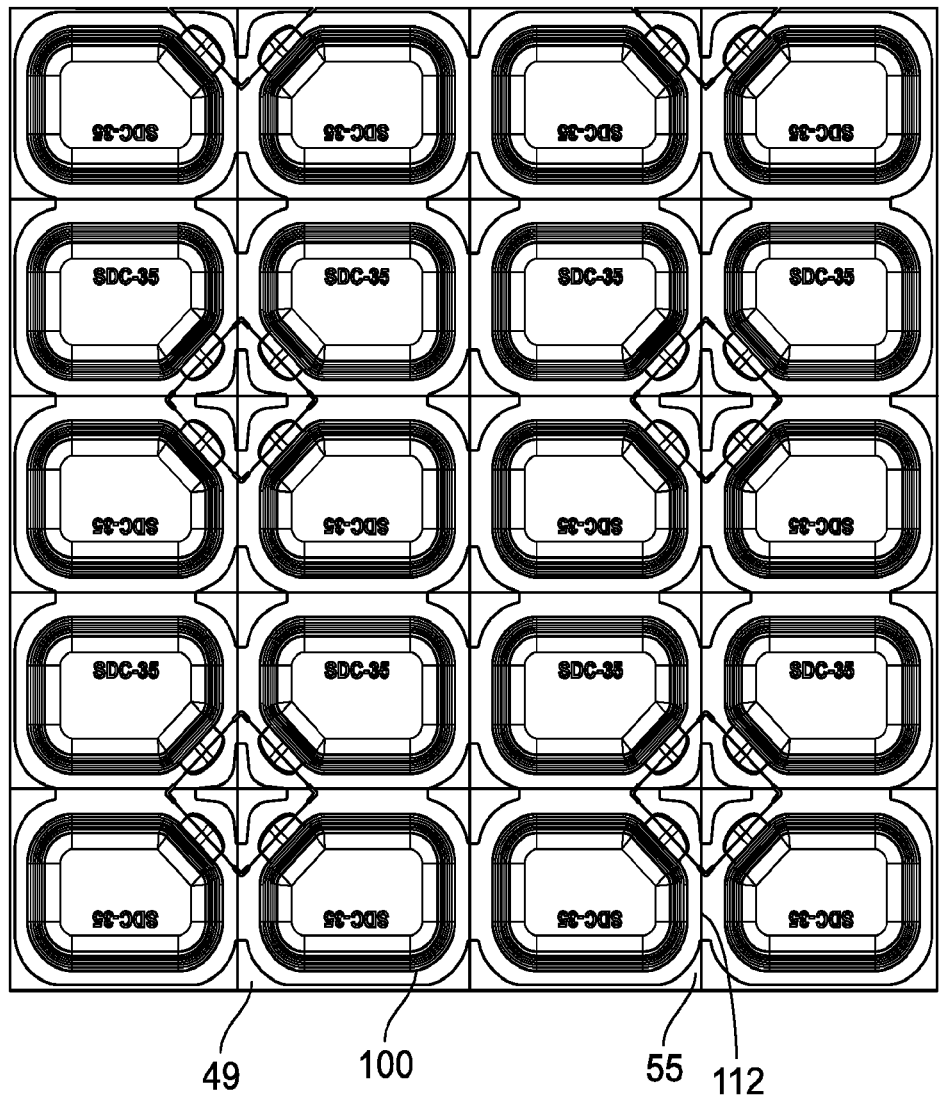

In any of the foregoing embodiments, the extensions 37, whether part of cut portions 30 of a line of reduced strength having less than 100% penetration, can have any suitable size and angle. For example, referring to FIG. 14C, the extensions 37 can be substantially straight extensions from the ends of the removal line 28. In another embodiment, extensions 37 can be angled relative to the removal line 28.

Figure 10:
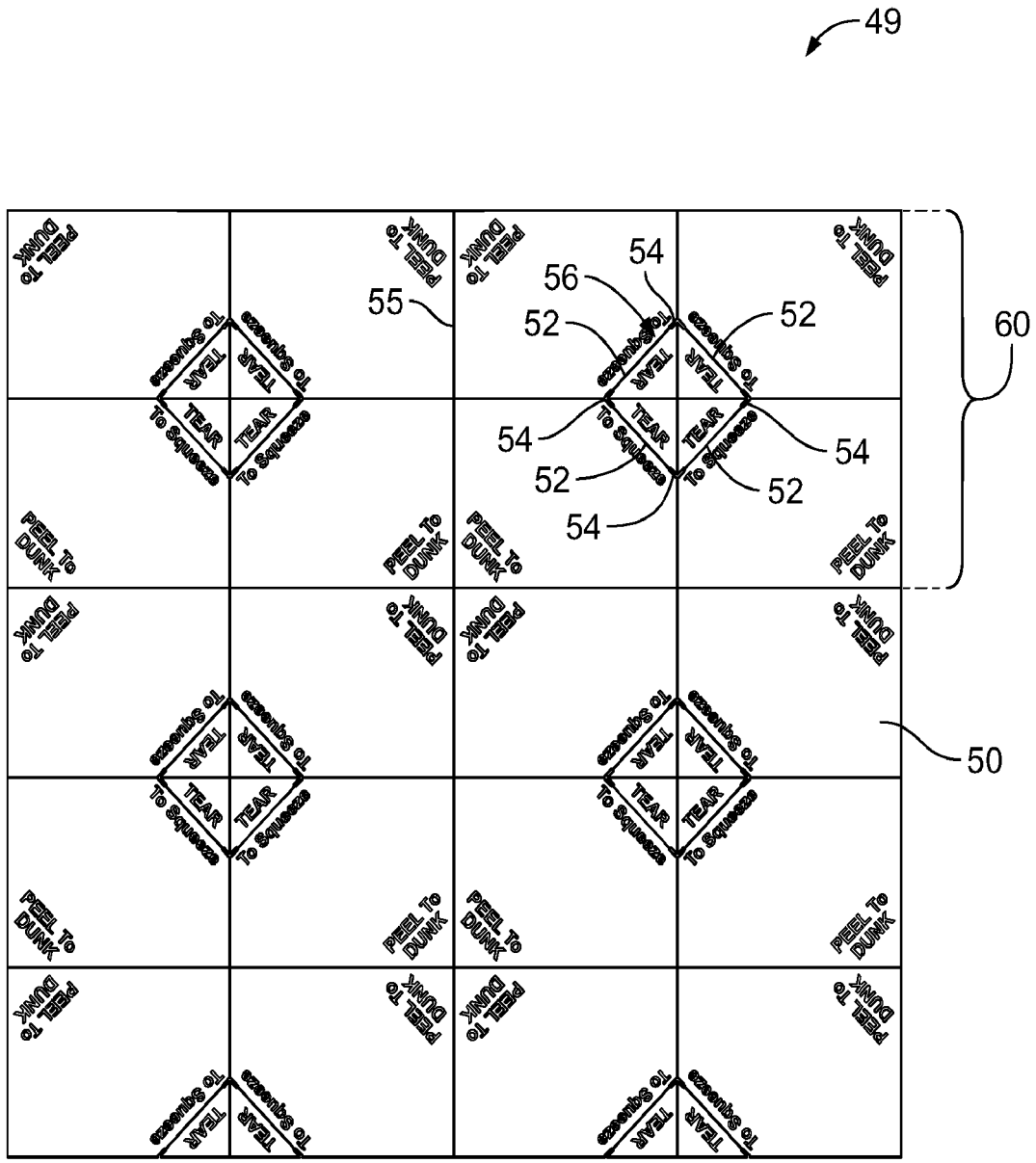
FIG. 10 is a lidding sheet in accordance with an embodiment of the disclosure having a shaped line of reduced strength.

Referring to FIG. 10, a lidding sheet 49 can include a plurality of lids 50 each connected along at least one edge 51. Adjacent lids 50 can be joined by at least two edges, at least three edges, at least 4 edges, or more depending on the shape of the lid 50. Depending on the arrangement of the lids, lids in the lidding sheet 49 can have different numbers of attached edges. For example, lids in the center of the lidding sheet 49 can be joined to adjacent lids on each of the edges, while lids at the perimeter of the lidding sheet 49 can be joined by less than all of the edges, for example two edges or three edges. The lines of reduced strength 52 defining the lid removable portion 53 can be formed as described above with respect to the container assembly 100. The lidding sheet 49 can include the lids 50 arranged in columns and rows. Each column and each row can include any suitable number of lids and can correspond to the number of containers 10 in the column and rows of the container assembly 100 to which the lidding sheet 49 is to be sealed. For example, the container assembly 100 and the lidding sheet 49 can be a 4×4 array of containers and lids or a 5×4 array of containers and lids or a 6×4 array of containers and lids, or a 5×5 array of containers and lids, or any other suitable number. The number of lids 50 in each column and row can be determined by the size of the lids 50. For example, the size in terms of lidding sheet 49 and consequently the number of lids in the rows and columns can be configured to allow for use of existing equipment. In various embodiments, the lidding material can be provided as a rollstock having a plurality of lids 50 joined to at least one adjacent lid 50. The rollstock can have a number of columns corresponding to the container assembly 100 to which it is to be sealed, but an increased number of rows such that the rollstock material is cut during processing to the size (number of rows) of the container assembly 100. The discussion herein will refer to a lidding sheet 49 for ease of reference, but it should be understood that rollstock can also suitably be used.

Figure 12:
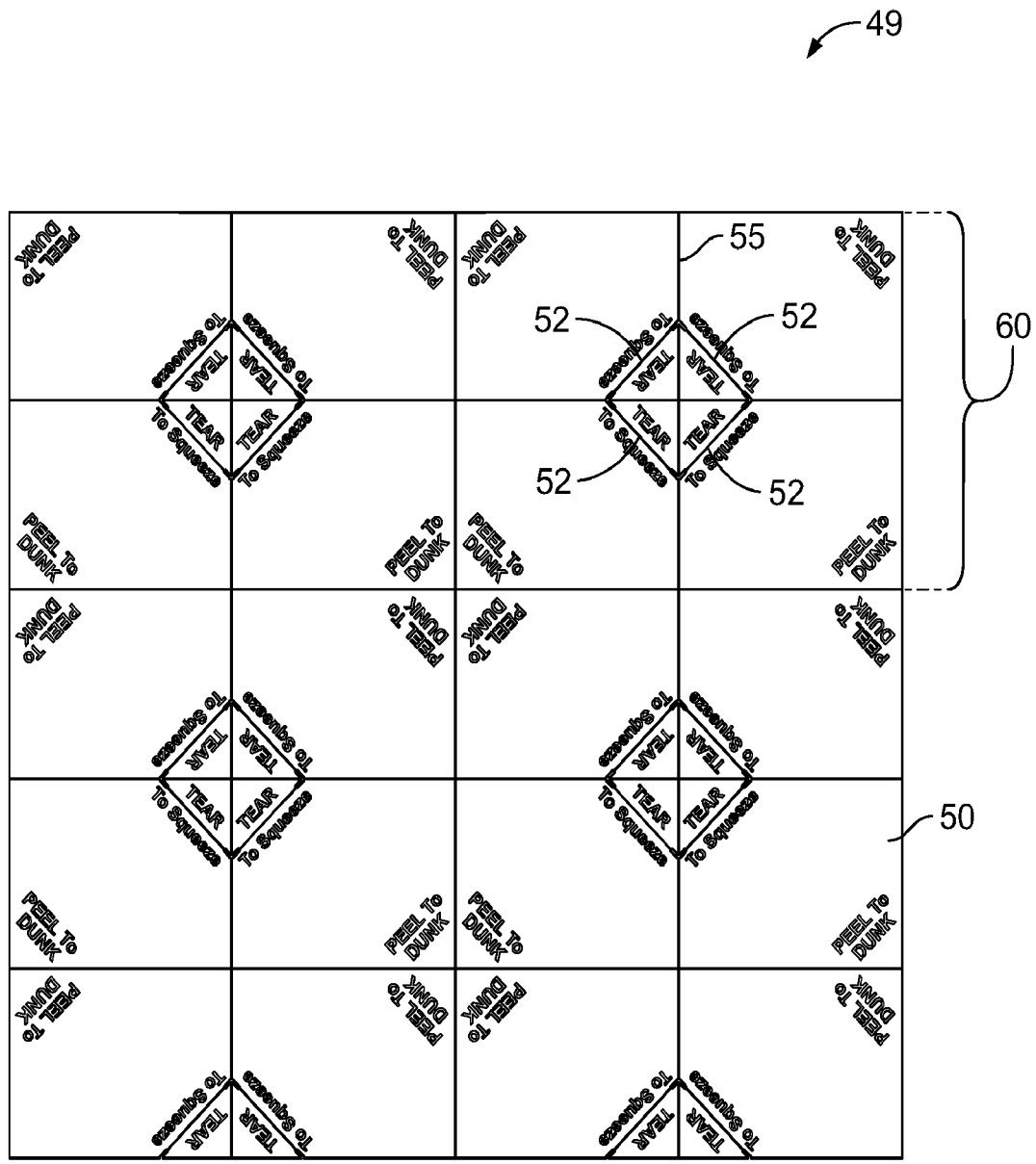
FIG. 12 is a lidding sheet in accordance with an embodiment of the disclosure having a shaped line of reduced strength.
Figure 13A:
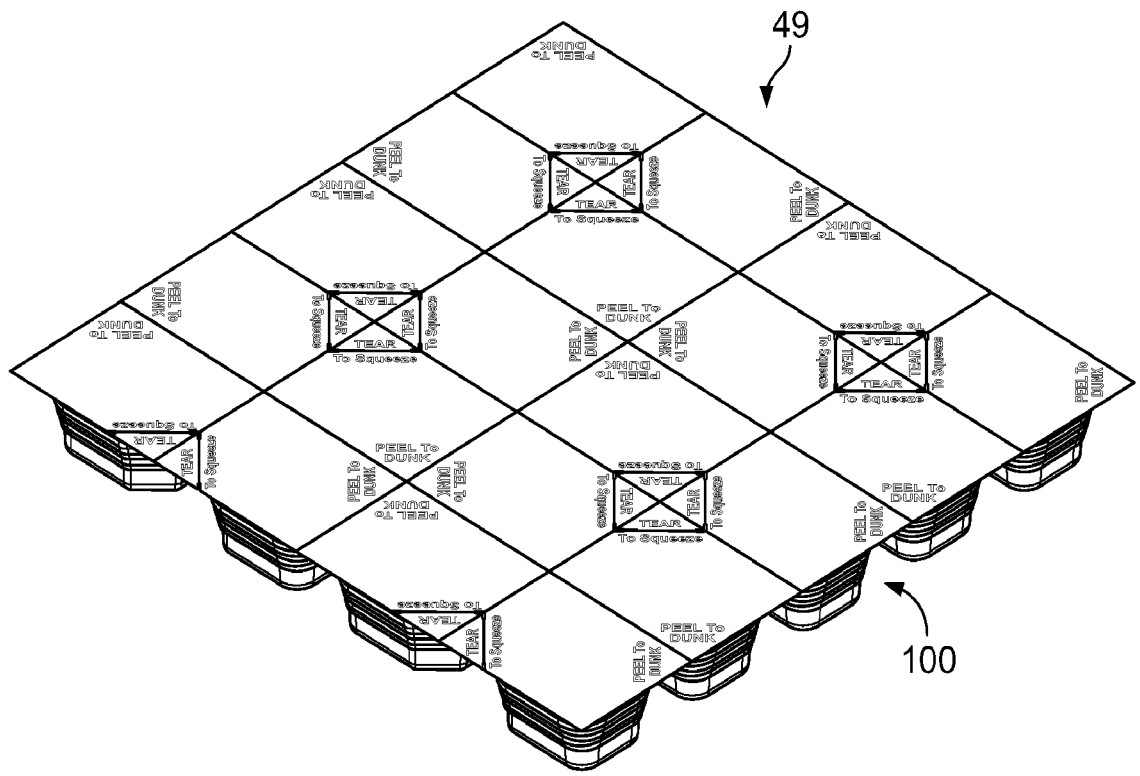
FIGS. 13A-13E are various views of a sealed container assembly having a lidding material attached thereto in accordance with an embodiment of the disclosure.
Figure 13B:
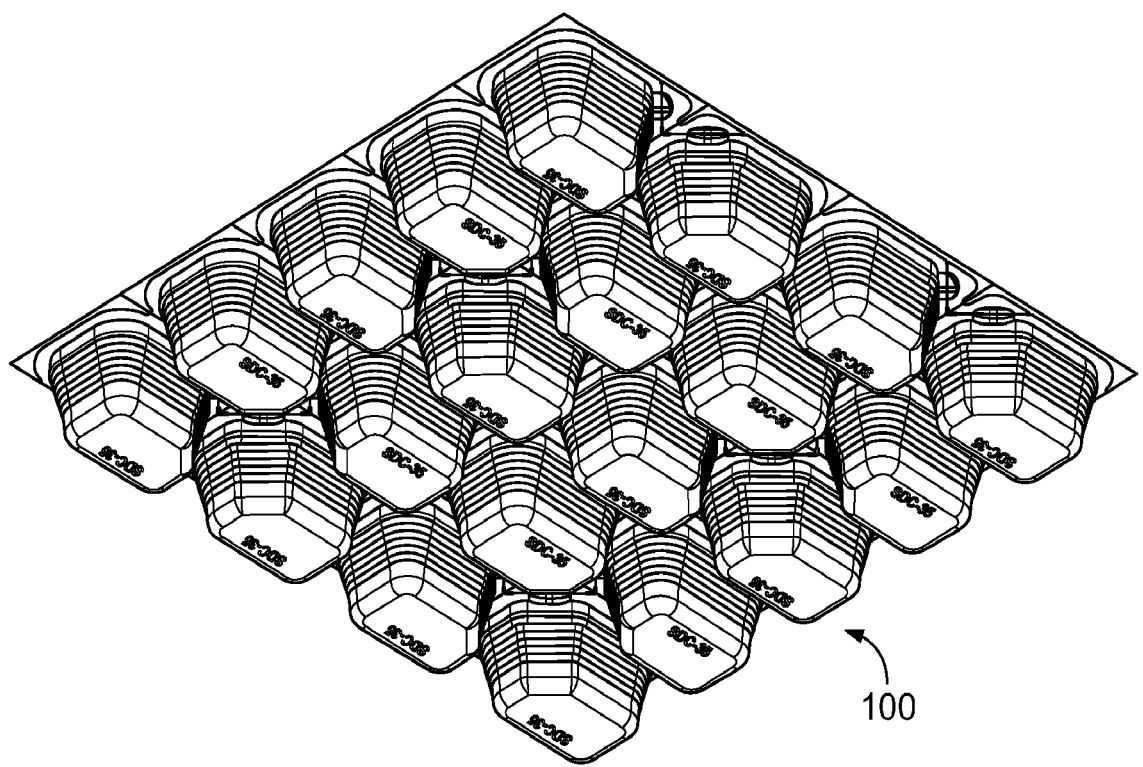
Figure 13C:
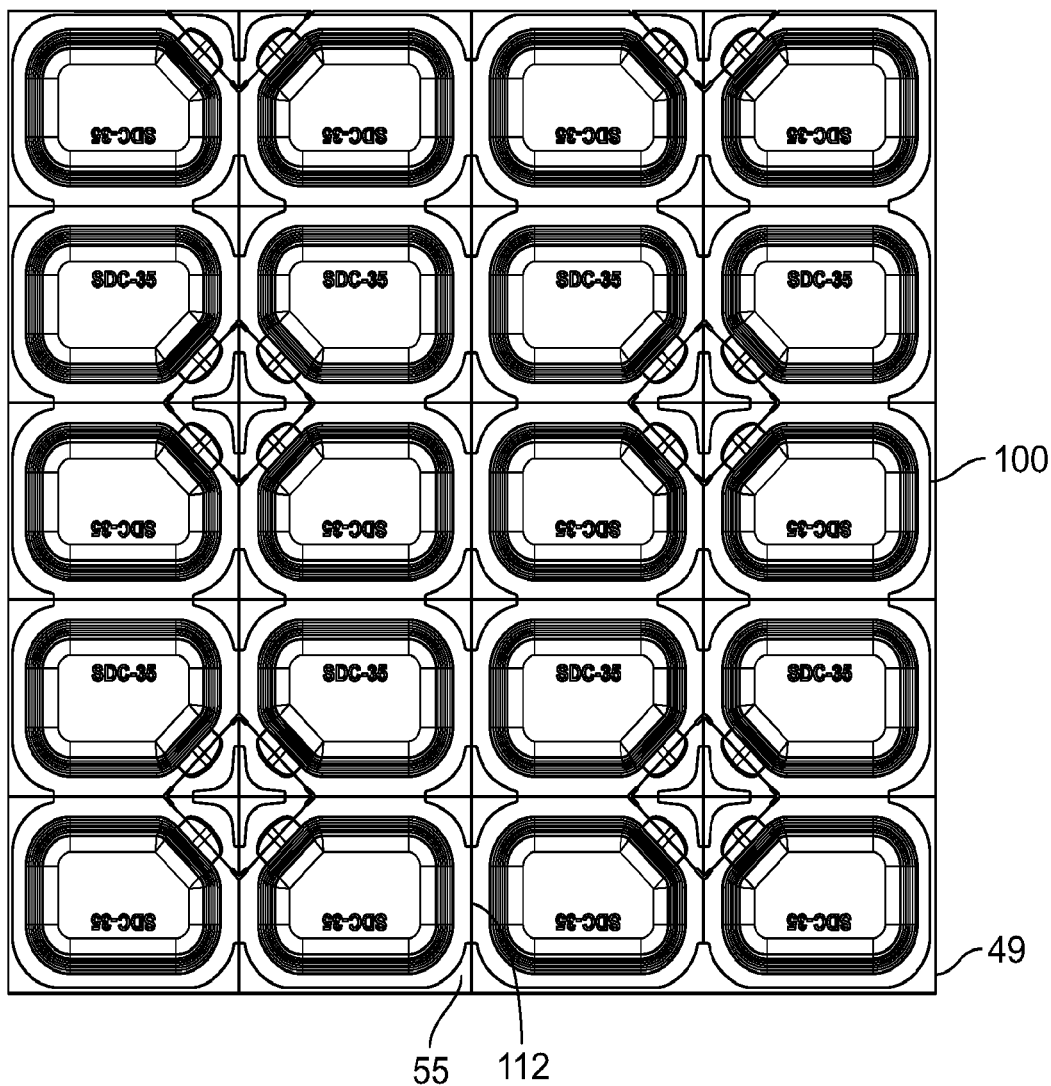
Figure 13D:
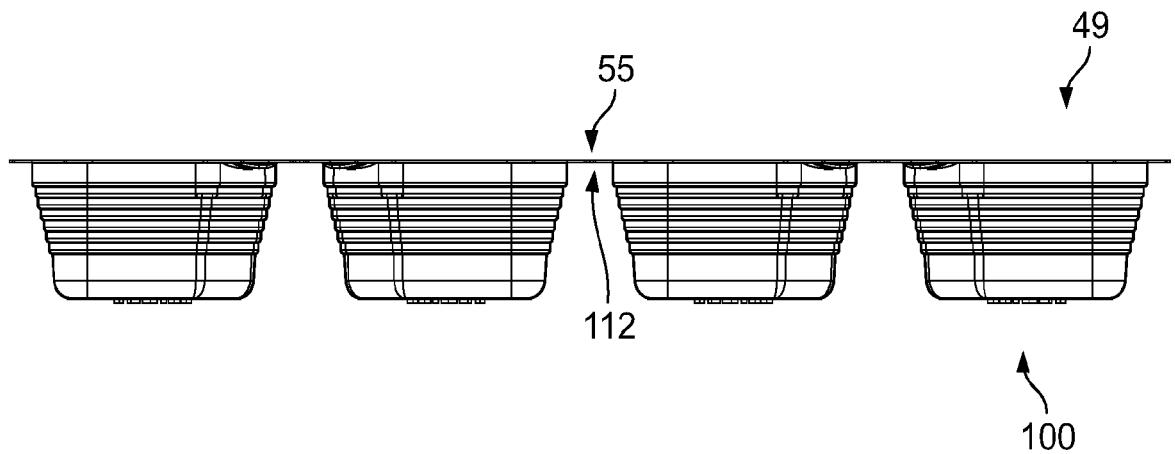
Figure 13E:
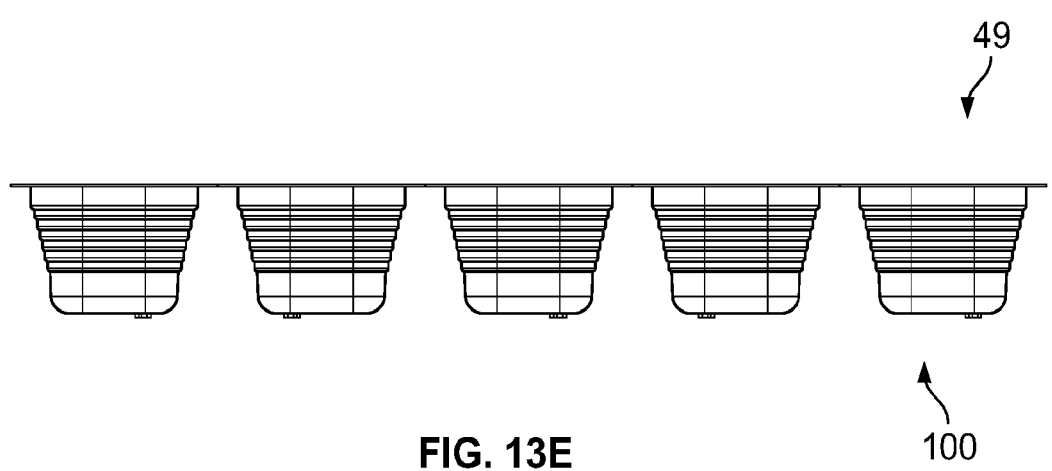

In an embodiment, the lidding sheet 49 can include the lids 50 arranged in a predetermined patterned. For example, referring to FIG. 10, the lids 50 can be arranged such that they are mirror images of adjacent lids 50. In the embodiment of FIG. 10, the removable portion 52 is disposed in a corner of each lid 50. With the removable portion 52 being disposed in the corner of each lid 50, the predetermined pattern in which the lids 50 are mirror images of adjacent lids 50 can result in groupings 60 of four lids 50 in which the removable portions 52 are disposed in the center of the grouping 60. In such an arrangement, the lidding sheet 49 can advantageously have the line of reduced strength 52 defined in each of the lids 50 of the grouping 50 as a continuous feature. For example, a continuous line of reduced strength having a diamond structure can be found in a single operation, thereby defining the line of reduced strength 52 in each of the lids 50 of the grouping 60. In another embodiment, the lines of reduced strength 52 can each include cut portions 54 and a third portion 56. The cut portions 54 of the groupings 60 can be connected, such that the third portions 56 and connected cut portions 54 result in a continuous line of reduced strength shape. The line of reduced strength shape can have any suitable shape and size depending on the size of the lids 50, the location of the removable portion 53, and the lines of reduced strength 52 to be formed. Use of the line of reduced strength shape can improve the tolerance in forming the lines of reduced strength 52 in each lid and account for shifting of the sheet material as it passes through the machine utilized for forming the lidding sheet 49. For example, as shown in FIG. 12, unintentional shifting of the sheet before or as it enters the step of forming the lines of reduced strength 52 can result in the lines of reduced strength 52 being offset from their intended position. By connecting the lines of reduced strength 52 in the grouping 60 of lids 50, each lid is ensured to have a complete line of reduced strength 52 formed to define the removable portion 53 regardless of the shifting. Without connection of the lines of reduced strength, the shifting illustrated in FIG. 12 could result in portions of the line of reduced strength 52 not having reduced strength in one or more of the lids 50 or portions thereof.

Figure 11:
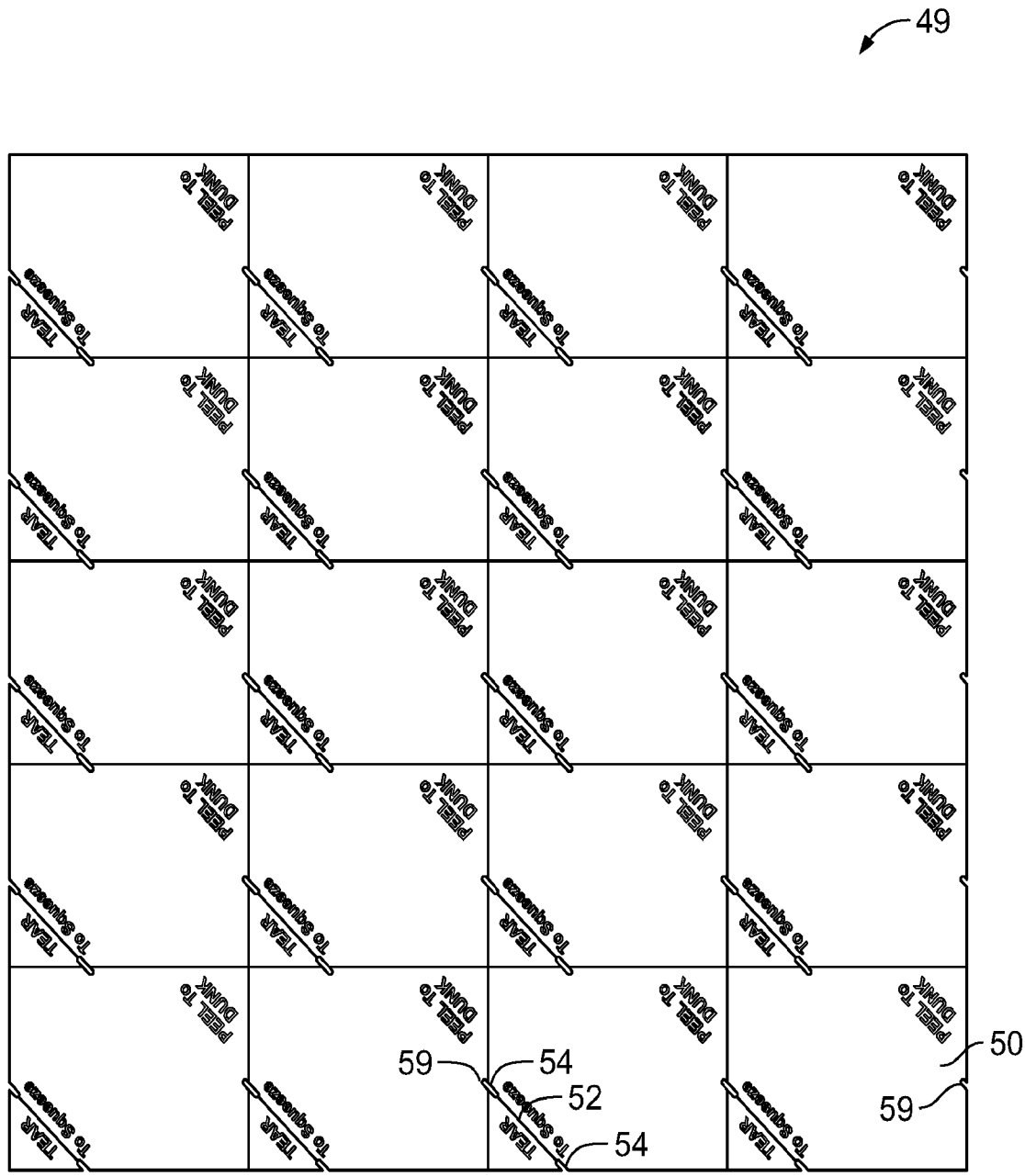
FIG. 11 is a lidding sheet in accordance with an embodiment of the disclosure.

In another embodiment, the lid 50 of the lidding sheet 49 can be arranged in a predetermined pattern in which each of the lids 50 has the same orientation. For example, as illustrated in FIG. 11, the lids 50 can each include a corner-positioned removable portion 53 and each lid 50 can be arranged such that the removable portion 53 is in the same corner as that of the adjacent lid 50. The line of reduced strength 52 of each container 10 can be formed to extend past the boundary 55 between adjacent lids 50. This can improve the tolerance of the process in accommodating for shifting of the sheet during processing and ensuring that a complete line of reduced strength 52 is formed from the first edge to the second edge of the removable portion 53. In embodiments in which the removable portion 53 includes cut portions 54, the cut portions 54 can be extended outwardly from the edges to extend over the boundary 55 between adjacent lids 50 to provide for this improved tolerance and ensure that each line of reduced strength 52 is provided with a cut portion 54 starting at the edges of the removable portion 53. Without such over-extended cut portions 54, shifting of the sheet could result in a cut portion being formed inward of the edge and not starting from the edge. In some embodiments, this can make the lid removable portion 53 more difficult to remove.

The outward extension 59 line of reduced strength that crosses the boundary 55 between adjacent lids 50 can also be utilized where a continuous line of reduced strength having uniform or variable penetration is utilized for forming the line of reduced strength 52. As described above with the cut portions 54, this extension 59 when utilizing a continuous line of reduced strength can also improve the manufacturing tolerance, accommodating shifting of the sheet material during processing.

In any of the foregoing embodiments, the extensions 59, whether part of cut portions 54 or a line of reduced strength having less than 100% penetration, can have any suitable size and angle. For example, referring to FIG. 12, the extensions 59 can be substantially straight extensions from the ends of the line of reduced strength 52 defining the lid removable portion 53. In another embodiment, extensions 59 can be angled relative to the line of reduced strength 52.

As also discussed above with respect the to container assembly 100, the line of reduced strength 52 of the lid 50 can have uniform or variable percent penetration. Any of the percent penetration or perforations described above with respect to the container 10 can be utilized in connection with the line of reduced strength 52 in the lid 50.

The container cup-like shapes in the container assembly 100 can be formed by various methods, including thermoforming, as is known in the art. Once thermoformed the container assembly 100 can then be processed for formation of the removal lines 28. Alternatively, in some embodiments, the removal line 28 can be formed during the thermoforming process by incorporation of a knife within the thermoform mold. The knife or other such cutting tool can be an actuated or unactuated tool within the mold. Any of the embodiments discussed herein with respect to formulation of the removal line 28 and shaped removal lines in the container assembly should be understood herein to also be formable during the thermoforming process by incorporation of suitable tooling in the thermoforming mold. Once the removal lines 28 are formed, the containers 10 can be filled with product using conventional filling equipment and the lidding material 49 can be sealed to the container assembly 100 as is known in the art. The sealed container assembly can then be further processed to separate the containers into individual sealed containers. In some embodiments, depending on the filling equipment, the containers 10 can be separated prior to filling. In such embodiments, the equipment can also separate the lidding material 49 into the individual lids 50.

In any of the embodiments disclosed herein, the containers 10 of the container assembly 100 and/or the lids 50 of the lidding material 49 can in various embodiments be joined to adjacent containers 10 or lids 50 by a line of reduced strength to facilitate separation of the containers and lids.

Figure 16A:
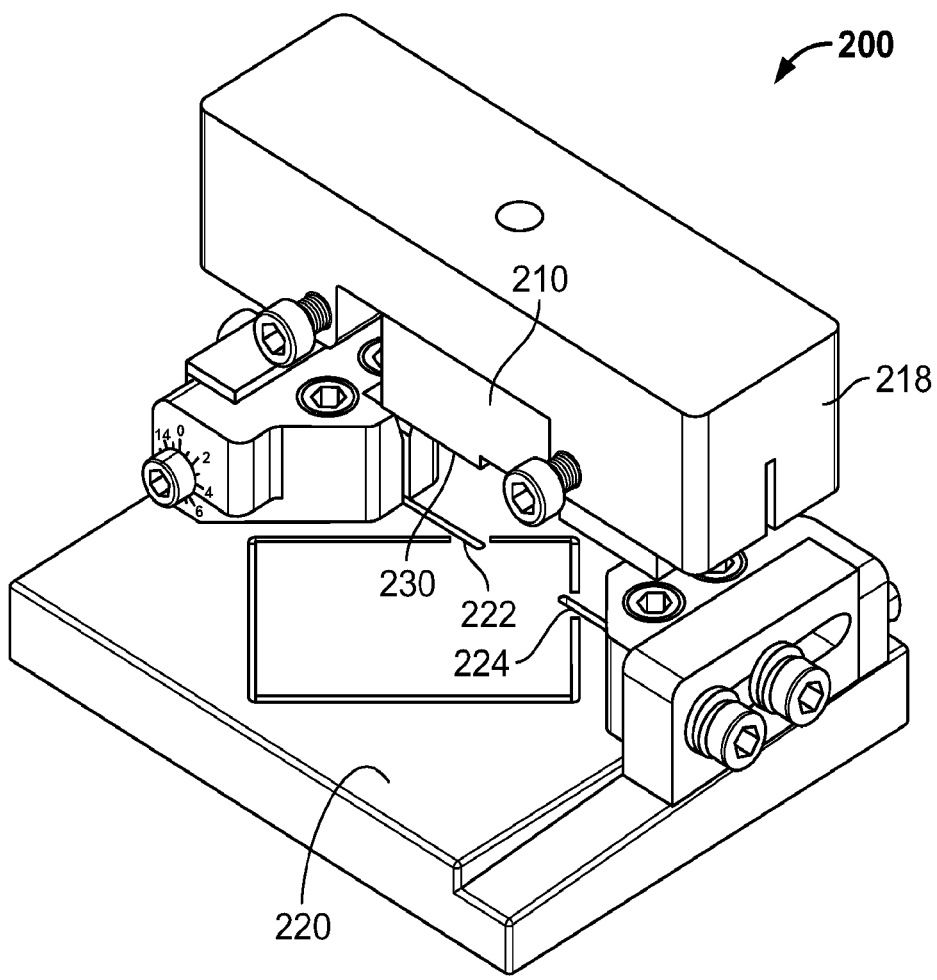
FIGS. 16A-16C are various views of an apparatus for forming a line of reduced strength in accordance with an embodiment of the disclosure.
Figure 16B:
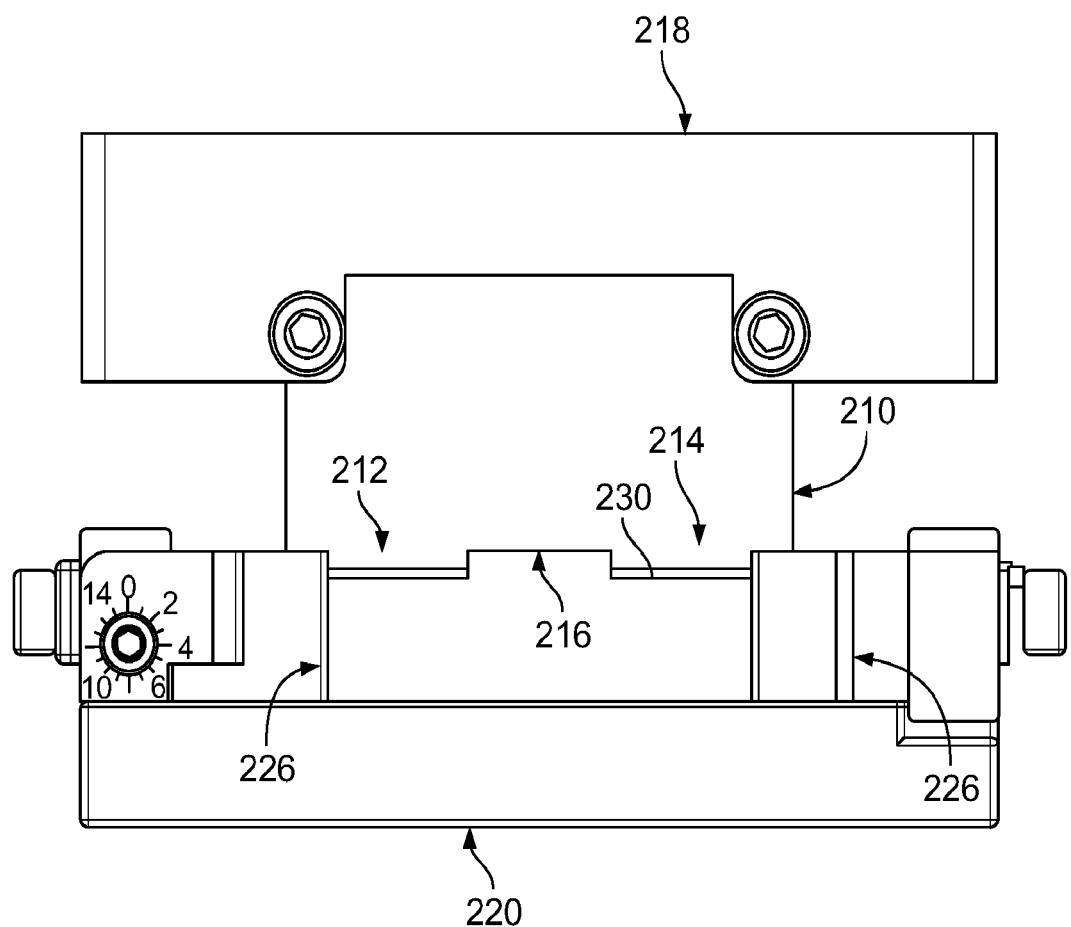
Figure 16C:
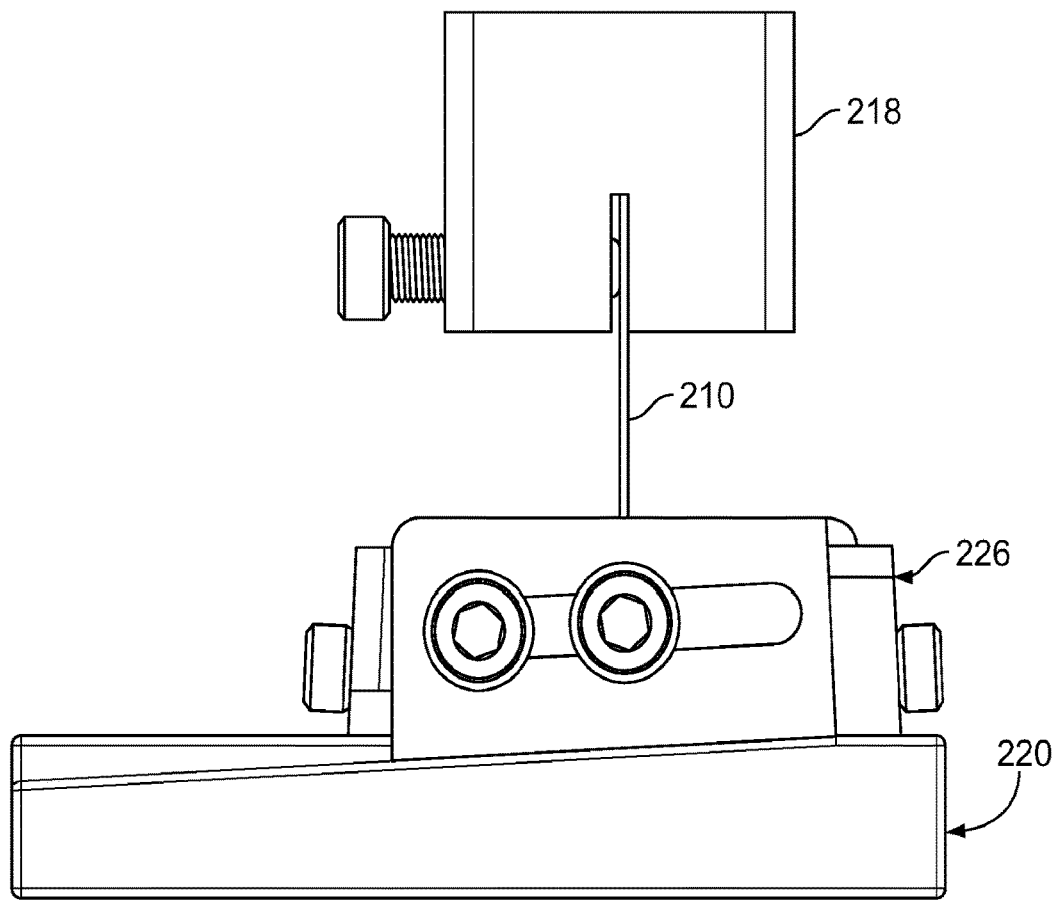
Figure 17A:
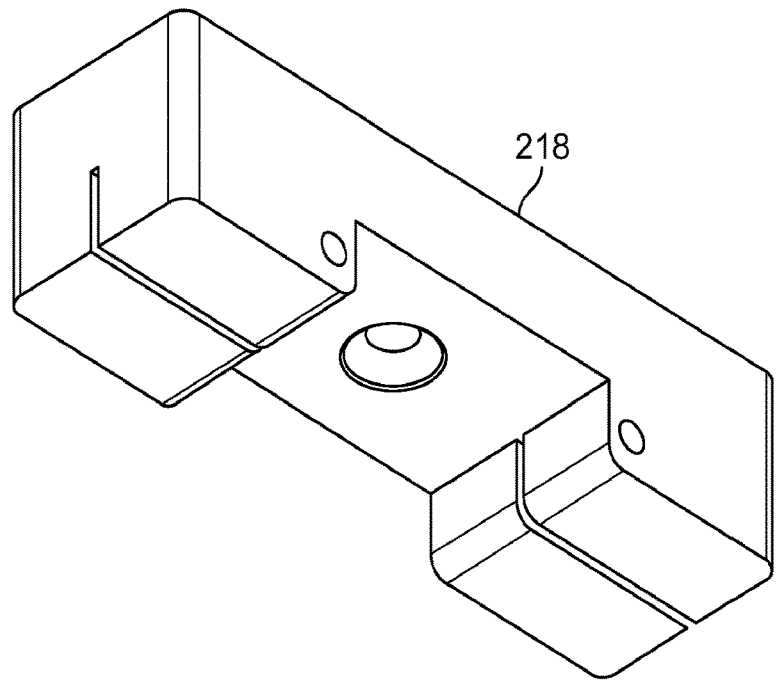
FIGS. 17A-17D are various views of a knife mounting plate of the apparatus of FIG. 16.
Figure 17B:
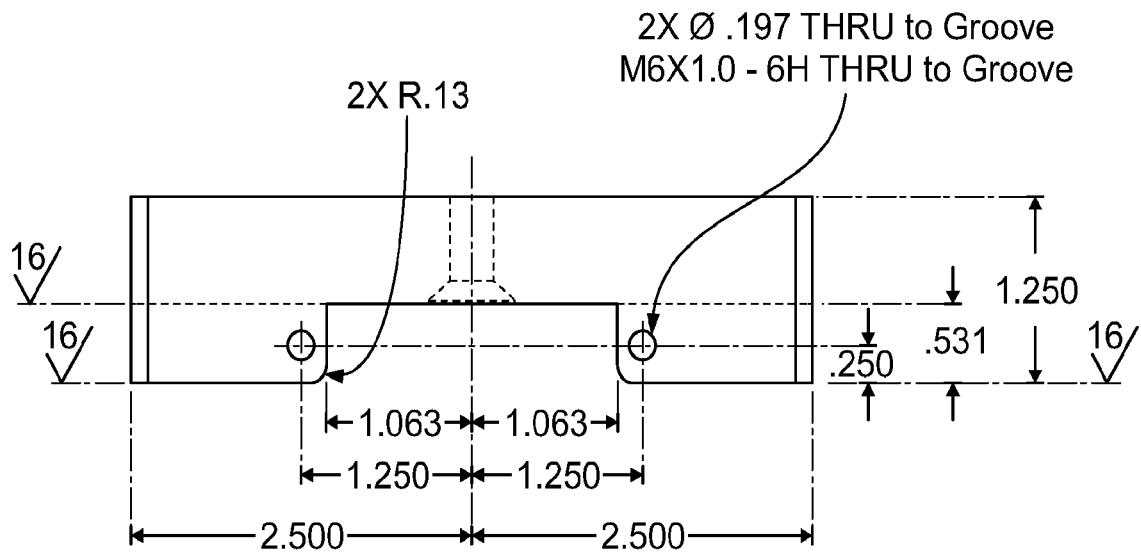
Figure 17C:
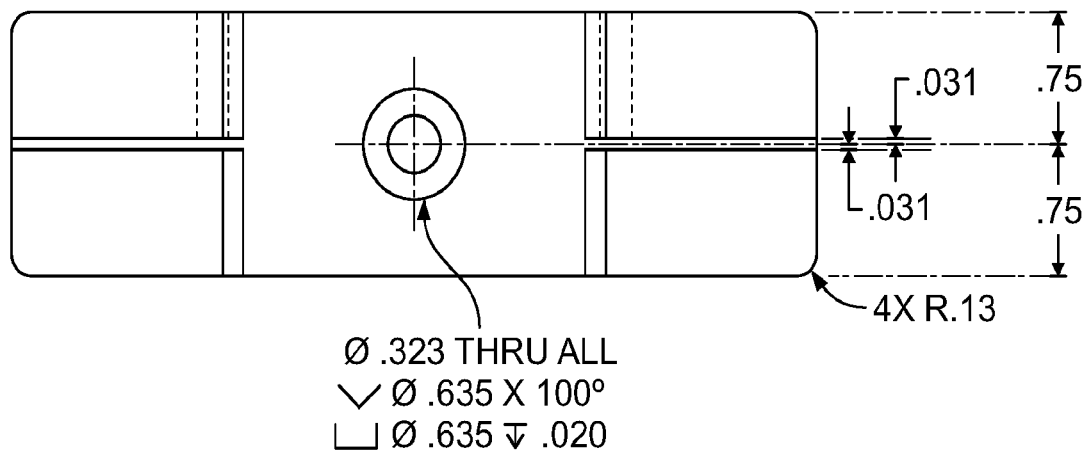
Figure 17D:
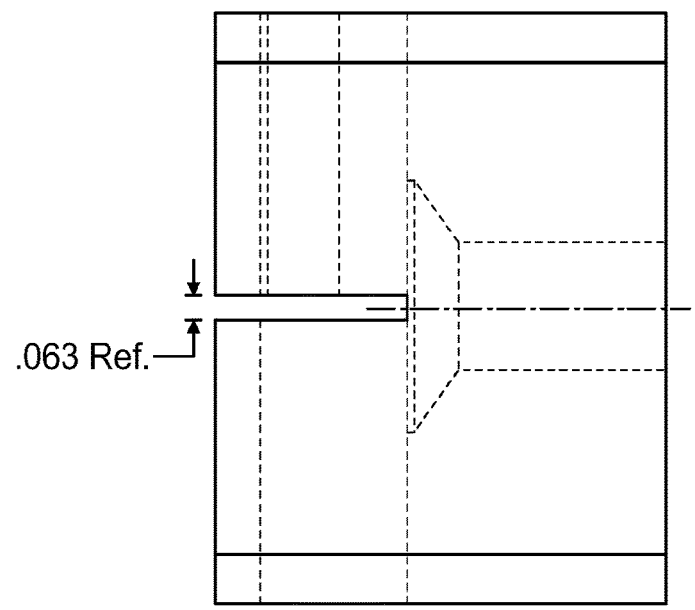
Figure 18A:
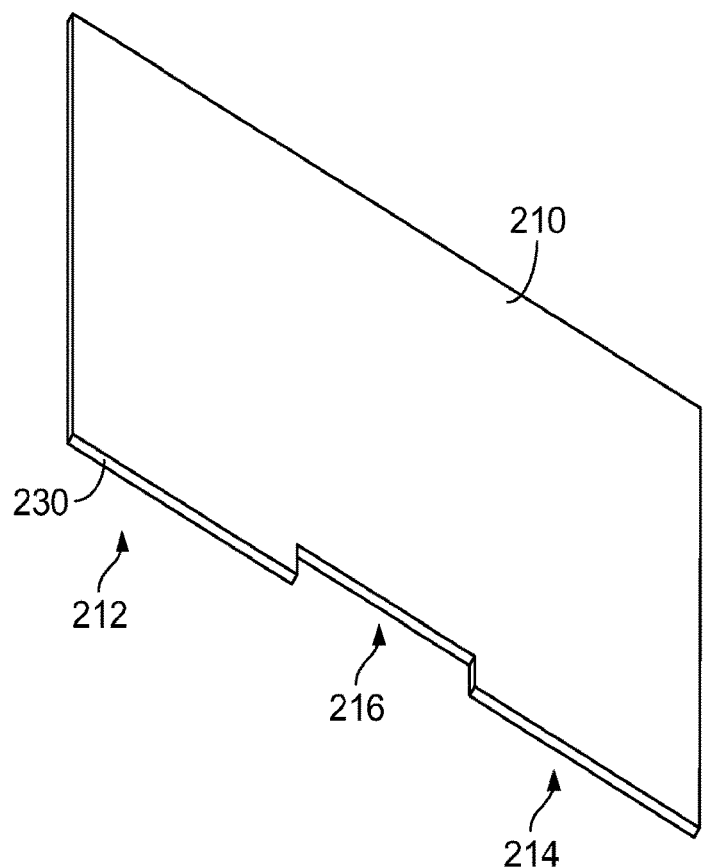
FIGS. 18A-18D are various views of a knife of the apparatus of FIG. 16.
Figure 18B:
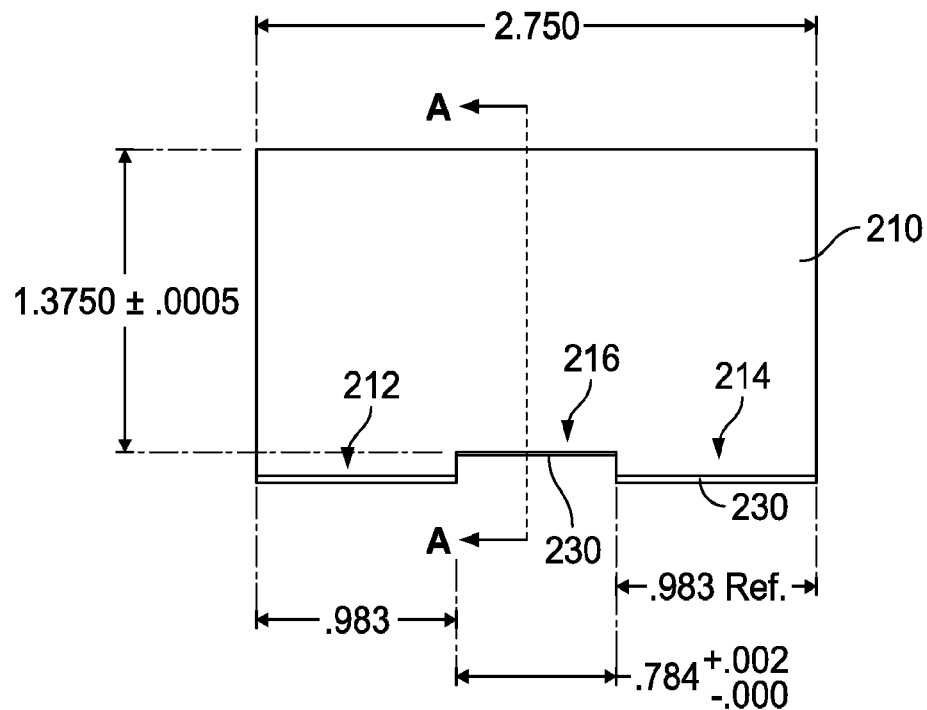
Figure 18C:
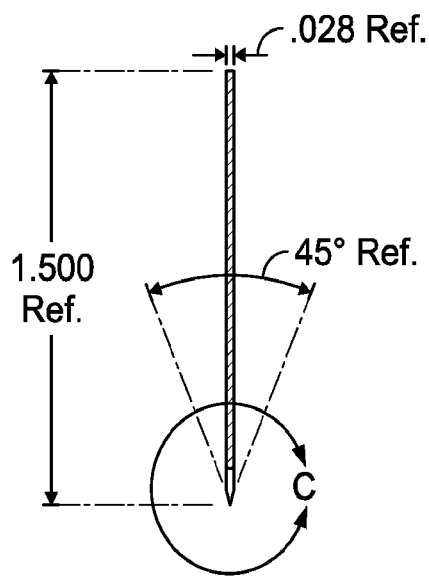
Figure 18D:
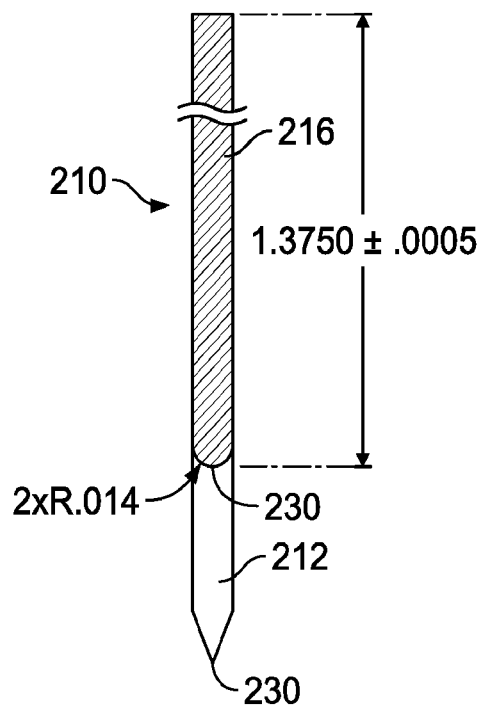

In embodiments in which the removal line 28 or the line of reduced strength 52 of the lid 50 has variable penetration across the line, including embodiments in which the removal line 28 or the line of reduced strength 52 of the lid 50 includes cut portions 30, 54, the line of reduced strength can be formed in a single step or in multiple steps. For example, referring to FIG. 16A, an apparatus 200 for forming a line of reduced strength having variable penetration can include a knife 210 having a variable height. For example, as illustrated in FIG. 16B, the knife 210 can have first and second portions 212, 214, disposed on opposed sides of a third portion 216. In various embodiments, the first and second portions 212, 214 can be utilized to form a line of reduced strength having 100% penetration or at least greater penetration than the line of reduced strength formed by the third portion 216. The knife 210 as shown in FIG. 16B can form the lines of reduced strengths having different percent penetrations at substantially the same time. The knife 210 can include any number of variable height portions to define a variable percent penetration profile, as desired.

The knife edge 230 can have any suitable angle and can have a variable angle between the portions. For example, the knife edge 230 or portions thereof can be angled about 45° to about 180°, about 50° to about 135°, about 75° to about 120°, or about 90° to about 150°. Other suitable angles include about 45, 50, 55, 60, 65, 70, 75, 80, 85, 90, 95, 100, 105, 110, 115, 120, 125, 130, 135, 140, 145, 150, 155, 160, and 165°. A knife angle of 180° corresponds to a knife having a flat crush area. The crush profile can also have various radii in the corners. FIGS. 24A-M illustrate various embodiments of the angles that can be utilized for the knife edge 230 at the first and second portions.

Figure 21A:
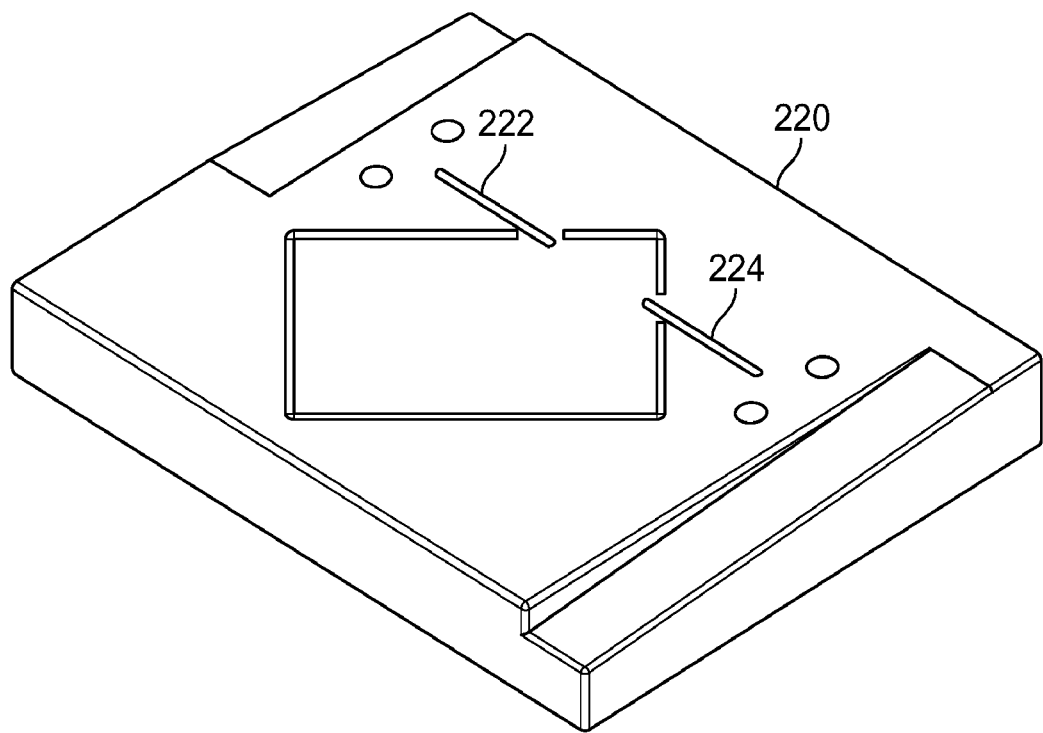
FIGS. 21A-21B are views of an anvil plate of the apparatus of FIG. 16.
Figure 21B:
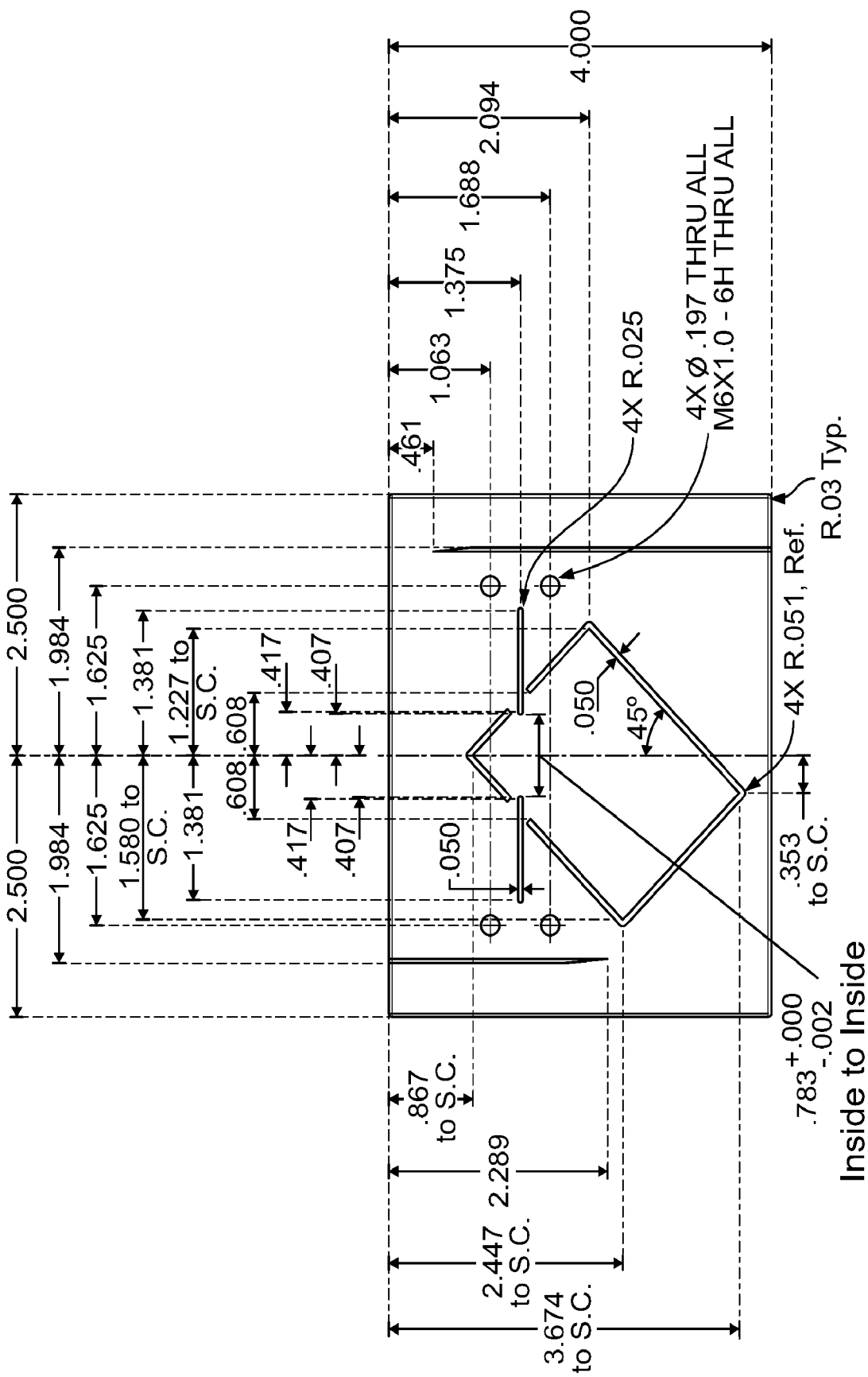
Figure 22A:
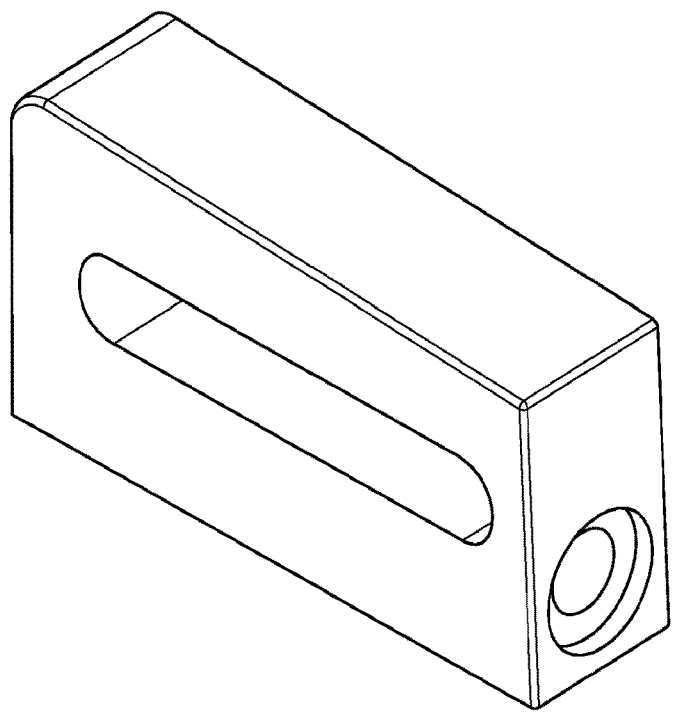
Figure 22B:
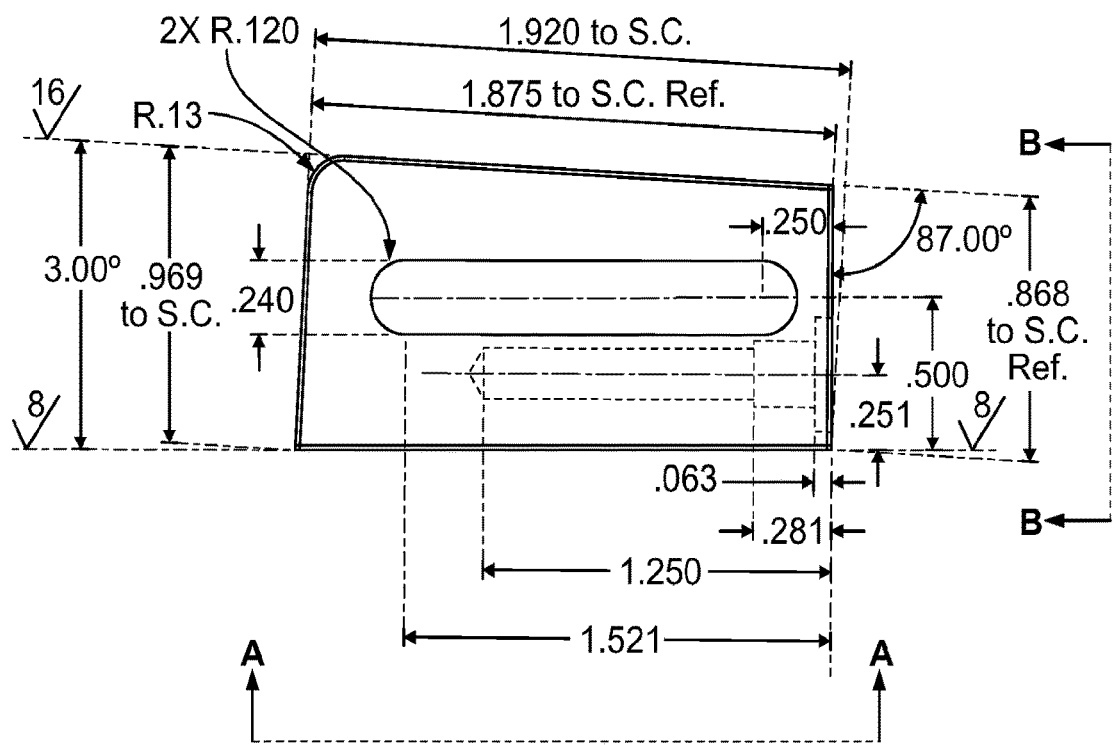
Figure 22C:
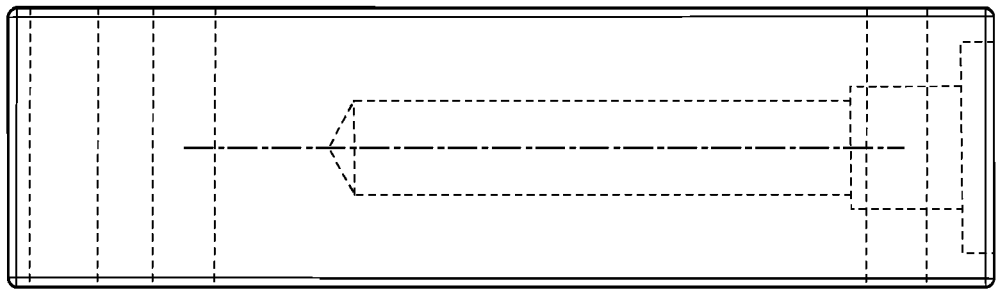
Figure 22D:
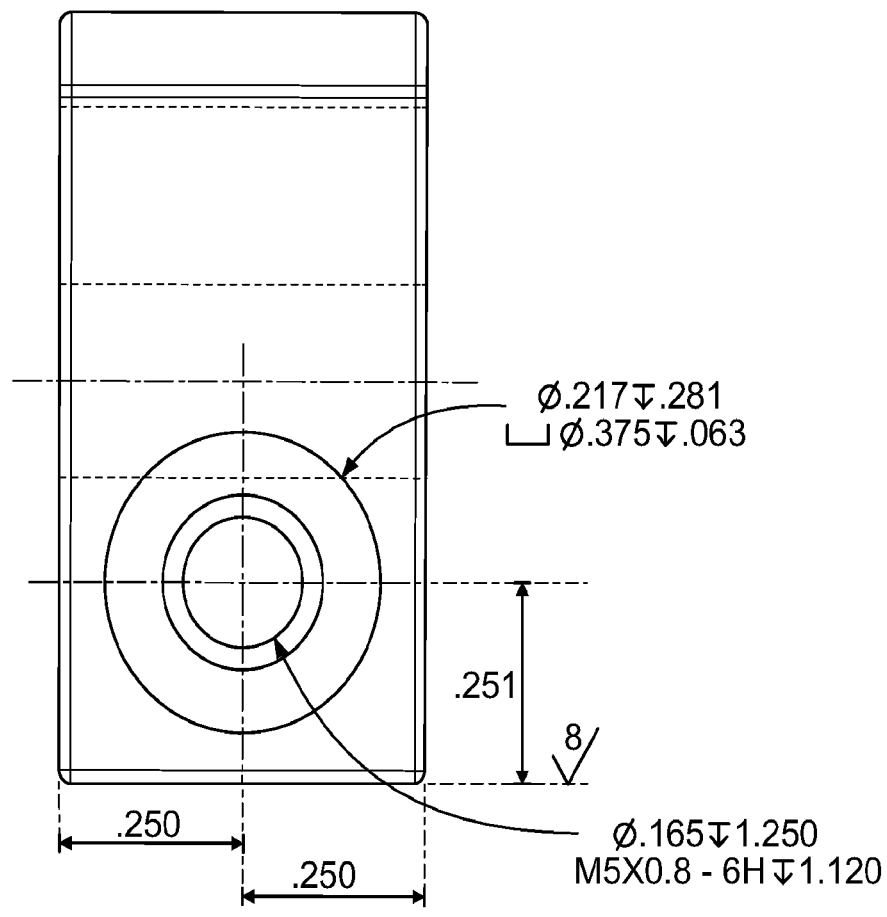
Figure 23C:
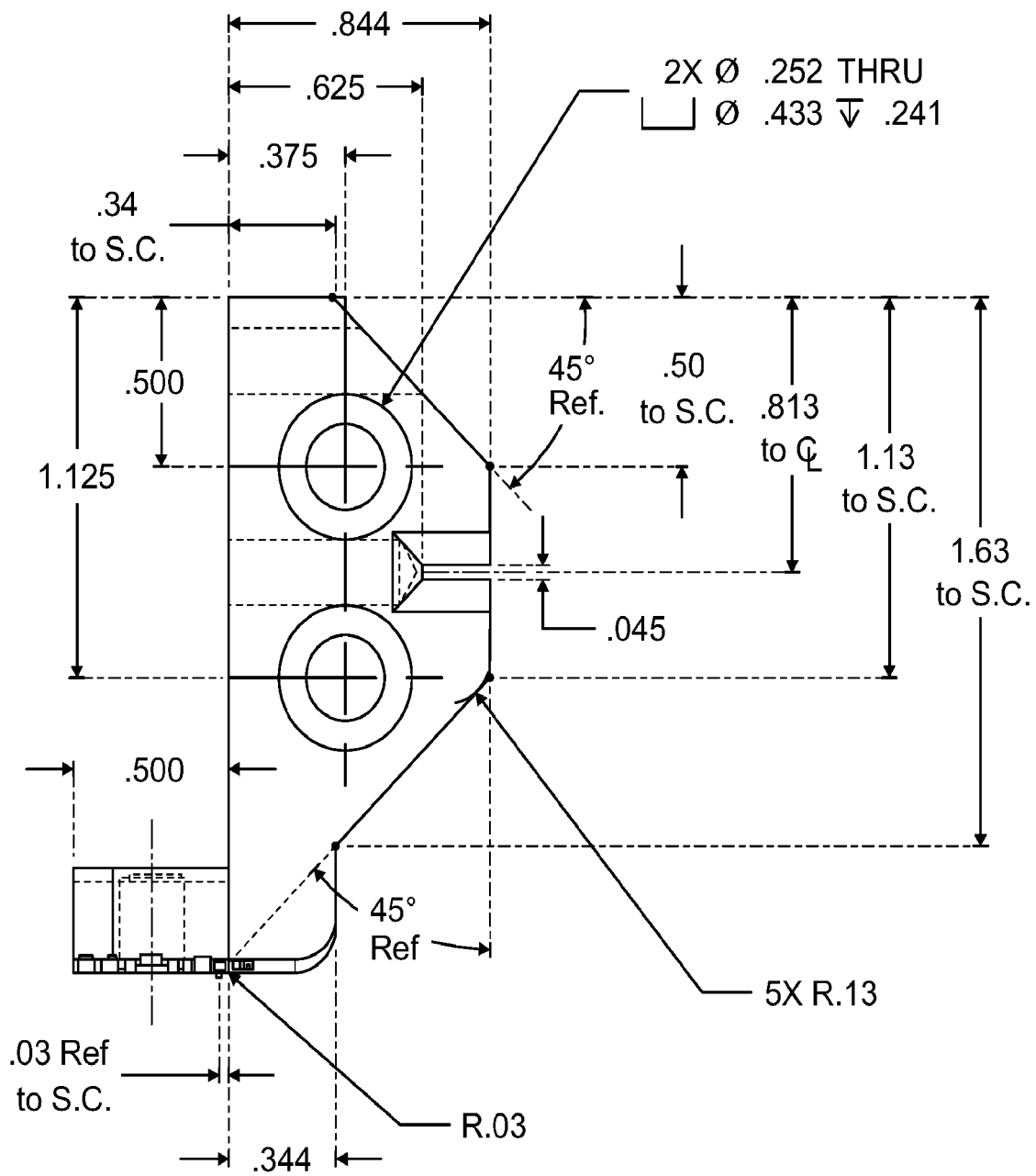
Figure 23D:
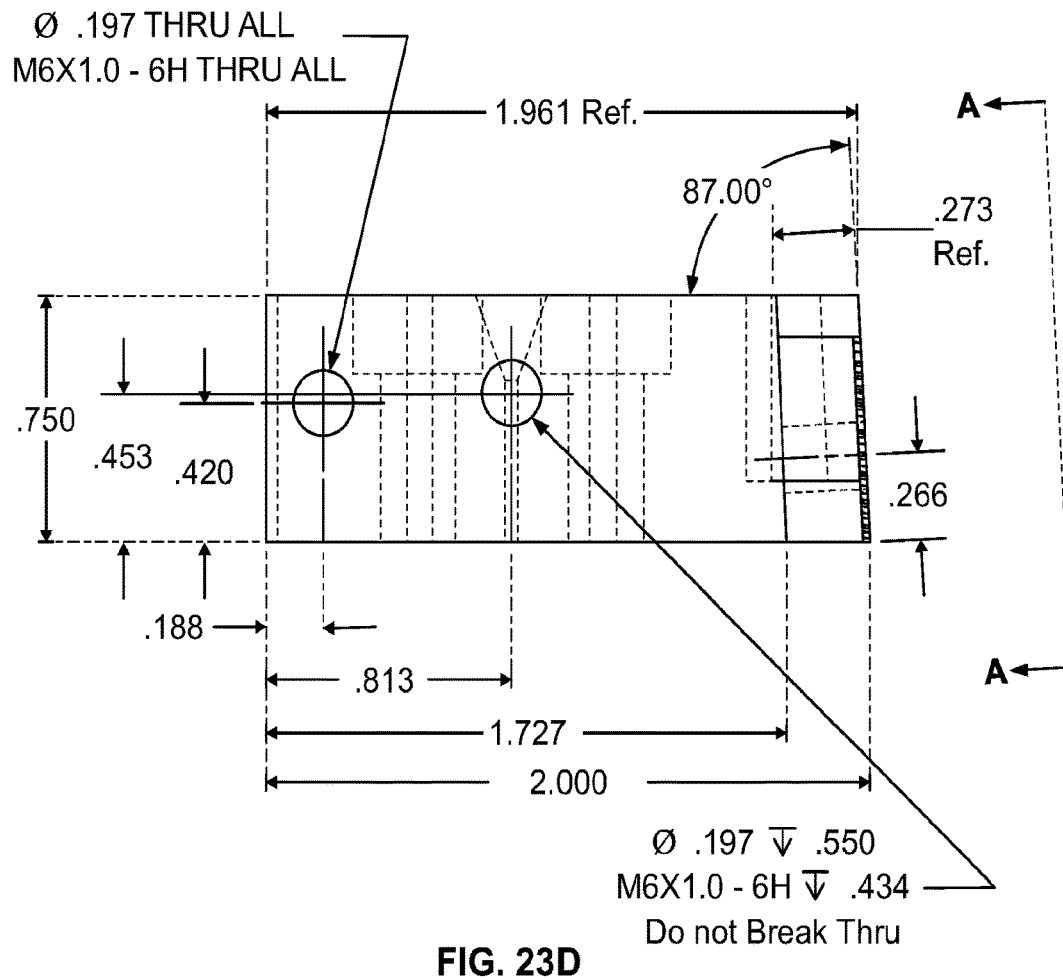
Figure 23E:
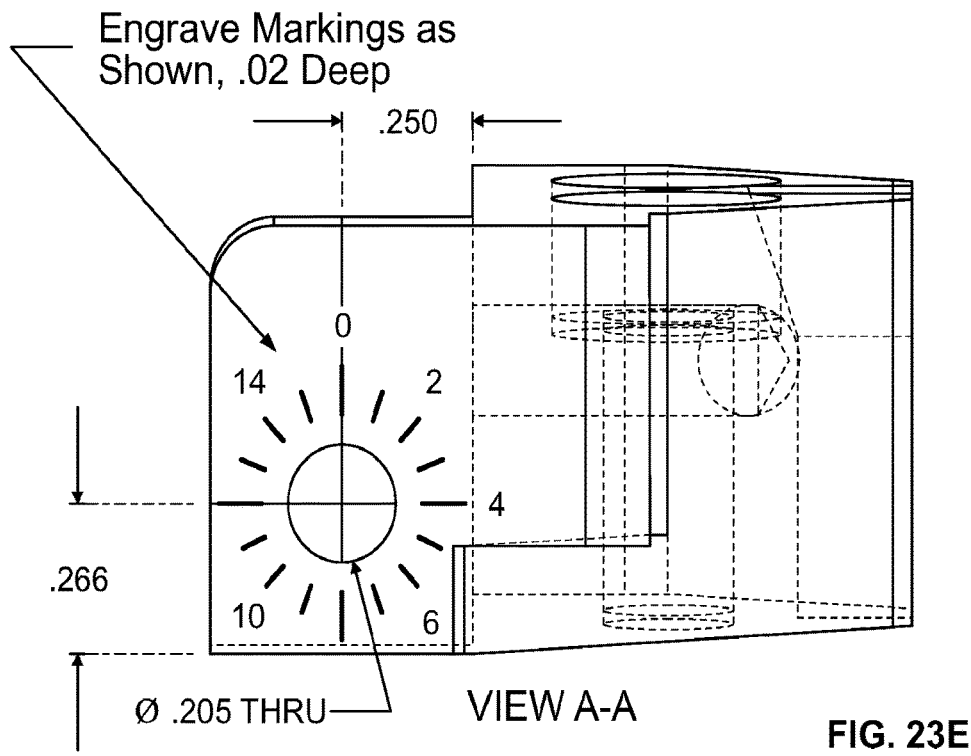
Figure 23F:
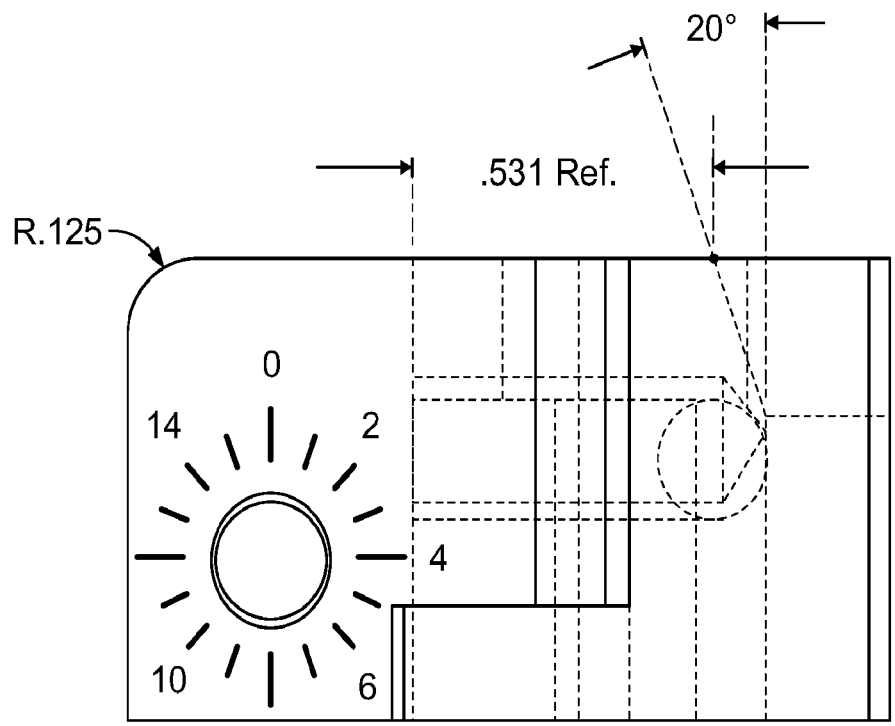
Figure 23G:
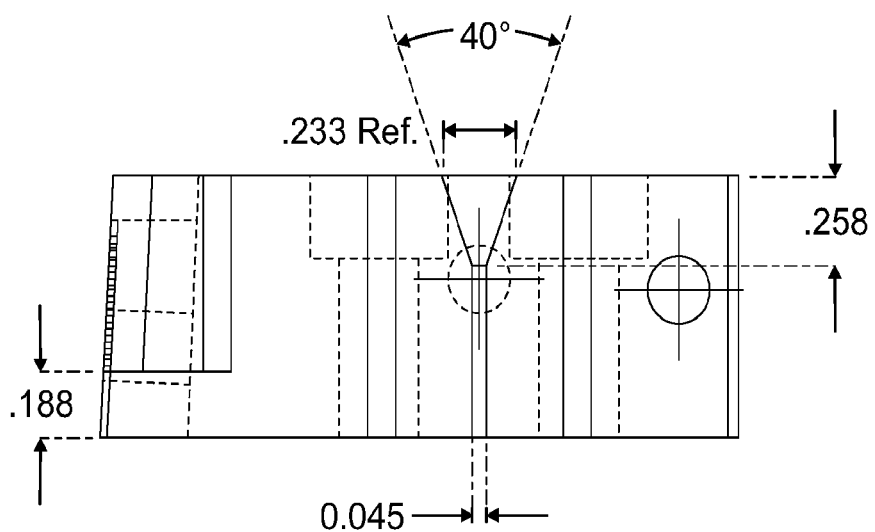
Figure 24A:
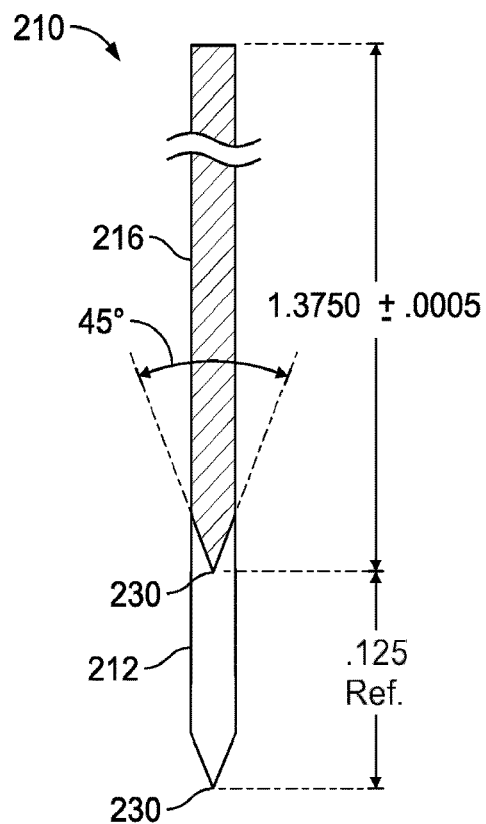
Figure 24B:
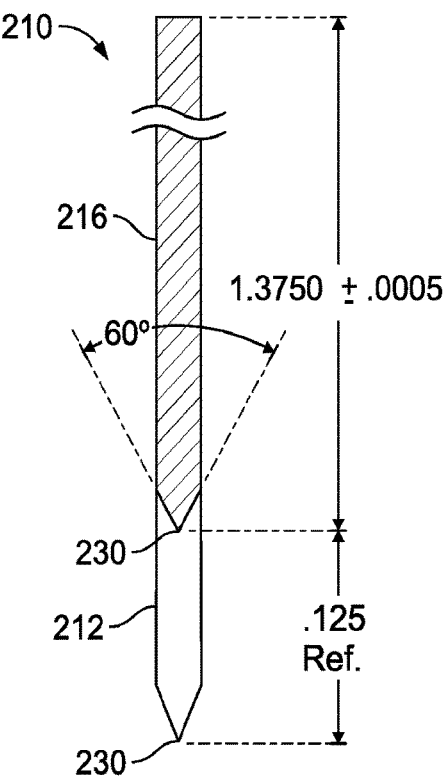
Figure 24C:
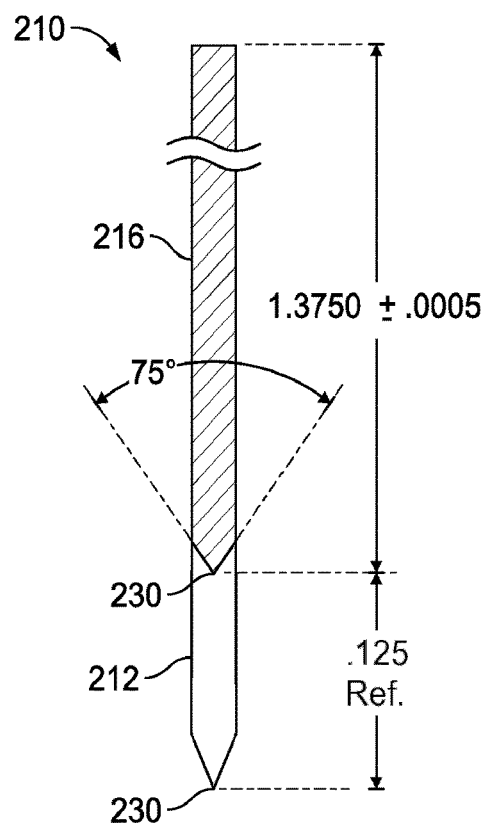
Figure 24D:
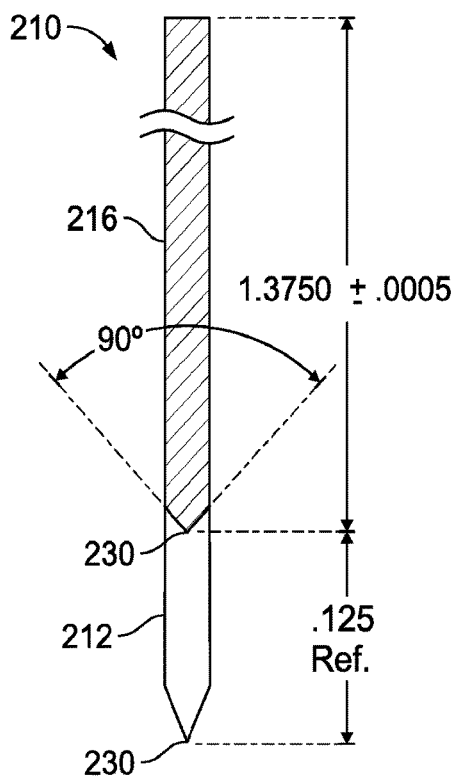
Figure 24E:
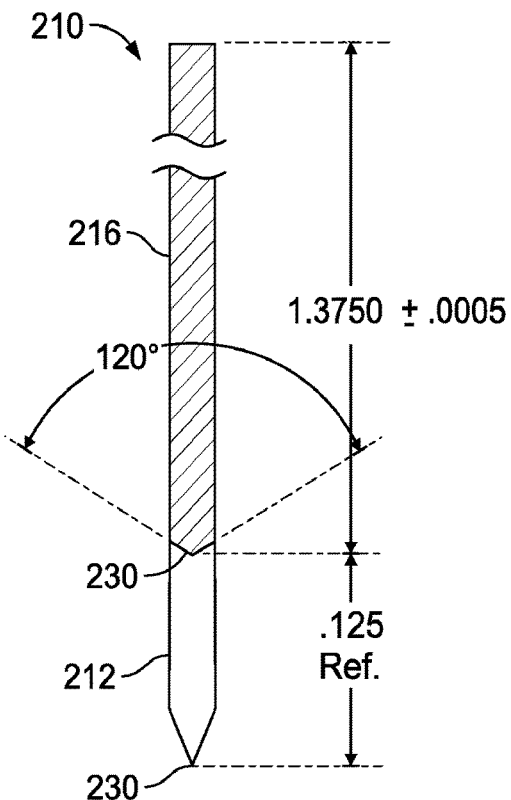
Figure 24F:
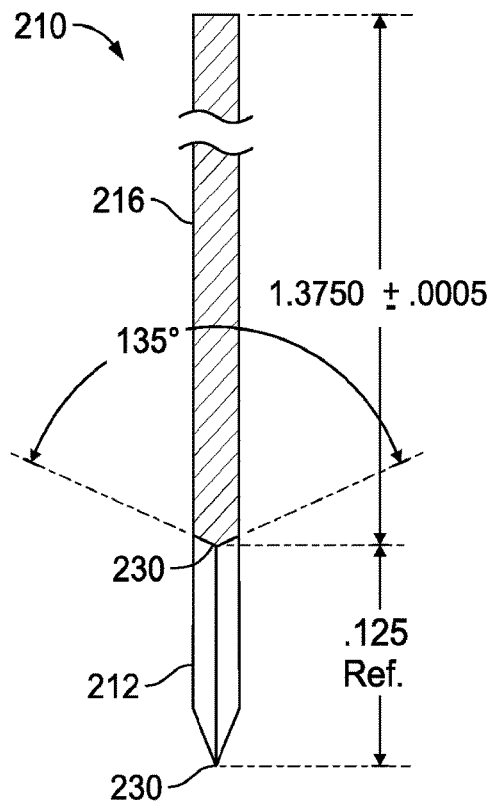
Figure 24G:
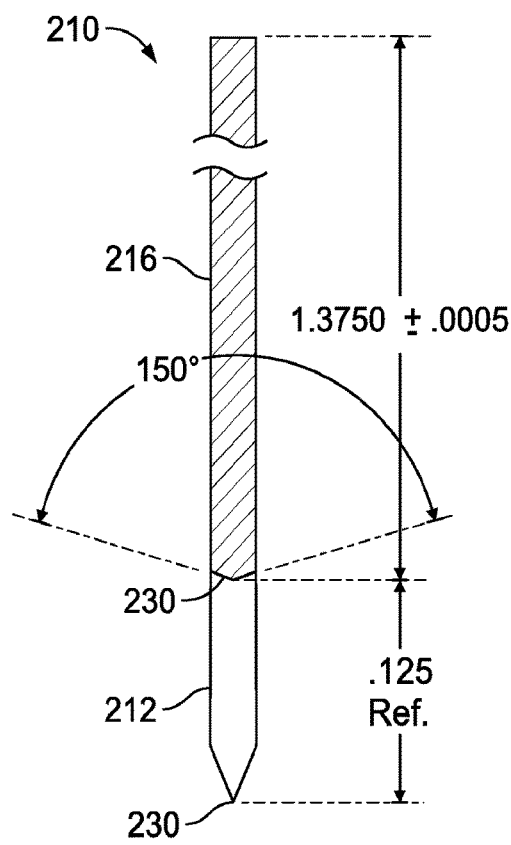
Figure 24H:
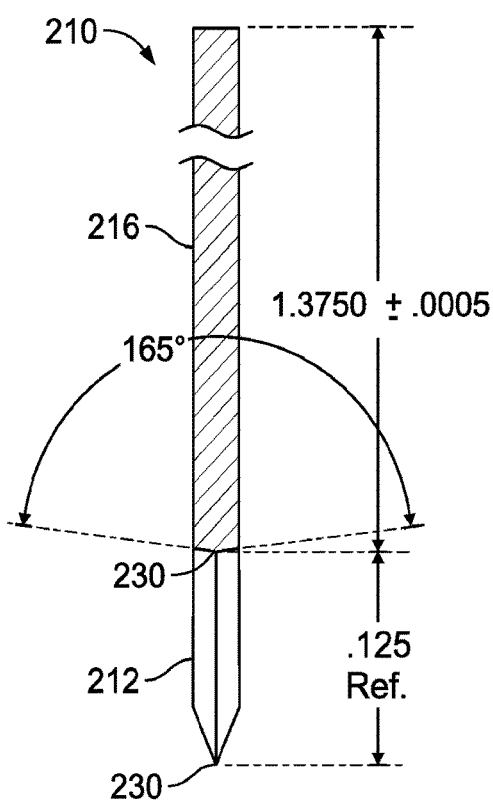

In various embodiments, the apparatus 200 can include a mounting plate 218 for receiving the knife 210. The apparatus 200 can also include an anvil plate 220 against which the knife is actuated when forming a line of reduced strength in a material. Referring to FIG. 21A, the anvil plate 220 can include first and second grooves 222, 224 corresponding to the first and second portions 212, 214 of the knife to accommodate the difference in height between the first and second portions 212, 214 of the knife and third portion 216 of the knife 210. The grooves receive the first and second portions 212, 214 along with the material, whereas the material in the third portion 216 is pressed against the surface of the anvil plate 220. Any suitable number of grooves having depths corresponding to the change in height between the portions of the knife 210 can be included in the anvil plate 220.

The apparatus 200 can also include one or more guides 226 that aid in directing the material, whether it is container assemblies 100 or a lidding material 49 into the correct position for forming the line of reduced strength.

Other known methods of forming lines of reduced strength can be used herein to form the removal line 28 or the line of reduced strength 52 in the lid 50, including, but not limited to, die cutting, perforating, and laser scoring. The variable lines of reduced strength and/or cut portions can be formed in multiple steps in various embodiments. For example, in an embodiment, a first line of reduced strength having a first percent penetration can be formed across the entire removal line 28 or the lid line of reduced strength 52 and then a second line of reduced strength increasing the percent penetration can be formed in regions of the first line of reduced strength to form a variable percent penetration line of reduced strength. Any number of lines of reduced strength can be formed in succession to achieve the desired percent penetration profile.

EXAMPLE

While any suitable settings can be used for laser scoring and may be adjusted depending on the material scored and the type of laser being used, the following is one example of suitable laser scoring settings for scoring the lidding sheet.

For scoring, which results in less than 100% penetration through the material, the following was used:
Process Speed=5,000 mm/sec.,
Jump Speed=10,000 mm/sec.,
Frequency=20 kHz
Power=100%, but this can be adjusted as needed depending on score depth desired. Other powers that were used include 25%, 35%, and 50%.

For scoring which results in complete penetration through the material, also referred to as "burn thru," the following was used:
Process Speed=400 mm/sec., 200 mm/sec. and 1,000 mm/sec were also used. The 1,000 mm/sec. setting provided "burn mostly thru" type performance.
Jump Speed=10,000 mm/sec.,
Frequency=20 kHz
Power=100%

The laser scoring was a diamond shaped line of reduced strength for a group of four containers. The machine was run between 20 feet/minute and 50 feet/minute using a Lasersharp LPM dm 100 GT laser.

While various embodiments have been described above, the disclosure is not intended to be limited thereto. Variations can be made to the disclosed embodiments that are still within the scope of the appended aspect.

What is claimed:

1. A container assembly, comprising:
   a plurality of containers arranged in a predetermined pattern and joined to at least one adjacent container along at least one edge, wherein the containers are arranged in rows and columns and adjacent containers are mirror images of each other, each of the plurality of containers comprising:
     a body having a volume defined therein for retaining a product and having a top surface adapted to be sealed by a lidding material,
     a channel defined in a portion of the body such that the channel is in fluid communication with the internal volume at a first end and sealed by a portion of the body at an oppositely disposed second end, and
     a top flange surrounding a top surface of the body and including a portion that borders the channel; and
   a removal line defined by a line of reduced strength disposed in each of the containers to define a removable portion comprising the portion of the body sealing the channel and the portion of the top flange that borders the channel, wherein:
     the removal line extends from a first edge to a second edge and across the channel such that the removable portion can be removed from the body along the removal line to expose the second end of the channel, and
     the removal line comprises first and second portions disposed on opposed sides of a third portion, each portion comprises a line of reduced strength, and the line of reduced strength of the first and second portions has a greater percent penetration than the line of reduced strength of the third portion.

2. The container assembly of claim 1, wherein the predetermined pattern comprises a plurality of groups, each group comprising four containers with two containers disposed in a first row and two containers disposed in an adjacent row, the removable portions of each of the containers being arranged in a center region of the group.

3. The container assembly of claim 2, wherein each of the removal lines disposed in each of the removable portions of the four containers of the group is connected.

4. The container assembly of claim 3, wherein the connected lines of reduced strength define a substantially square shape.

5. A container assembly, comprising:
a plurality of containers arranged each having the same orientation and joined to at least one adjacent container along at least one edge, wherein the containers are arranged in rows and/or columns, each of the plurality of containers comprising:
   a body having a volume defined therein for retaining a product and having a top surface adapted to be sealed by a lidding material,
   a channel defined in a portion of the body such that the channel is in fluid communication with the internal volume at a first end and sealed by a portion of the body at an oppositely disposed second end, and
   a top flange surrounding a top surface of the body and including a portion that borders the channel; and
a removal line disposed in each of the containers to define a removable portion comprising the portion of the body sealing the channel and the portion of the top flange that borders the channel, wherein:
   the removal line extends from a first edge to a second edge and across the channel such that the removable portion can be removed from the body along the removal line to expose the second end of the channel,
   the removal line comprises first and second portions disposed on opposed sides of a third portion and one or more extension portions,
   the first and second portions extend inwardly from the first and second edges, respectively, but do not cross the channel, each of the first and second portions comprises a line of reduced strength having about 100% penetration through the container material,
   the third portion extends at least across the channel and connects to the first and second portions, the third portion comprises a line of reduced strength having less than 100% penetration through the container material; and
one or more extension portions extending outwardly from the first and/or second portions and crossing a joined edge between adjacent containers, the extension portions each comprises a line of reduced strength having about 100% penetration through the container material.

6. The container assembly of claim 5, wherein the extension portion is angled relative to the first and/or second portions from which it extends.

7. The container of claim 5, wherein the plurality of containers are joined along at least one edge by a line of reduced strength.

8. The container assembly of claim 5, further comprising a lidding material attached to the top flange such that the lidding material seals the volume and the channel.

9. The container assembly of claim 5, wherein the plurality of containers are joined along at least two edges by a line of reduced strength.

10. The container assembly of claim 5, wherein the channel is disposed in a recessed extension of the body and the flange borders the recessed extension.

11. The container assembly of claim 5, wherein the body of each of the plurality of containers includes at least one rib.

* * * * *